US011131900B2

(12) United States Patent
Yoneda et al.

(10) Patent No.: US 11,131,900 B2
(45) Date of Patent: Sep. 28, 2021

(54) BLADE OPENING AND CLOSING DEVICE AND IMAGING APPARATUS

(71) Applicant: SONY CORPORATION, Tokyo (JP)

(72) Inventors: Masafumi Yoneda, Tokyo (JP); Toshiro Hayashi, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/619,527

(22) PCT Filed: Apr. 25, 2018

(86) PCT No.: PCT/JP2018/016870
§ 371 (c)(1),
(2) Date: Dec. 5, 2019

(87) PCT Pub. No.: WO2018/230171
PCT Pub. Date: Dec. 20, 2018

(65) Prior Publication Data
US 2020/0150513 A1    May 14, 2020

(30) Foreign Application Priority Data

Jun. 14, 2017 (JP) .............................. JP2017-117233

(51) Int. Cl.
G03B 9/40 (2021.01)
G02B 26/02 (2006.01)

(52) U.S. Cl.
CPC .............. *G03B 9/40* (2013.01); *G02B 26/023* (2013.01)

(58) Field of Classification Search
CPC .............. G03B 9/16; G03B 9/36; G03B 9/40
See application file for complete search history.

(56) References Cited

U.S. PATENT DOCUMENTS

| 2011/0176799 | A1  | 7/2011 | Shintani |
| 2012/0106945 | A1* | 5/2012 | Kawakami ............... G03B 9/20 396/497 |

(Continued)

FOREIGN PATENT DOCUMENTS

| CN | 104285181 A | 1/2015 |
| CN | 105425506 A | 3/2016 |

(Continued)

OTHER PUBLICATIONS

International Search Report and Written Opinion of PCT Application No. PCT/JP2018/016870, dated Aug. 7, 2018, 08 pages of ISRWO.

*Primary Examiner* — Noam Reisner
(74) *Attorney, Agent, or Firm* — Chip Law Group

(57) ABSTRACT

Provided are a first magnetic drive unit including a first coil and a first magnet, and a second magnetic drive unit including a second coil and a second magnet. Also provided are a first drive lever and a second drive lever operated by the first magnetic drive unit and the second magnetic drive unit, respectively, a first opening and closing blade and a second opening and closing blade that open and close an opening by an operation of the first drive lever and the second drive lever, respectively. A first lock mechanism locks the first drive lever at a predetermined position, and a second lock mechanism that locks the second drive lever at a predetermined position, and a part of the first lock mechanism and a part of the second lock mechanism are located between the first magnetic drive unit and the second magnetic drive unit.

19 Claims, 42 Drawing Sheets

(56) References Cited

U.S. PATENT DOCUMENTS

2014/0369675 A1    12/2014   Takahashi et al.
2016/0026069 A1     1/2016   Togo et al.
2016/0077405 A1     3/2016   Nakano et al.

FOREIGN PATENT DOCUMENTS

| | | |
|---|---|---|
| JP | 62-223735 A | 10/1987 |
| JP | 2009-175365 A | 8/2009 |
| JP | 2012-014146 A | 1/2012 |
| JP | 2014-066760 A | 4/2014 |
| JP | 2015-143744 A | 8/2015 |
| JP | 2016-057524 A | 4/2016 |
| JP | 2017-062418 A | 3/2017 |
| KR | 10-2014-0116527 A | 10/2014 |
| WO | 2014/045650 A1 | 3/2014 |
| WO | 2017/104265 A1 | 6/2017 |

\* cited by examiner

BLADE OPENING AND CLOSING DEVICE AND IMAGING APPARATUS

CROSS REFERENCE TO RELATED APPLICATIONS

This application is a U.S. National Phase of International Patent Application No. PCT/JP2018/016870 filed on Apr. 25, 2018, which claims priority benefit of Japanese Patent Application No. JP 2017-117233 filed in the Japan Patent Office on Jun. 14, 2017. Each of the above-referenced applications is hereby incorporated herein by reference in its entirety.

TECHNICAL FIELD

The present technology relates to a technical field of a blade opening and closing device having a magnetic drive unit for opening and closing an opening and closing blade, and which locks the opening and closing blade with a lock mechanism, and an imaging apparatus including the blade opening and closing device.

BACKGROUND ART

In various imaging apparatuses such as a video camera and a still camera, an optical system having a lens group, an optical element, and the like therein and an imaging element for photoelectrically converting light taken in by the optical system are arranged. Among such imaging apparatuses, there is an imaging apparatus having light enter the imaging element via a focal plane shutter that functions as a blade opening and closing device at the time of capturing an object.

There are blade opening and closing devices each provided with a base with an opening, an opening and closing blade moved (traveling) with respect to the base, a magnetic drive unit for operating the opening and closing blade, and a drive lever operated by the magnetic drive unit, in which the drive lever is operated by the magnetic drive unit, and the opening and closing blade is moved to open and close the opening (for example, see Patent Documents 1 and 2).

In such a blade opening and closing device, the opening and closing blade is operated in a predetermined state by the magnetic drive unit in each mode. The magnetic drive unit is provided with a magnet and a coil, and the opening and closing blade is moved with the magnet rotated by supply of a drive current to the coil. When the opening and closing (traveling) operation of the opening and closing blade is not performed, the opening and closing blade is located at an open position where the opening is opened or a closed position where the opening is closed. When the magnet is rotated by electric conduction to the coil, the opening and closing blade is moved from the open position or the closed position toward the closed position or the open position.

Furthermore, to prevent unintentional opening and closing due to vibration of the opening and closing blade or the like, the opening and closing blade is locked at the open position or the closed position by a lock mechanism.

In the blade opening and closing devices described in Patent Documents 1 and 2, a first opening and closing blade and a second opening and closing blade are separately moved between an open position and a closed position, the first opening and closing blade is moved by a first drive lever operated by a drive force of a first magnetic drive unit, and the second opening and closing blade is moved by a second drive lever operated by a drive force of a second magnetic drive unit. Furthermore, the first opening and closing blade is locked at the open position or the closed position by a first lock mechanism, and the second opening and closing blade is locked at the open position or the closed position by a second lock mechanism.

At the time of capturing an object, exposure is performed as light transmitted through the opening sequentially enters an imaging surface of the imaging element from one side to the other side, the incident light is sequentially photoelectrically converted by the imaging element and an image signal is generated, and the generated image signal is transferred to a memory and an image of the object is generated.

CITATION LIST

Patent Document

Patent Document 1: Japanese Patent Application Laid-Open No. 2014-66760
Patent Document 1: Japanese Patent Application Laid-Open No. 62-223735

SUMMARY OF THE INVENTION

Problems to be Solved by the Invention

By the way, in the blade opening and closing device as described above, since magnetic fluxes are respectively generated in the first magnetic drive unit and the second magnetic drive unit, the magnetic flux generated in one magnetic drive unit may affect the operation of the other magnetic drive unit depending on the magnitude of the generated magnetic fluxes and the positions of the first magnetic drive unit and the second magnetic drive unit.

Furthermore, since the blade opening and closing device is provided with the first lock mechanism for locking the first opening and closing blade and the second lock mechanism for locking the second opening and closing blade, in addition to the first magnetic drive unit and the second magnetic drive unit, the blade opening and closing device may be increased in size if an arrangement space of these units becomes large.

Therefore, a blade opening and closing device and an imaging apparatus according to the present technology overcome the above-described problems, and an object is to decrease an influence of a magnetic flux generated in one magnetic drive unit on the other magnetic drive unit while securing downsizing of the device and apparatus.

Solutions to Problems

First, a blade opening and closing device according to the present technology includes a first magnetic drive unit including a first coil to which a drive current is supplied and a first magnet rotated with electric conduction to the first coil; a second magnetic drive unit including a second coil to which a drive current is supplied and a second magnet rotated with electric conduction to the second coil; a first drive lever operated by the first magnetic drive unit; a second drive lever operated by the second magnetic drive unit; a first opening and closing blade that opens and closes an opening by an operation of the first drive lever; a second opening and closing blade that opens and closes the opening by an operation of the second drive lever; a first lock mechanism that locks the first drive lever at a predetermined position; and a second lock mechanism that locks the second drive lever at a predetermined position, in which at least a part of the first lock mechanism and at least a part of the second lock mechanism are located between the first magnetic drive unit and the second magnetic drive unit.

Thereby, at least a part of the first lock mechanism and at least a part of the second lock mechanism are located between the first magnetic drive unit and the second magnetic drive unit, and the first magnetic drive unit and the second magnetic drive unit are located on an opposite side across at least a part of the first lock mechanism and at least a part of the second lock mechanism.

Second, in the above-described blade opening and closing device, it is desirable that at least a part of the second lock mechanism is located between the first magnetic drive unit and at least a part of the first lock mechanism, and at least a part of the first lock mechanism is located between the second magnetic drive unit and at least a part of the second lock mechanism.

Thereby, the first magnetic drive unit and at least a part of the first lock mechanism are located on the opposite side across at least a part of the second lock mechanism, and the second magnetic drive unit and at least a part of the second lock mechanism are located on the opposite side across at least a part of the first lock mechanism.

Third, in the above-described blade opening and closing device, it is desirable that a part of the first lock mechanism and a part of the second lock mechanism are made in an intersecting state in a direction orthogonal to an arranging direction of the first magnetic drive unit and the second magnetic drive unit.

Thereby, an arrangement space for the first lock mechanism and the second lock mechanism becomes small in the arranging direction of the first magnetic drive unit and the second magnetic drive unit.

Fourth, in the above-described blade opening and closing device, it is desirable that the first lock mechanism is provided with a first lock lever that restricts the operation of the first drive lever according to a turning position, a first action lever that restricts turn of the first lock lever according to a turning position, and a first attracting body that holds the first action lever by attraction, the second lock mechanism is provided with a second lock lever that restricts the operation of the second drive lever according to a turning position, a second action lever that restricts turn of the second lock lever according to a turning position, and a second attracting body that holds the second action lever by attraction, the second attracting body is located between the first magnetic drive unit and the first attracting body, the first attracting body is located between the second magnetic drive unit and the second attracting body, a turning shaft of the first action lever is located between the first magnetic drive unit and the first attracting body, and a turning shaft of the second action lever is located between the second magnetic drive unit and the second attracting body.

Thereby, a distance between the turning shaft and the attracting body becomes large in the first lock mechanism and the second lock mechanism.

Fifth, in the above-described blade opening and closing device, it is desirable that the first lock mechanism is provided with a first lock lever that restricts the operation of the first drive lever according to a turning position and a first action lever that restricts turn of the first lock lever according to a turning position, the second lock mechanism is provided with a second lock lever that restricts the operation of the second drive lever according to a turning position and a second action lever that restricts turn of the second lock lever according to a turning position, a turning shaft of the first action lever and a turning shaft of the first lock lever are made same, and a turning shaft of the second action lever and a turning shaft of the second lock lever are made same.

Thereby, the action lever and the lock lever are rotated about the same turning shaft as a fulcrum.

Sixth, in the above-described blade opening and closing device, it is desirable that the first magnetic drive unit and the second magnetic drive unit are located in a line-symmetric arrangement state.

Thereby, the arrangement state of the first magnetic drive unit and the second magnetic drive unit is simplified, and a combined arrangement space of the first magnetic drive unit and the second magnetic drive unit is minimized.

Seventh, in the above-described blade opening and closing device, it is desirable that the first lock mechanism and the second lock mechanism are located in a point-symmetric arrangement state.

Thereby, the arrangement state of the first lock mechanism and the second lock mechanism is simplified, and a combined arrangement space of the first lock mechanism and the second lock mechanism is minimized.

Eighth, in the above-described blade opening and closing device, it is desirable that a part constituting the first lock mechanism and a part constituting the second lock mechanism are made a same part.

Thereby, the parts constituting the first lock mechanism and the parts constituting the second lock mechanism are made common.

Ninth, in the above-described blade opening and closing device, it is desirable that an arranging direction of the first magnetic drive unit and the second magnetic drive unit is caused to coincide with an arranging direction of the first opening and closing blade and the second opening and closing blade.

Thereby, the first magnetic drive unit and the second magnetic drive unit are arranged in the order coinciding with the arranging direction of the first opening and closing blade and the second opening and closing blade.

Tenth, in the above-described blade opening and closing device, it is desirable that an arranging direction of the first lock mechanism and the second lock mechanism is caused to coincide with an arranging direction of the first opening and closing blade and the second opening and closing blade.

Thereby, the first lock mechanism and the second lock mechanism are arranged in the order coinciding with the arranging direction of the first opening and closing blade and the second opening and closing blade.

Eleventh, in the above-described blade opening and closing device, it is desirable that the first magnetic drive unit, the second magnetic drive unit, the first lock mechanism, and the second lock mechanism are arranged in a housing case.

Thereby, members separately housing the first magnetic drive unit and the second magnetic drive unit are not necessary.

Twelfth, in the above-described blade opening and closing device, it is desirable that the housing case is provided with a partition between the first magnetic drive unit or the second magnetic drive unit and the first lock mechanism or the second lock mechanism.

Thereby, the first magnetic drive unit or the second magnetic drive unit, and the first lock mechanism or the second lock mechanism are partitioned by the partition.

Thirteenth, in the above-described blade opening and closing device, it is desirable that the first drive lever and the second drive lever are respectively provided with portions to be locked, a locked state of the first opening and closing blade or the second opening and closing blade is set by engagement of the first lock lever or the second lock lever with the portion to be locked, setting of the locked state and release of the locked state are performed according to rotation position of the first magnet or the second magnet, and the first lock lever or the second lock lever is moved between a locked position where the locked state is set and an unlocked position where the locked state is released according to change in a magnetic force with rotation of the first magnet or the second magnet.

Thereby, since the lock part and the portion to be locked are operated by the first magnetic drive unit or the second magnetic drive unit, separate drive units for operating the lock part and the portion to be locked are not necessary.

Fourteenth, in the above-described blade opening and closing device, it is desirable that the first drive lever and the second drive lever are made rotatable, a rotation shaft of the first magnet and a rotation shaft of the first drive lever are caused to coincide, and a rotation shaft of the second magnet and a rotation shaft of the second drive lever are caused to coincide.

Thereby, the magnet and the drive lever are arranged side by side in the axial direction of the rotation shaft.

Fifteenth, in the above-described blade opening and closing device, it is desirable that the first drive lever is fixed to the first magnet, and the second drive lever is fixed to the second magnet.

Thereby, the magnet and the drive lever are rotated about the same rotation shaft as a fulcrum.

Sixteenth, in the above-described blade opening and closing device, it is desirable that the first opening and closing blade and the second opening and closing blade are moved between an open position where the opening is opened and a closed position where the opening is closed, and locked states of the first opening and closing blade and the second opening and closing blade are respectively set at the open position and the closed position.

Thereby, the first opening and closing blade and the second opening and closing blade are locked at two positions of the open position and the closed position by the single mechanism including the lock part and the portion to be locked.

Seventeenth, in the above-described blade opening and closing device, it is desirable that a first engagement portion engaged with the first lock lever or the second lock lever in a state of opening the opening, and a second engagement portion engaged with the first lock lever or the second lock lever in a state of closing the opening are formed in the portion to be locked.

Thereby, the two engagement portions for locking the portion to be locked at two positions are formed.

Eighteenth, in the above-described blade opening and closing device, it is desirable that the first drive lever and the second drive lever are respectively provided with engagement pieces functioning as the portions to be locked, and both edges of the engagement piece are respectively formed as the first engagement portion and the second engagement portion.

Thereby, the lock part is engaged with the both edges of the engagement piece and the drive levers are locked at two positions.

Nineteenth, in the above-described blade opening and closing device, it is desirable that the first drive lever and the second drive lever are respectively provided with power assist springs that provide energizing forces in operation directions of the first drive lever and the second drive lever.

Thereby, a torque in a predetermined rotation direction is provided by the power assist spring to the drive lever and the magnet.

An imaging apparatus according to an embodiment of the present technology includes a blade opening and closing device configured to control light taken into an inside via an optical system and an imaging element configured to photoelectrically convert the light taken in via the optical system, the blade opening and closing device includes: a first magnetic drive unit including a first coil to which a drive current is supplied and a first magnet rotated with electric conduction to the first coil; a second magnetic drive unit including a second coil to which a drive current is supplied and a second magnet rotated with electric conduction to the second coil; a first drive lever operated by the first magnetic drive unit; a second drive lever operated by the second magnetic drive unit; a first opening and closing blade that opens and closes an opening by an operation of the first drive lever; a second opening and closing blade that opens and closes the opening by an operation of the second drive lever; a first lock mechanism that locks the first drive lever at a predetermined position; and a second lock mechanism that locks the second drive lever at a predetermined position, and at least a part of the first lock mechanism and at least a part of the second lock mechanism are located between the first magnetic drive unit and the second magnetic drive unit.

Thereby, in the blade opening and closing device, at least a part of the first lock mechanism and at least a part of the second lock mechanism are located between the first magnetic drive unit and the second magnetic drive unit, and the first magnetic drive unit and the second magnetic drive unit are located on an opposite side across at least a part of the first lock mechanism and at least a part of the second lock mechanism.

Effects of the Invention

According to the present technology, since at least a part of the first lock mechanism and at least a part of the second lock mechanism are located between the first magnetic drive unit and the second magnetic drive unit, and the first magnetic drive unit and the second magnetic drive unit are located on an opposite side across at least a part of the first lock mechanism and at least a part of the second lock mechanism, the influence of the magnetic flux generated in one magnetic drive unit on the other magnetic drive unit can be decreased while securing downsizing of the device and apparatus.

Note that the effects described in the present specification are merely examples and are not limited, and other effects may be exhibited.

BRIEF DESCRIPTION OF DRAWINGS

FIG. 14 is an enlarged perspective view illustrating a magnet and the like.

FIG. 16 is an enlarged cross-sectional view illustrating a configuration of a part of the magnetic drive units and the like.

FIG. 21 is an enlarged perspective view illustrating a power assist spring, a force amount adjusting part, an effective range adjusting part, and the like.

FIG. 22 is a back view illustrating an arrangement state of the first magnetic drive unit, the second magnetic drive unit, and the like.

MODE FOR CARRYING OUT THE INVENTION

Hereinafter, modes for implementing the present technology will be described with reference to the accompanying drawings.

In an embodiment described below, an imaging apparatus of the present technology is applied to a still camera, and a blade opening and closing device of the present technology is applied to a focal plane shutter provided in the still camera.

Note that the scope of application of the present technology is not limited to a still camera and a focal plane shutter provided in the still camera. For example, the present technology can be widely applied to various imaging apparatuses incorporated in video cameras or other devices and various blade opening and closing devices such as irises provided in these imaging apparatuses.

In the following description, front-rear, right-left, and up-down directions are indicated according to a direction viewed from a photographer at the time of capturing an image with the still camera. Therefore, an object side is the front and the photographer side is the rear.

Note that the front-rear, up-down, and right-left directions described below are for convenience of description, and implementation of the present technology is not limited to these directions.

Furthermore, a lens group described below may include a single lens or a plurality of lenses and other optical elements such as an iris, in addition to a group configured by a single lens or a plurality of lenses.

<Schematic Configuration of Imaging Apparatus>

First, a schematic configuration of an imaging apparatus will be described (see FIGS. 1 to 3).

Figure 1:
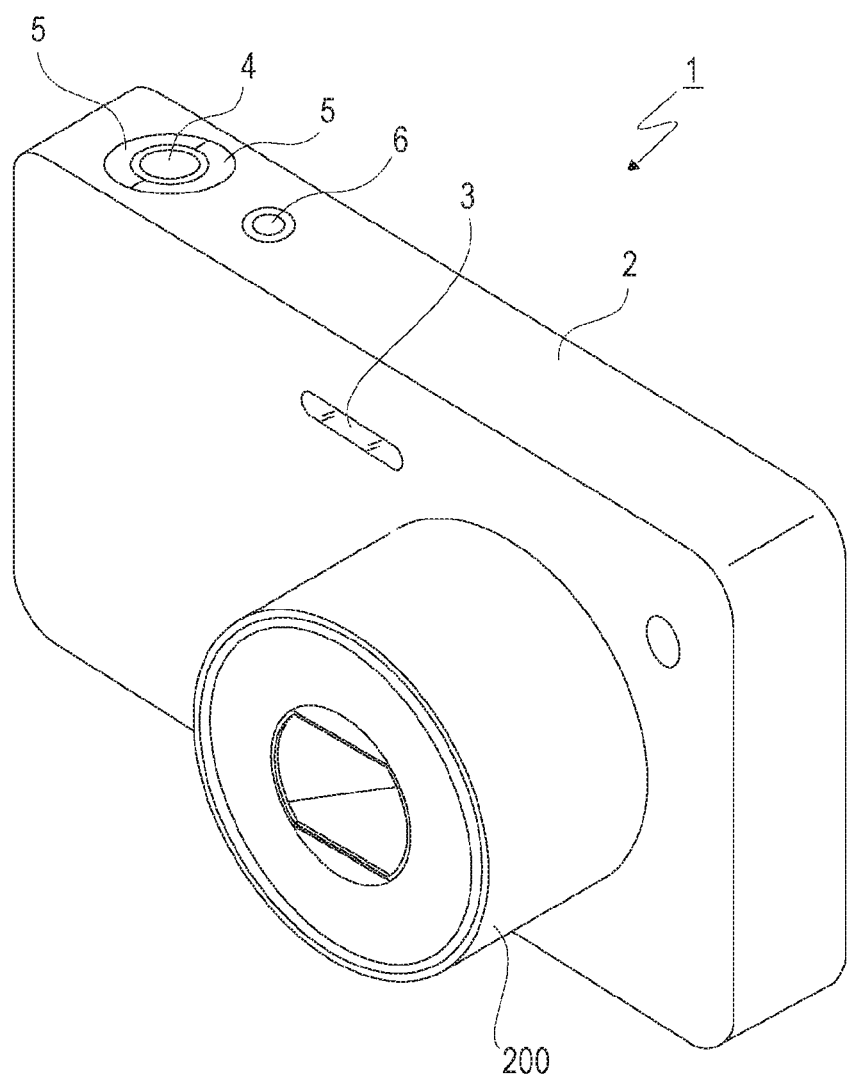
FIG. 1 illustrates an embodiment of a blade opening and closing device and an imaging apparatus according to the present technology together with FIGS. 2 to 46, and is a perspective view illustrating the imaging apparatus.
Figure 2:
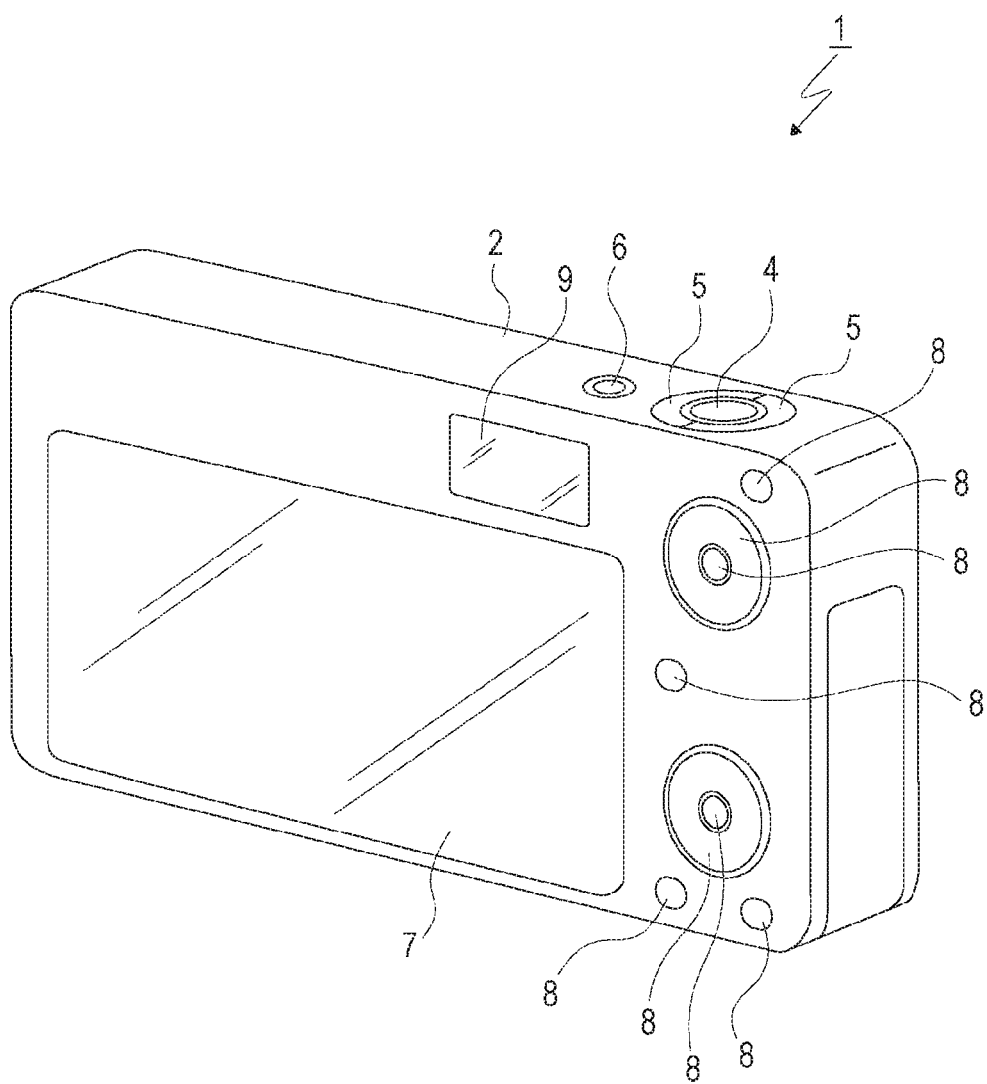
FIG. 2 is a perspective view illustrating the imaging apparatus in a state of being viewed from a different direction from FIG. 1.

An imaging apparatus 1 is configured such that, for example, required parts are arranged inside and outside a flat and oblong housing 2, as illustrated in FIGS. 1 and 2. As illustrated in FIG. 1, the imaging apparatus 1 may be an apparatus to and from which an interchangeable lens 200 can be attached and detached.

A flash 3 is provided on a front surface of the housing 2. A shutter button 4, a zoom switch 5, and a power button 6 are provided on an upper surface of the housing 2 (see FIGS. 1 and 2). A display 7, various operation units 8, 8, and the like, a finder 9 are provided on a read surface of the housing 2.

Figure 3:
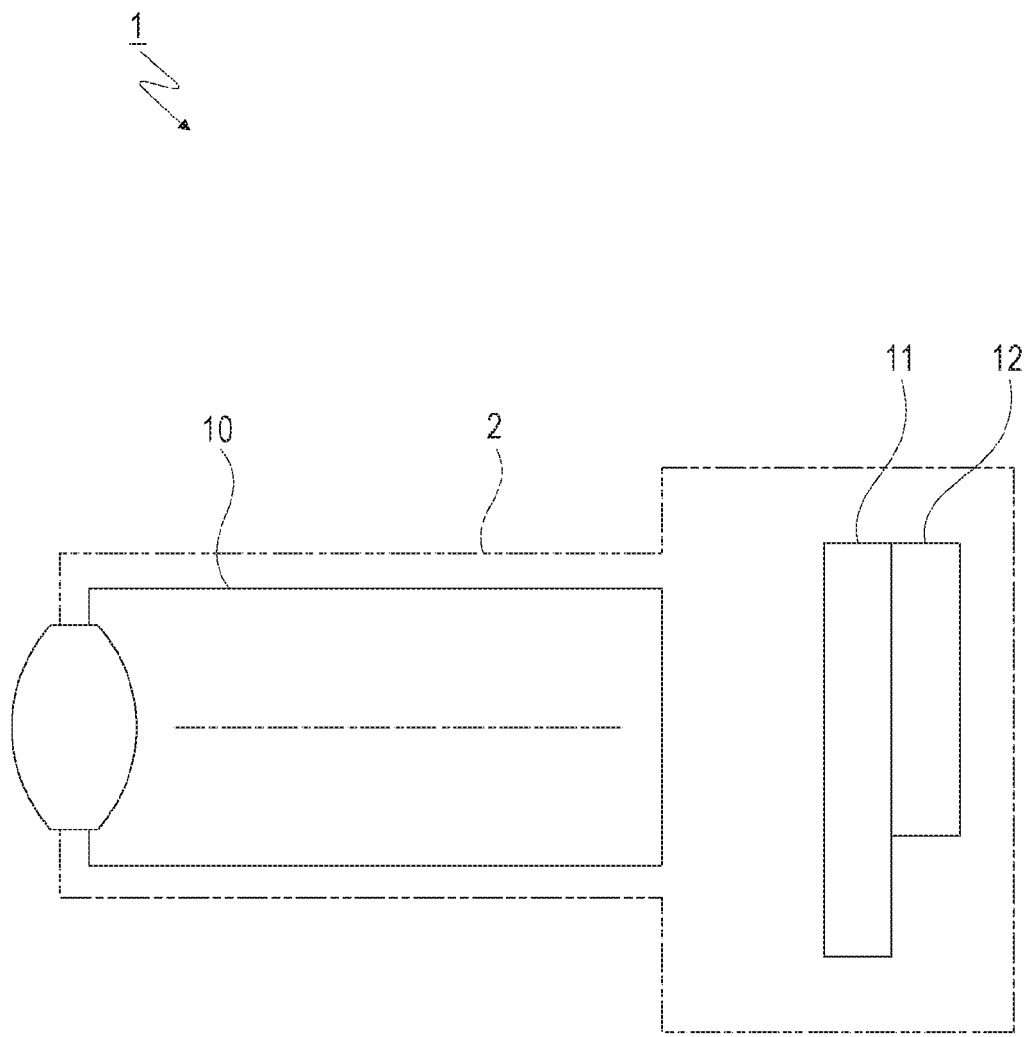
FIG. 3 is a schematic side view of the imaging apparatus.

Inside the housing 2, as illustrated in FIG. 3, an optical system 10 including a lens group, an optical element, and the like, a blade opening and closing device (focal plane shutter) 11 for controlling the amount of light taken in by the optical system 10, and an imaging element 12 for photoelectrically converting the light taken in via the blade opening and closing device 11 are arranged in order from the front side.

<Configuration of Blade Opening and Closing Device>

Hereinafter, a configuration of the blade opening and closing device 11 will be described (see FIGS. 4 to 27).

Figure 4:
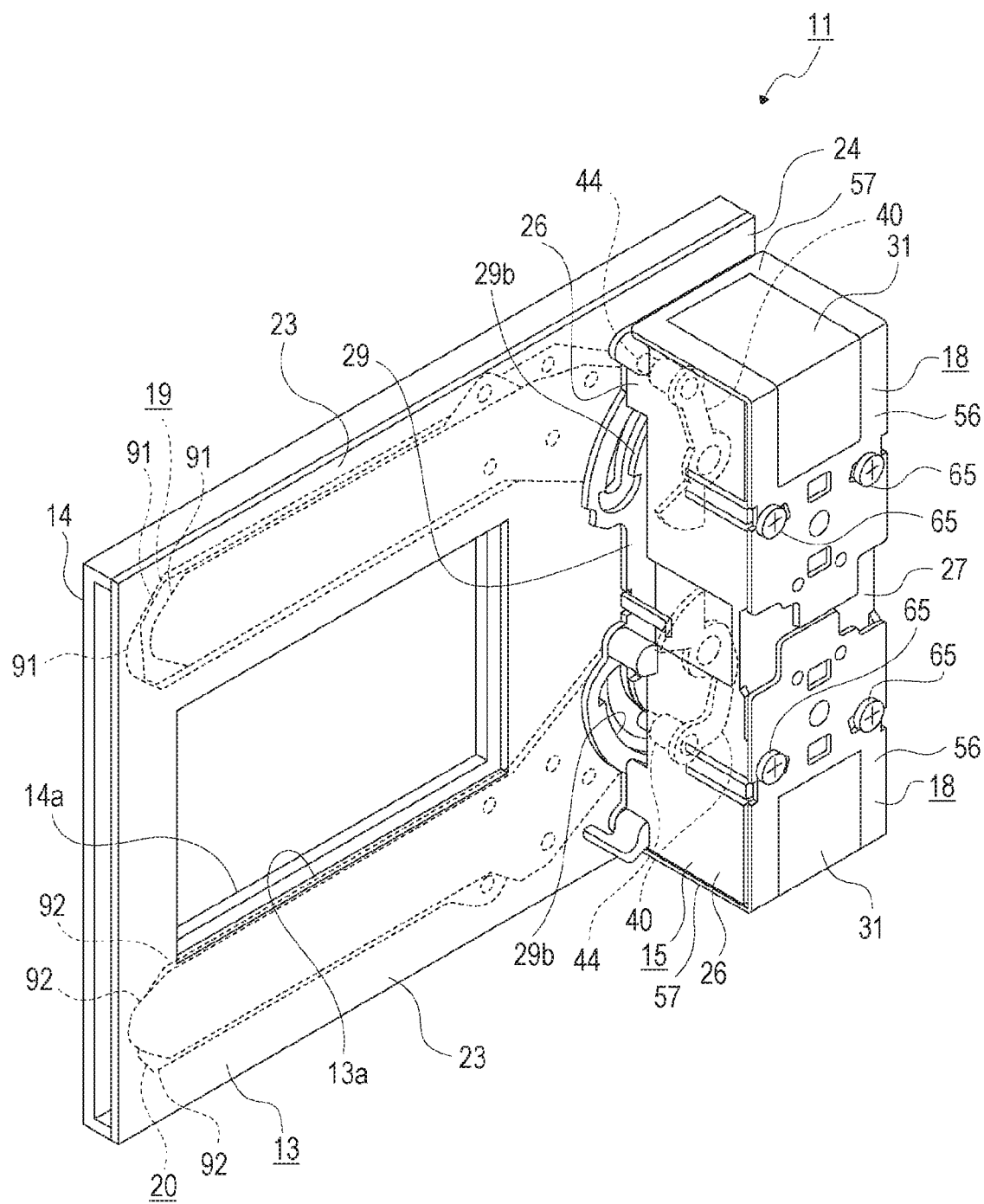
FIG. 4 is a perspective view of the blade opening and closing device.
Figure 5:
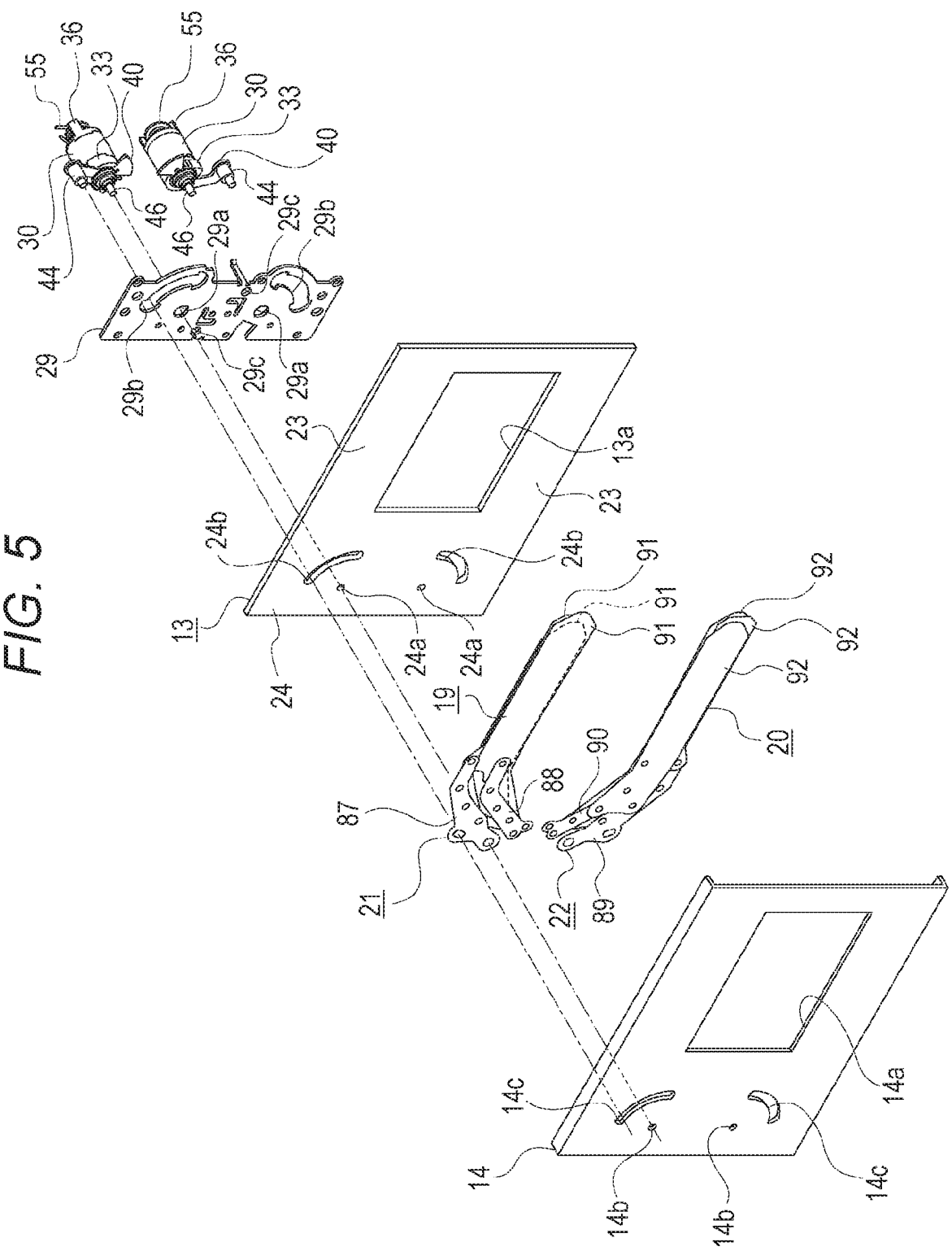
FIG. 5 is an exploded perspective view illustrating a part of the blade opening and closing device.
Figure 6:
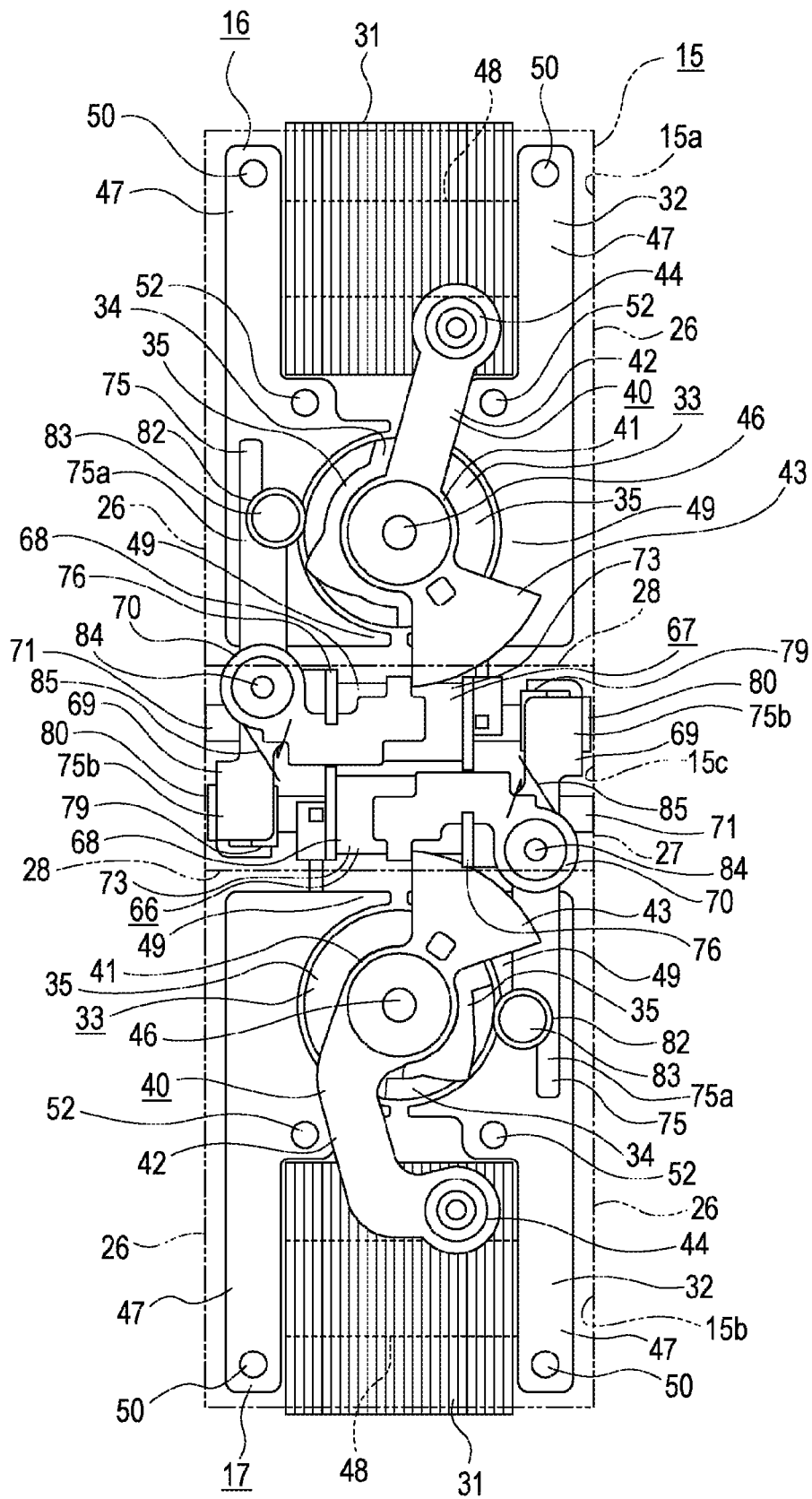
FIG. 6 is a front view illustrating an arrangement state of a first magnetic drive unit, a second magnetic drive unit, a first lock mechanism, and a second lock mechanism.
Figure 7:
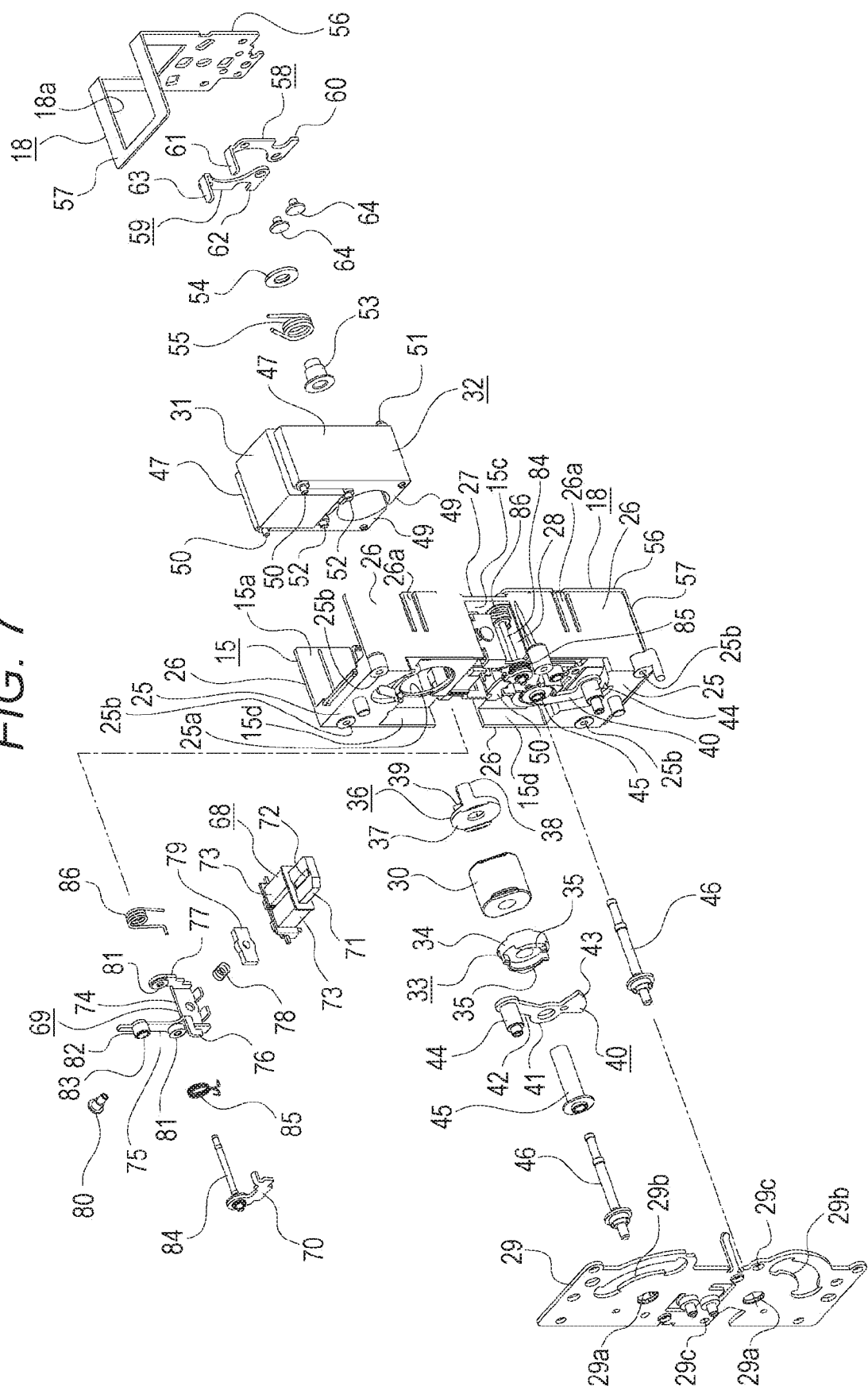
FIG. 7 is an exploded perspective view illustrating a configuration of the blade opening and closing device excluding a part of the blade opening and closing device.
Figure 8:
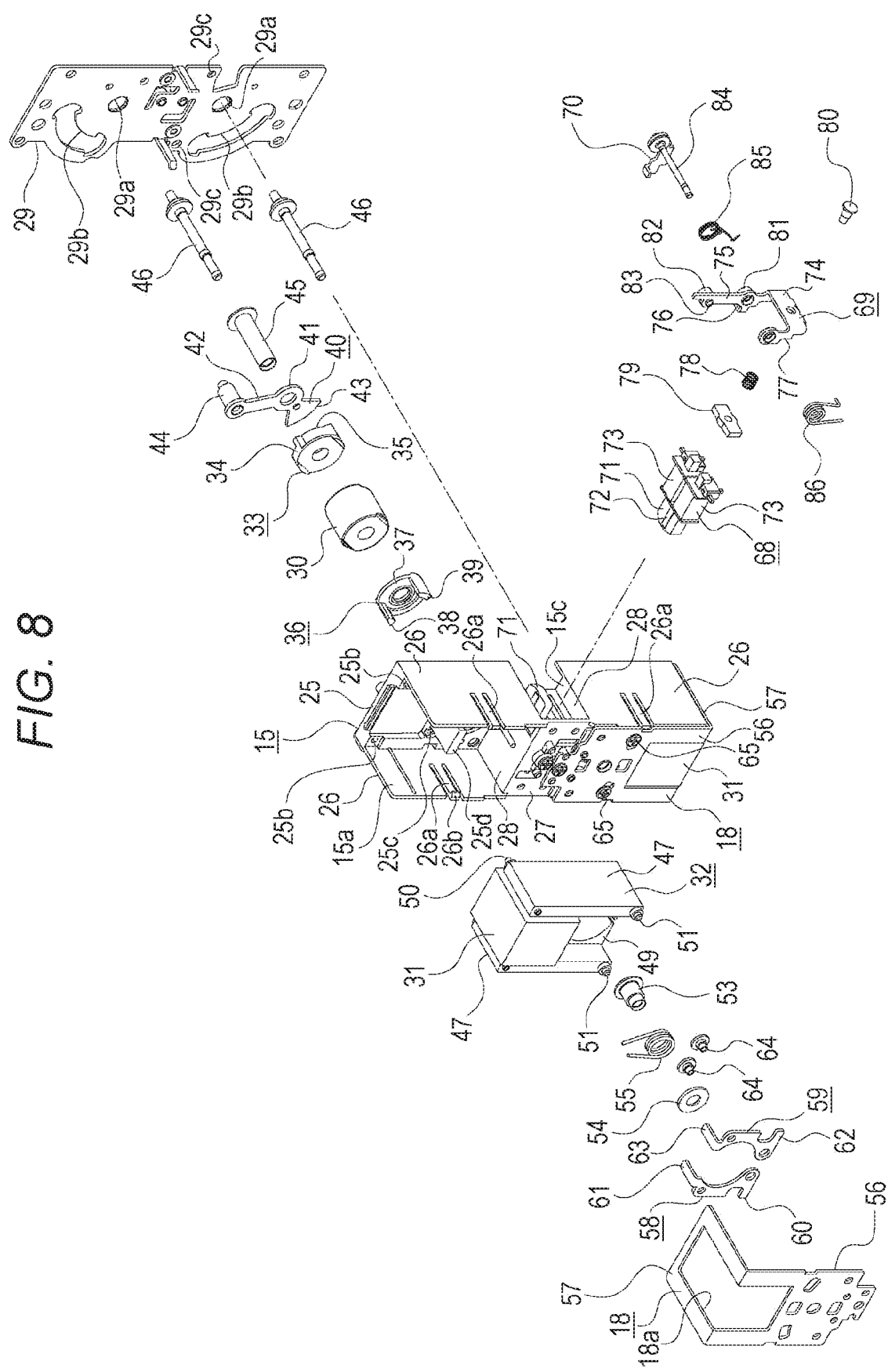
FIG. 8 is an exploded perspective view illustrating a configuration of the blade opening and closing device excluding a part of the blade opening and closing device, in a state of being viewed from a different direction from FIG. 7.

The blade opening and closing device 11 includes, as illustrated in FIGS. 4 to 6, a base body 13, a pressing plate 14, a housing case 15, a first magnetic drive unit 16, a second magnetic drive unit 17, covers 18 and 18, a first opening and closing blade 19, a second opening and closing blade 20, a first link 21, and a second link 22, and is arranged on a front surface side of the imaging element 12.

The base body 13 is formed in, for example, an oblong rectangular shape and has a rectangular opening 13a penetrating in the front-rear direction (see FIGS. 4 and 5). The opening 13a is made slightly larger than an effective incident region of light in an imaging surface of the imaging element 12. The effective incident region of light on the imaging surface is a region where light taken in by the optical system 10 and necessary for generating an image enters.

Upper and lower portions of the opening 13a in the base body 13 are respectively provided as holding portions 23 and 23 serving as holding regions where the first opening and closing blade 19 and the second opening and closing blade 20 are held at open positions. One portion of side portions of the opening 13a in the base body 13 is provided as a mounting portion 24 to which the housing case 15 is mounted.

Shaft insertion holes 24a and 24a are formed spaced in the up-down direction in the mounting portion 24. Shaft moving holes 24b and 24b are formed spaced in the up-down direction in the mounting portion 24, and the shaft moving holes 24b and 24b are respectively formed in arc shapes with the shaft insertion holes 24a and 24a as fulcrums.

The pressing plate 14 is formed in approximately the same size and shape as the base body 13, and has a transmission hole 14a. The pressing plate 14 is mounted to the base body 13 from the front side with the first opening and closing blade 19 and the second opening and closing blade 20 sandwiched therebetween. In the state where the pressing plate 14 is mounted to the base body 13, the transmission hole 14a is located right in front of the opening 13a.

Pin mounting holes 14b and 14b are formed spaced in the up-down direction in one end portion of a side portion of the pressing plate 14. Clearance holes 14c and 14c are formed spaced in the up-down direction in the pressing plate 14, and the clearance holes 14c and 14c are respectively formed in arc shapes with the pin mounting holes 14b and 14b as fulcrums.

The housing case 15 contains a nonmagnetic material such as a resin material, and has front surfaces 25 and 25, side surfaces 26, 26, and the like, a connecting surface 27, and partitions 28 and 28 (see FIGS. 7 to 11).

The front surfaces 25 and 25 are located spaced in the up-down direction, and the side surfaces 26, 26, and the like have front edges respectively continuous with right and left side edges of the front surfaces 25 and 25. The connecting surface 27 faces in the front-rear direction and has up and down edges respectively continuous with rear end portions in lower edges of the upper side surfaces 26 and 26 and rear end portions in upper edges of the lower side surfaces 26 and 26. The partitions 28 and 28 are formed in plate shapes facing the up-down direction, and have rear edges respectively continuous with upper and lower edges of the connecting surface 27. The partitions 28 and 28 have right and left side edges respectively continuous with the lower edges of the upper side surfaces 26 and 26 and the upper edges of the lower side surfaces 26 and 26, and have front edges respectively continuous with a lower edge of the upper front surface 25 and an upper edge of the lower front surface 25.

Figure 11:
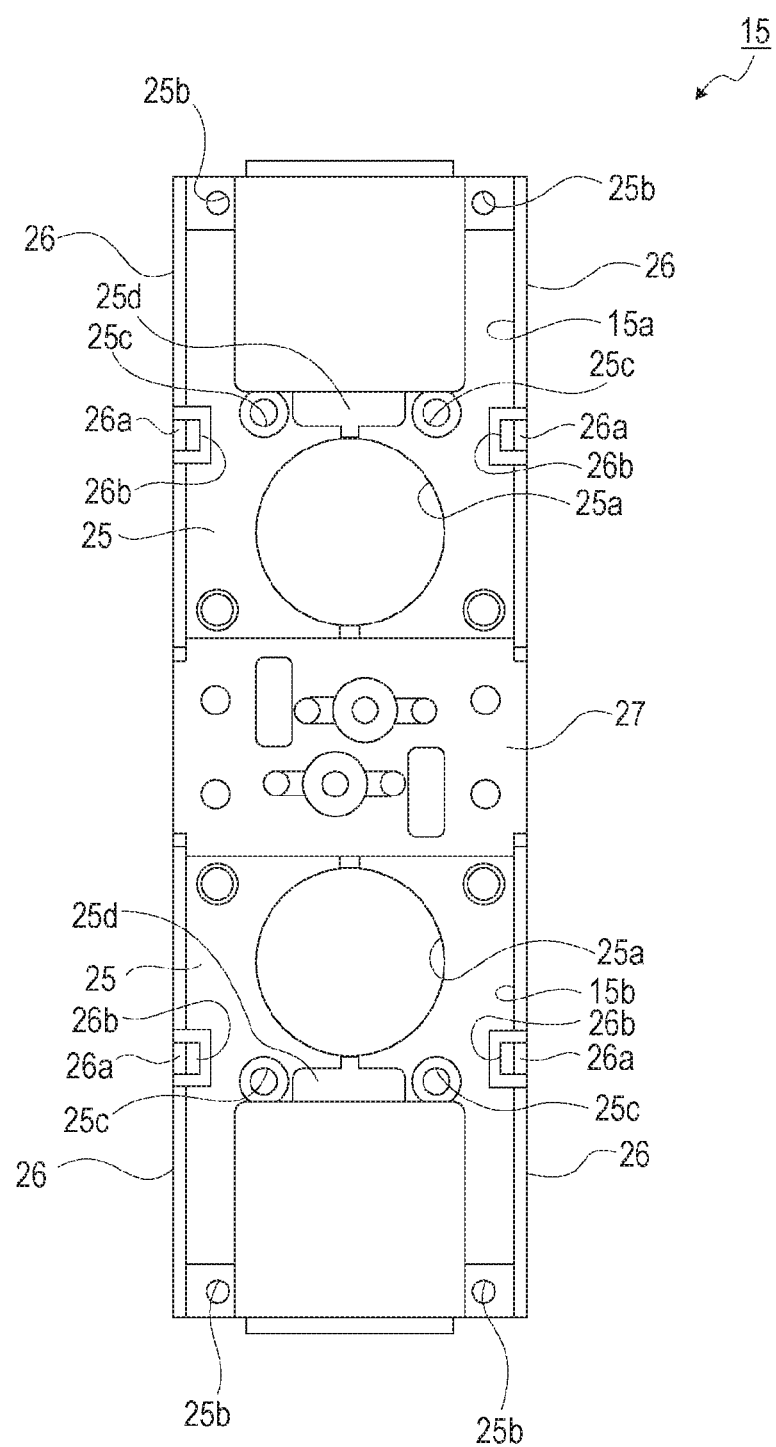
FIG. 11 is a front view of the housing case.

The housing case 15 is divided into three parts in the up-down direction by the partitions 28 and 28, and is formed in a symmetrical shape in the up-down direction with respect to the center of the connecting surface 27 in the up-down direction (see FIG. 11). In the housing case 15, an upper space partitioned by the upper partition 28 is formed as a first arrangement portion 15a, a lower space partitioned by the lower partition 28 is formed as a second arrangement portion 15b, and a space between the partitions 28 and 28 is formed as a third arrangement portion 15c. The first arrangement portion 15a is opened rearward and upward, the second arrangement portion 15b is opened backward and downward, and the third arrangement portion 15c is opened backward and the right and left.

Note that, in the blade opening and closing device 11, the housing case 15 is formed in a symmetrical shape in the up-down direction, and the two magnetic drive units to be described below arranged in the first arrangement portion 15a and the second arrangement portion 15b are also symmetrically configured in the up-down direction. Therefore, hereinafter, the configuration on the first arrangement portion 15a side will be mainly described, and the configuration on the second arrangement portion 15b side will be described as needed.

A portion on the third arrangement portion 15c side of the front surface 25 is displaced rearward and located (see FIG.

9). A part is displaced rearward and located in this manner, so that an arrangement recess 15d open at least forward is formed in the front surface 25.

Figure 9:
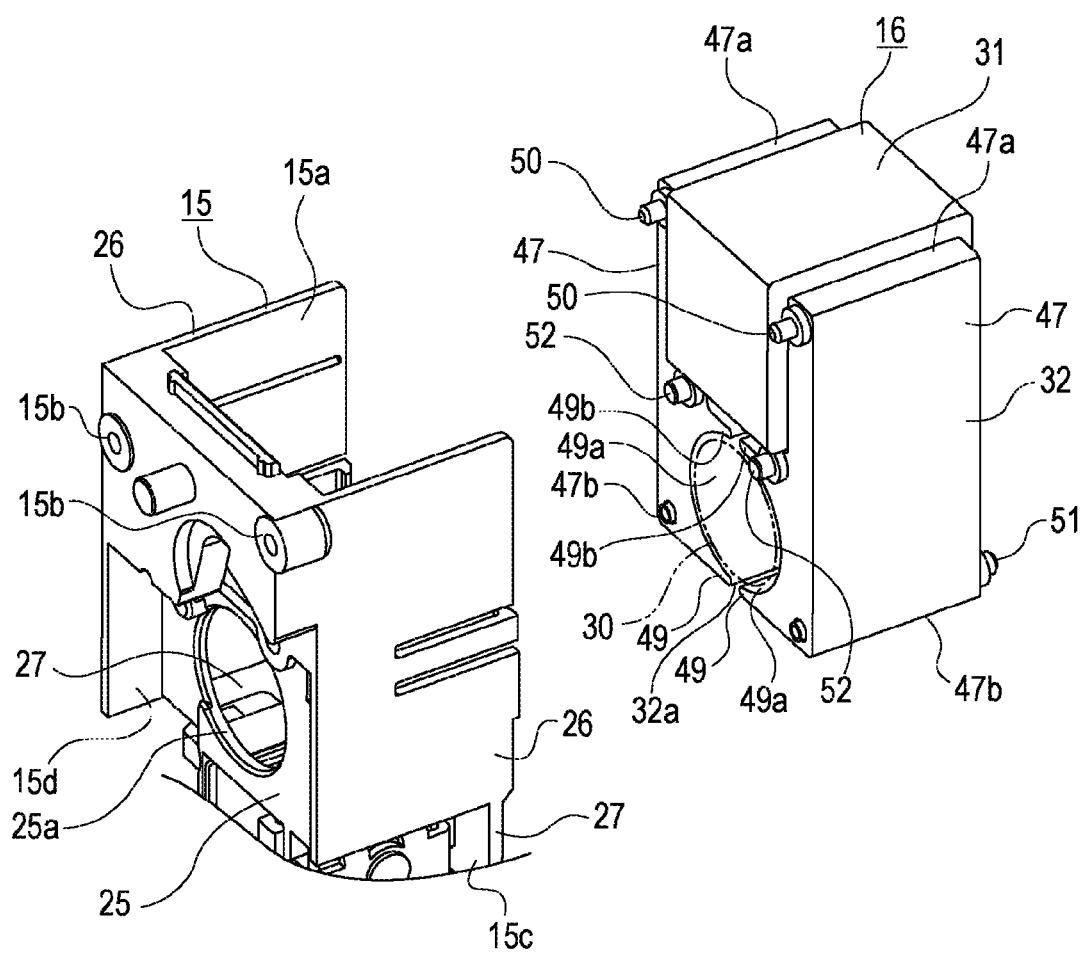
FIG. 9 is an enlarged exploded perspective view illustrating a part of a housing case and one of the magnetic drive units.
Figure 10:
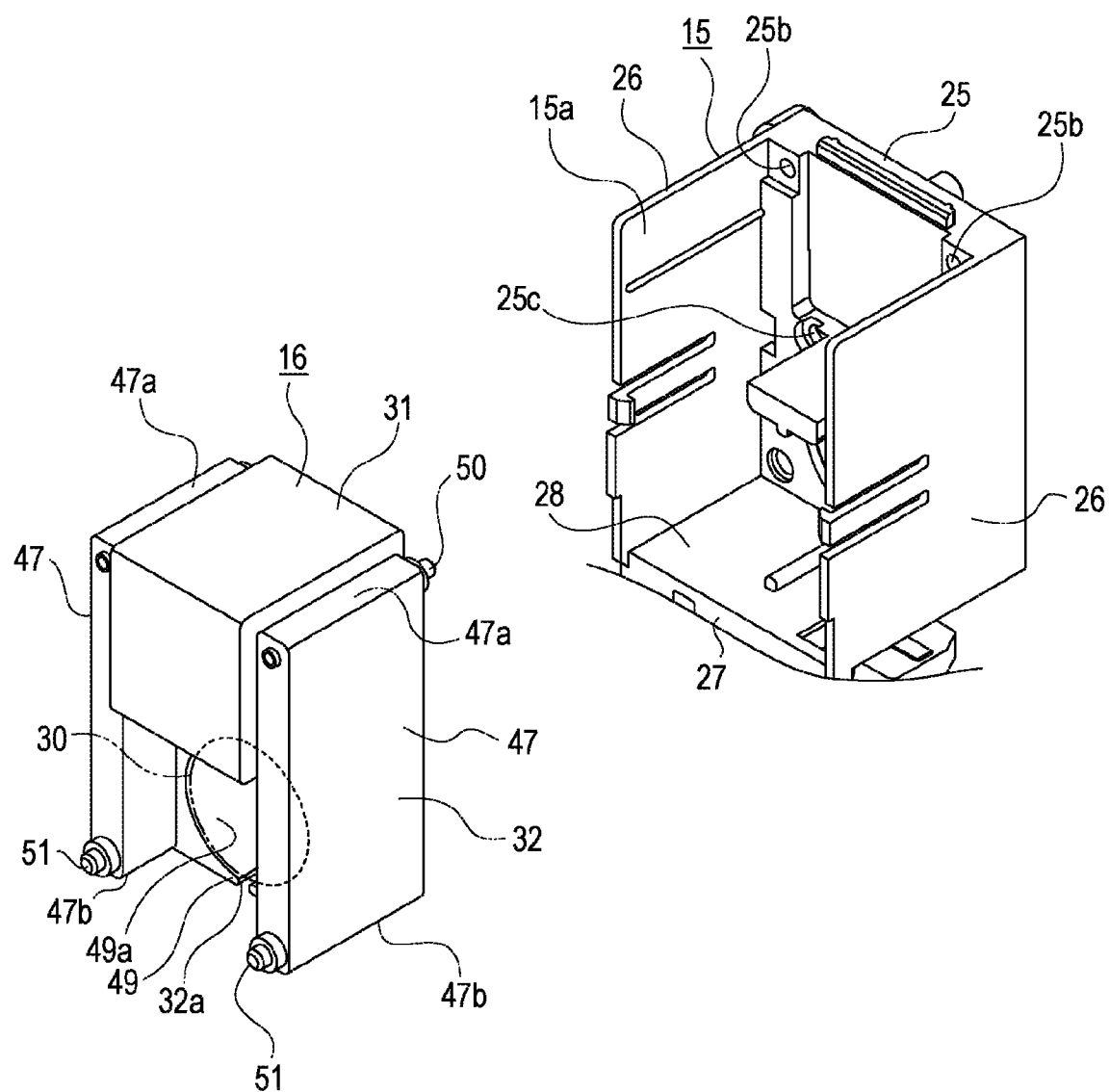
FIG. 10 is an enlarged exploded perspective view illustrating a part of the housing case and one of the magnetic drive units, in a state of being viewed from a different direction from FIG. 9.

An insertion hole 25a penetrating in the front-rear direction is formed in the portion of the front surface 25, where the arrangement recess 15d is formed, and the insertion hole 25a communicates with the first arrangement portion 15a. In the front surface 25, as illustrated in FIGS. 9 to 11, first positioning holes 25b and 25b are formed spaced in the right-left direction in an upper end portion, and second positioning holes 25c and 25c are formed spaced in the right-left direction in an approximate center in the up-down direction.

An insertion protrusion 25d protrudes rearward from an approximate center of the front surface 25. A part of the side surface 26 is provided as an engaging protrusion 26a. The engaging protrusion 26a is provided between two slits spaced in the up-down direction, and is elastically deformable such that a rear end portion is displaced in the right-left direction. A rear end portion of the engaging protrusion 26a is provided as a locking claw 26b.

A support plate 29 is mounted to the mounting portion 24 of the base body 13 from the rear side (see FIGS. 4 and 5). First shaft insertion holes 29a and 29a and second shaft insertion holes 29b and 29b are formed spaced in the up-down direction in the support plate 29 (see FIGS. 7 and 8). The second shaft insertion holes 29b and 29b are formed in arc shapes with the first shaft insertion holes 29a and 29a as fulcrums. Bearing holes 29c and 29c are formed in an approximate center in the up-down direction in the support plate 29. The bearing holes 29c and 29c are located in right and left end portions.

In the state where the support plate 29 is mounted to the mounting portion 24 of the base body 13, the first shaft insertion holes 29a and 29a are respectively located right behind the shaft insertion holes 24a and 24a of the base body 13, and the second shaft insertion holes 29b and 29b are respectively located right behind the shaft moving holes 24b and 24b of the base body 13.

The housing case 15 is mounted to the support plate 29 from the rear side (see FIG. 4). In the state where the housing case 15 is mounted to the support plate 29, the insertion holes 25a and 25a of the housing case 15 are respectively located on the rear side of the first shaft insertion holes 29a and 29a of the support plate 29.

The first magnetic drive unit 16 includes a magnet 30, a coil 31, and a yoke 32, and is arranged in the first arrangement portion 15a of the housing case 15 (see FIGS. 6 and 9).

The magnet 30 is formed in an approximately cylindrical shape with an axial direction set to the front-rear direction, and is, for example, two-pole magnetized. First positioning notches 30a and 30a are formed spaced in a peripheral direction in an outer periphery in a front end portion of the magnet 30 (see FIGS. 12 and 13). Second positioning notches 30b and 30b are formed spaced in the peripheral direction in an outer periphery in a rear end portion of the magnet 30.

A lever mounting member 33 is attached to a front surface of the magnet 30 (see FIGS. 12 to 15). The lever mounting member 33 has a base 34 formed in an approximately annular shape and protrusions 35 and 35 protruding forward from an outer periphery of the base 34.

Positioning protrusions 34a and 34a protruding rearward are provided spaced in the peripheral direction in an outer periphery in a rear end portion of the base 34. A pressing protrusion 34b protruding outward is provided on an outer peripheral surface of the base 34. A space inside the protrusions 35 and 35 in the lever mounting member 33 is formed as a mounting space 33a.

The lever mounting member 33 is mounted to the magnet 30 in a state where the positioning protrusions 34a and 34a are respectively inserted and positioned in the first positioning notches 30a and 30a.

A spring bearing member 36 is mounted to a rear surface of the magnet 30. The spring bearing member 36 has a base 37 formed in an approximately annular shape, and a first spring bearing protrusion 38 and a second spring bearing protrusion 39 protruding rearward from an outer periphery of the base 37.

Positioning protrusions 37a and 37a protruding forward are provided spaced in the peripheral direction in an outer periphery in a front end portion of the base 37. The first spring bearing protrusion 38 and the second spring bearing protrusion 39 are formed in approximately arc shapes, and are provided spaced in the peripheral direction. One end edges on the same side in the peripheral direction of the first spring bearing protrusion 38 and the second spring bearing protrusion 39 are respectively formed as a first spring bearing edge 38a and a second spring bearing edge 39a.

The spring bearing member 36 is mounted to the magnet 30 in a state where the positioning protrusions 37a and 37a are respectively inserted and positioned in the second positioning notches 30b and 30b.

A drive lever 40 is mounted to the lever mounting member 33. The drive lever 40 is formed such that a connecting plate 41 formed in an annular shape, an arm plate 42 radially protruding from the connecting plate 41, and an engagement piece 43 protruding from the connecting plate 41 in a radial direction different from the arm plate 42 are integrally formed.

A connecting shaft 44 is mounted to a distal end portion of the arm plate 42, and the connecting shaft 44 protrudes forward from the arm plate 42. The engagement piece 43 is formed in an approximate fan shape, and both side edges in the peripheral direction are respectively formed as a first engagement portion 43a and a second engagement portion 43b, and an outer peripheral edge between the first engagement portion 43a and the second engagement portion 43b is formed as a sliding portion 43c. The engagement piece 43 functions as a portion to be locked.

The drive lever 40 is mounted to the lever mounting member 33 in a state where a portion including the connecting plate 41 is inserted in the mounting space 33a, and the arm plate 42 and the engagement piece 43 protrude outward from an outer periphery of the lever mounting member 33.

Figure 12:
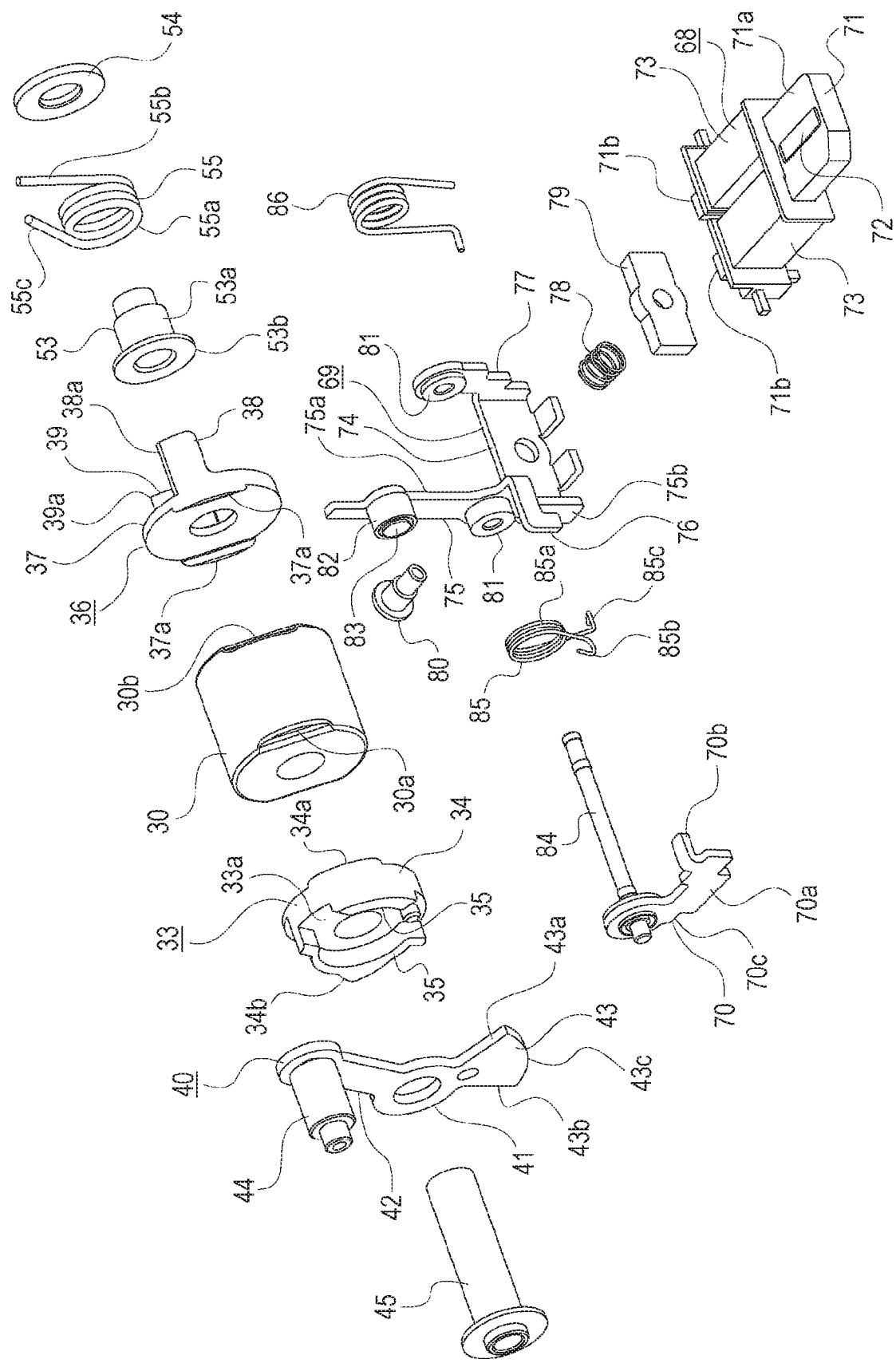
FIG. 12 is an exploded perspective view illustrating the magnetic drive units and the lock mechanisms.
Figure 13:
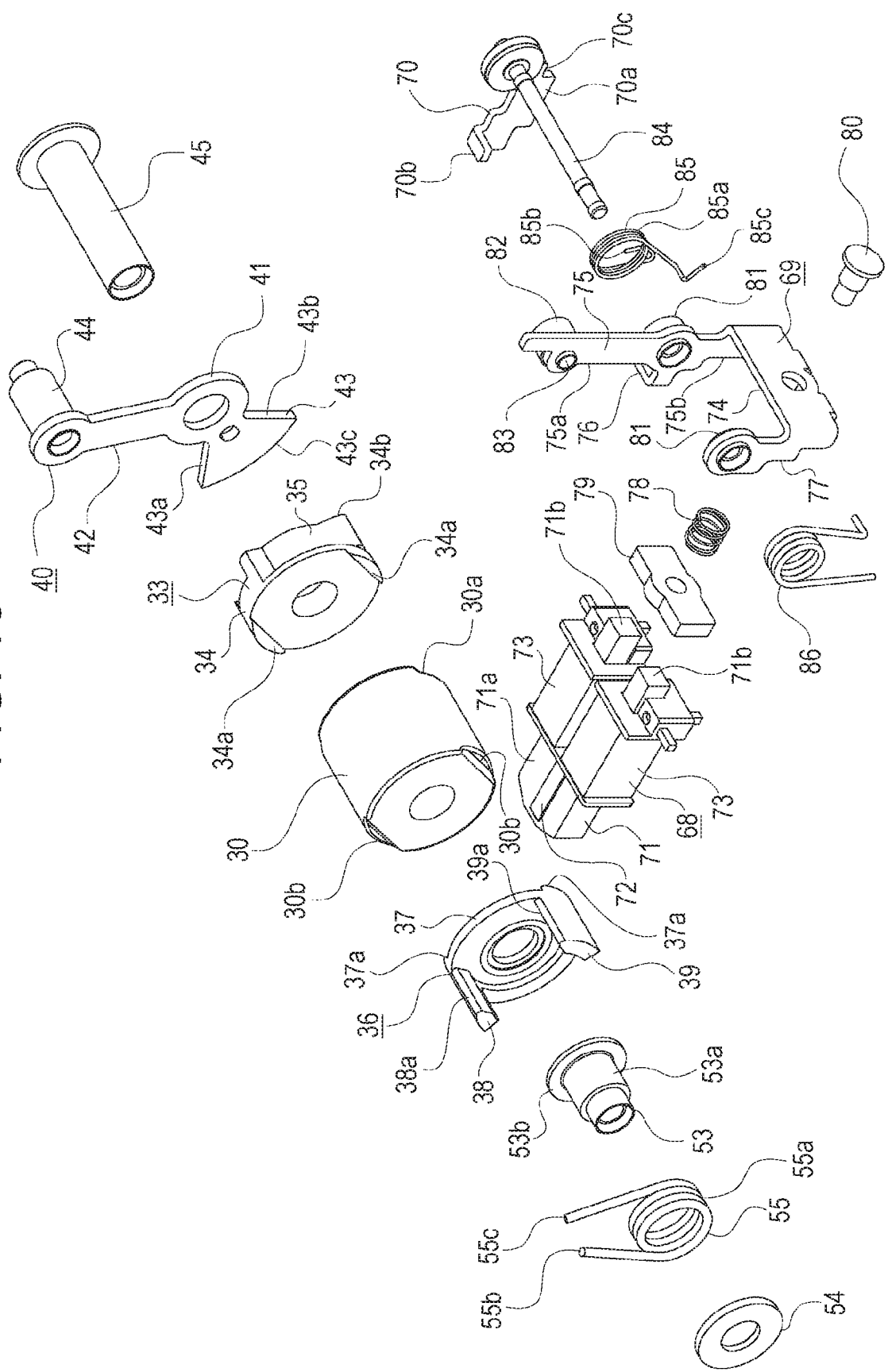
FIG. 13 is an exploded perspective view illustrating the magnetic drive units and the lock mechanisms in a state of being viewed from a different direction from FIG. 12.
Figure 14:
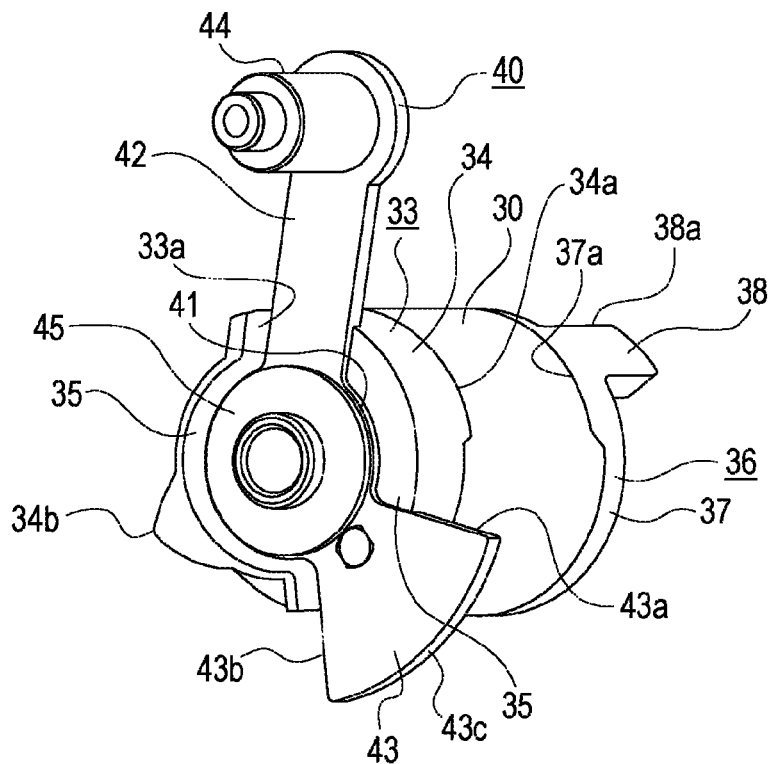
Figure 15:
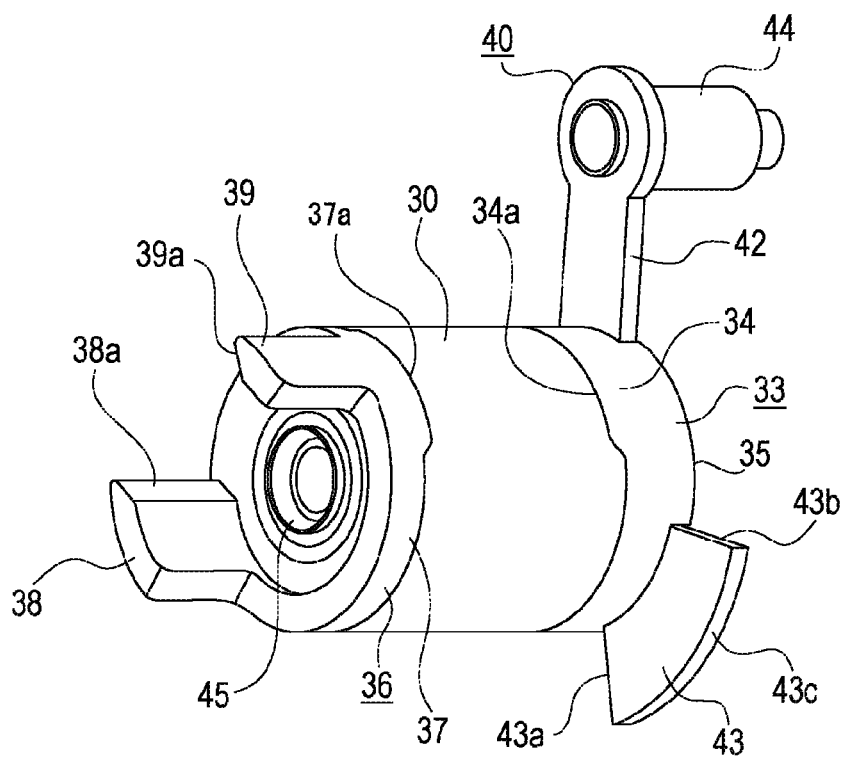
FIG. 15 is an enlarged perspective view illustrating the magnet and the like in a state of being viewed from a different direction from FIG. 14.
Figure 16:
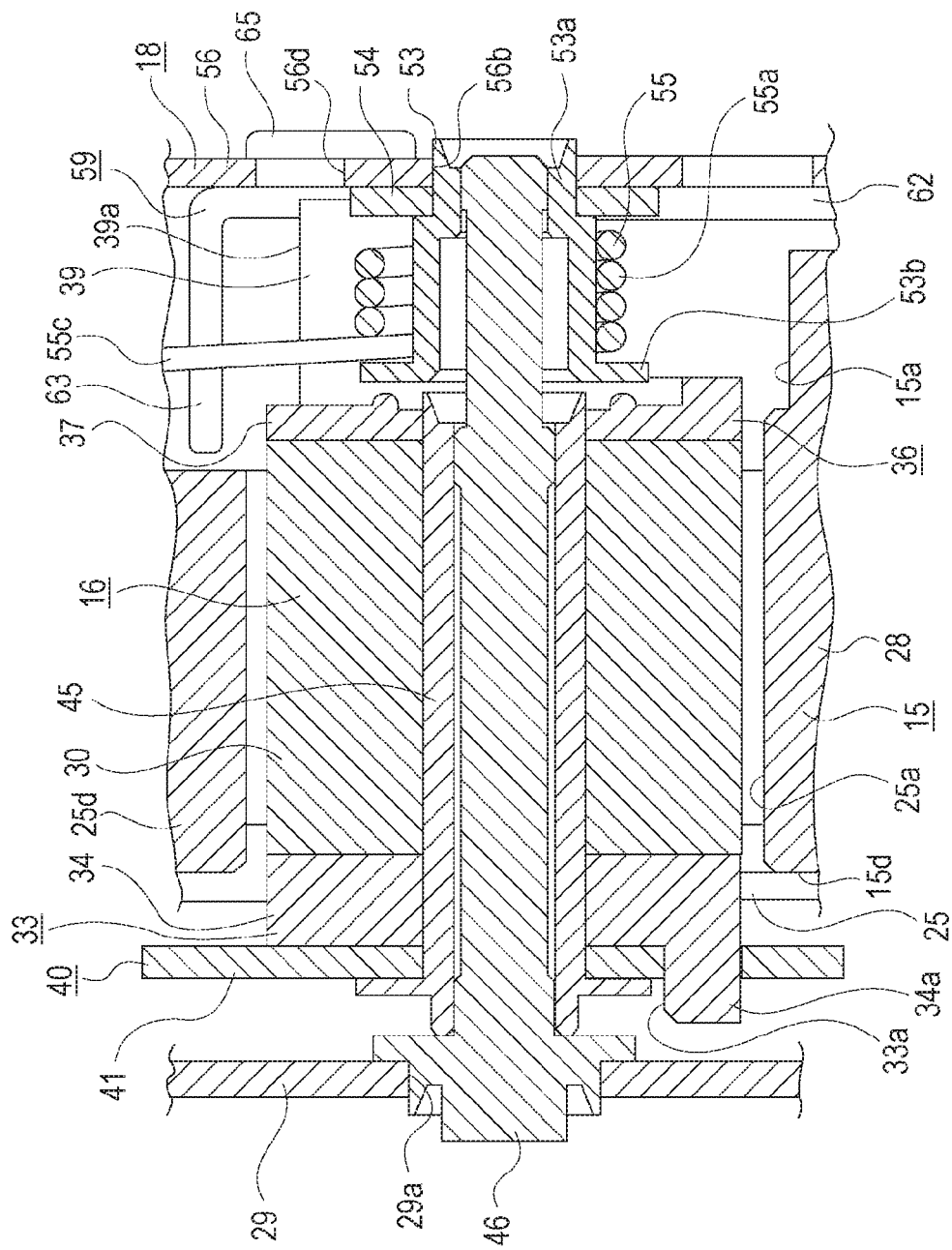

A bearing sleeve 45 is inserted into and fixed to a central portion of the connecting plate 41 of the drive lever 40, a central portion of the lever mounting member 33, a central portion of the magnet 30, and a central portion of the spring bearing member 36 (see FIGS. 12, 13, and 16). A rotation shaft 46 is inserted into the bearing sleeve 45, and the drive lever 40, the lever mounting member 33, the magnet 30, the spring bearing member 36, and the bearing sleeve 45 are integrally rotatable about the rotation shaft 46 as a fulcrum (see FIGS. 7, 8, and 16). A portion other than both end portions in the axial direction of the rotation shaft 46 is inserted in the bearing sleeve 45.

The yoke 32 of the first magnetic drive unit 16 includes, as illustrated in FIGS. 9, 10, 17, and 18, connecting parts 47 and 47 located spaced in the right-left direction, a coil mounting part 48 located between the connecting parts 47 and 47, and magnet arranging parts 49 and 49 protruding from the connecting parts 47 and 47 in a direction of approaching each other.

The connecting parts 47 and 47 are formed in a flat plate shape facing the right-left direction, first case-side positioning protrusions 50 and 50 protruding forward are respectively provided on one end portions 47*a* and 47*a* in the up-down direction, and cover-side positioning protrusions 51 and 51 protruding rearward are respectively provided on the other end portions 47*b* and 47*b* in the up-down direction.

The coil mounting part 48 is formed in a prismatic shape, for example, and is provided at a position close to the one end portions 47*a* and 47*a* of the connecting parts 47 and 47. Therefore, the one end portions 47*a* and 47*a* of the connecting parts 47 and 47 are at positions protruding from the coil mounting part 48 in the up-down direction. The coil mounting part 48 is provided at a position where the coil mounting part 48 connects inner portions of front and rear ends of the connecting parts 47 and 47 in the front-rear direction.

The magnet arranging parts 49 and 49 are located spaced in the up-down direction with respect to the coil mounting part 48. Front surfaces of the magnet arranging parts 49 and 49 are located on the same plane as front surfaces of the connecting parts 47 and 47. Facing surfaces of the magnet arranging parts 49 and 49 are formed as concave arcuate surfaces 49*a* and 49*a*.

A gap 32*a* is formed between end edges of the magnet arranging parts 49 and 49 in a protruding direction from the connecting parts 47 and 47. The magnet arranging parts 49 and 49 are provided with protrusions 49*b* and 49*b* protruding from end portions on the connecting parts 47 and 47 sides toward the coil mounting part 48. The protrusions 49*b* and 49*b* are provided with second case-side positioning protrusions 52 and 52 protruding forward.

In the yoke 32, a cross-sectional area A (see FIG. 19) of the connecting part 47 and a cross-sectional area B (see FIG. 20) of the coil mounting part 48 are made approximately the same. The cross-sectional area A and the cross-sectional area B are cross-sectional areas in a direction orthogonal to a direction in which a magnetic flux of the yoke 32 passes.

The coil 31 is mounted to the coil mounting part 48 in an externally fitting manner (see FIGS. 17 to 20). The magnet 30 is inserted between the magnet arranging parts 49 and 49 so that the magnet 30 is rotatable in a direction around the axis (see FIG. 9).

At the electric conduction to the coil 31, a magnetic flux passing through the yoke 32 is generated. As described above, in the yoke 32, the cross-sectional areas A and A of the connecting parts 47 and 47 and the cross-sectional area B of the coil mounting part 48 are made approximately the same, and the magnetic flux passing through the connecting parts 47 and 47 and the coil mounting part 48 is not attenuated. Therefore, performance degradation of the first magnetic drive unit 16 and the second magnetic drive unit 17 can be prevented.

Furthermore, in the yoke 32, the sizes of the connecting parts 47 and 47 are made larger than the size of the coil mounting part 48 in the axial direction (front-rear direction) of the rotation shaft of the magnet 30, and the sizes of the connecting parts 47 and 47 in the orthogonal direction (right-left direction) orthogonal to the arranging direction (up-down direction) of the coil mounting part 48 and the magnet arranging parts 49 and 49 are made smaller than the size of the coil mounting part 49 in the arranging direction.

Therefore, the size of the yoke 32 in the orthogonal direction becomes smaller than that in the case where the sizes of the connecting parts 47 and 47 in the orthogonal direction are made the same as the size of the coil mounting part 48 in the arranging direction, and thus downsizing of the yoke 32 can be achieved in the orthogonal direction. In particular, as described above, after avoiding occurrence of the attenuation of the magnetic flux passing through the connecting parts 47 and 47 and the coil mounting part 48 to prevent the performance degradation of the first magnetic drive unit 16 and the second magnetic drive unit 17 by making the cross-sectional areas A and A of the connecting parts 47 and 47 and the cross-sectional area B of the coil mounting part 48 be approximately the same, the downsizing of the yoke 32 in the orthogonal direction can be achieved.

Note that, as described above, even in the case where the sizes of the connecting parts 47 and 47 are made larger than the size of the coil mounting part 48 in the front-rear direction, and the connecting parts 47 and 47 are provided with the one end portions 47*a* and 47*a* protruding from the coil mounting part 48 in the yoke 32, the external shape of the coil 31 has a fixed size. Therefore, the combined size of the yoke 32 and the coil 31 cannot become unnecessarily large. Therefore, downsizing of the yoke 32 in the right-left direction can be achieved without making the sizes of the yoke 32 in the up-down and front-rear directions large.

Figure 17:
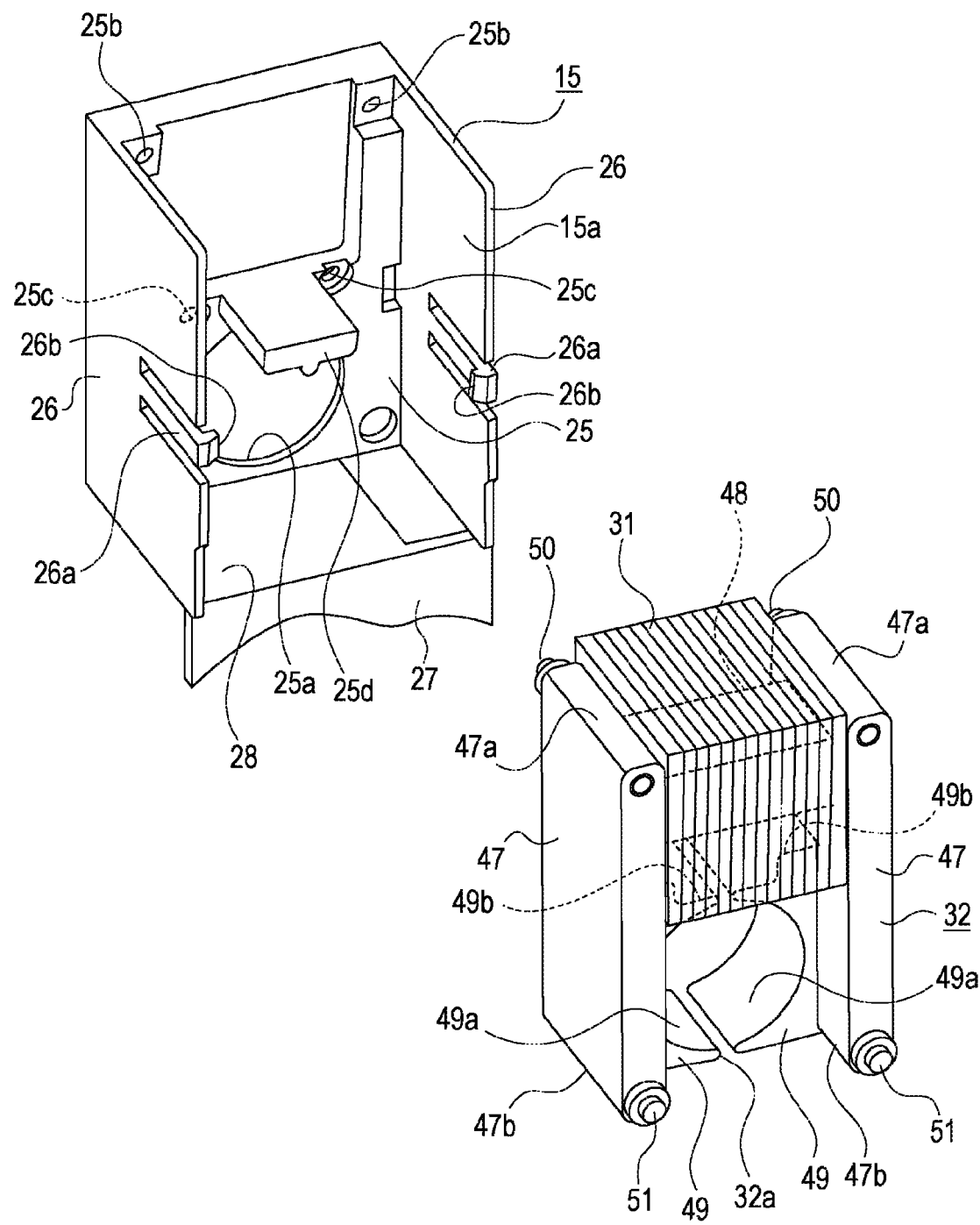
FIG. 17 is an enlarged exploded perspective view illustrating a part of the housing case and a part of one of the magnetic drive units.
Figure 18:
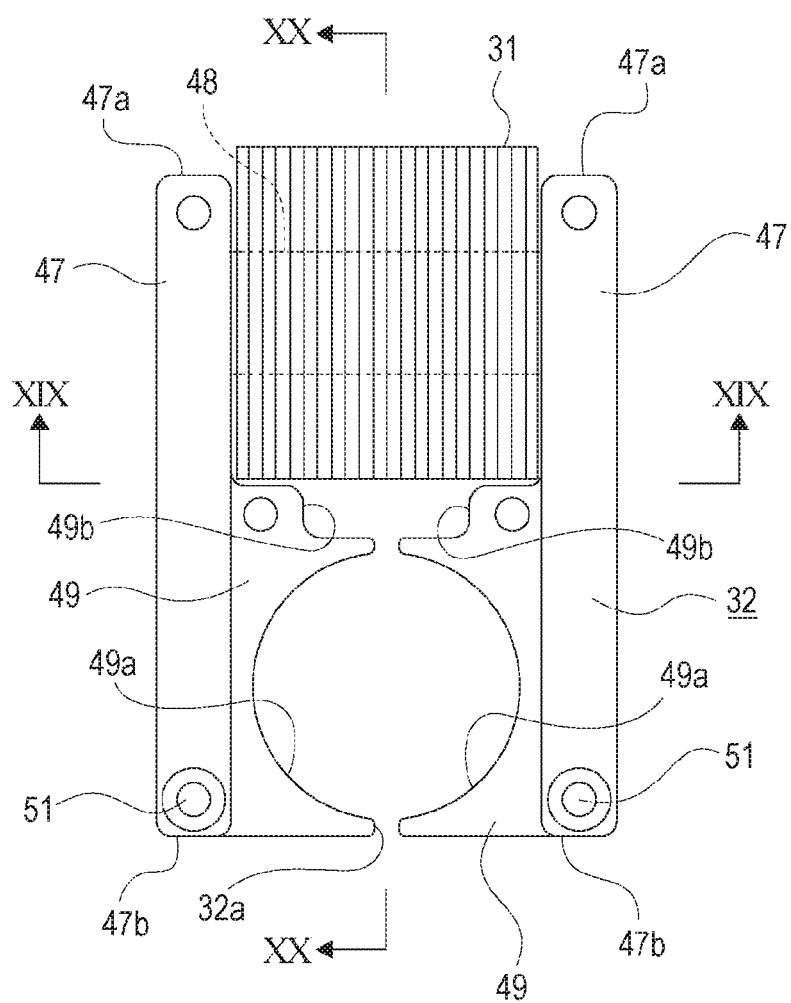
FIG. 18 is an enlarged front view illustrating a yoke and a coil.
Figure 19:
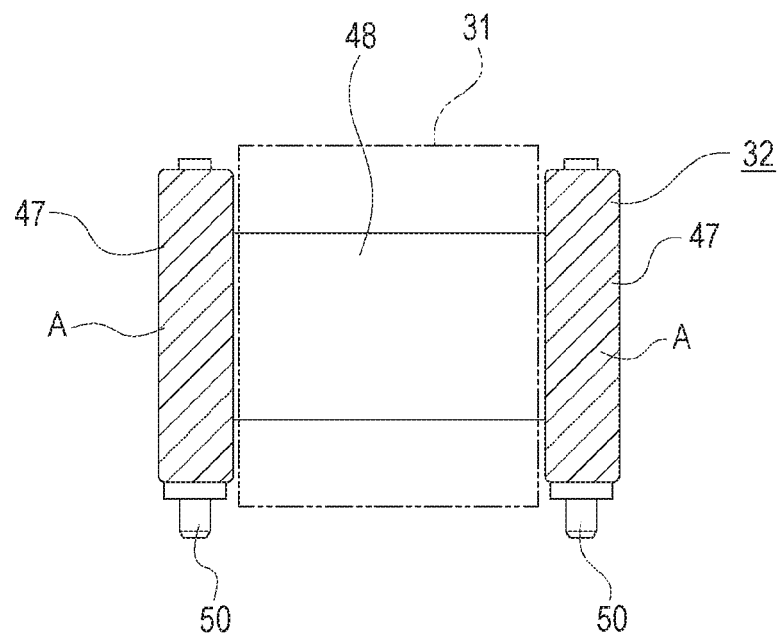
FIG. 19 is an enlarged cross-sectional view taken along line XIX-XIX in FIG. 18.
Figure 20:
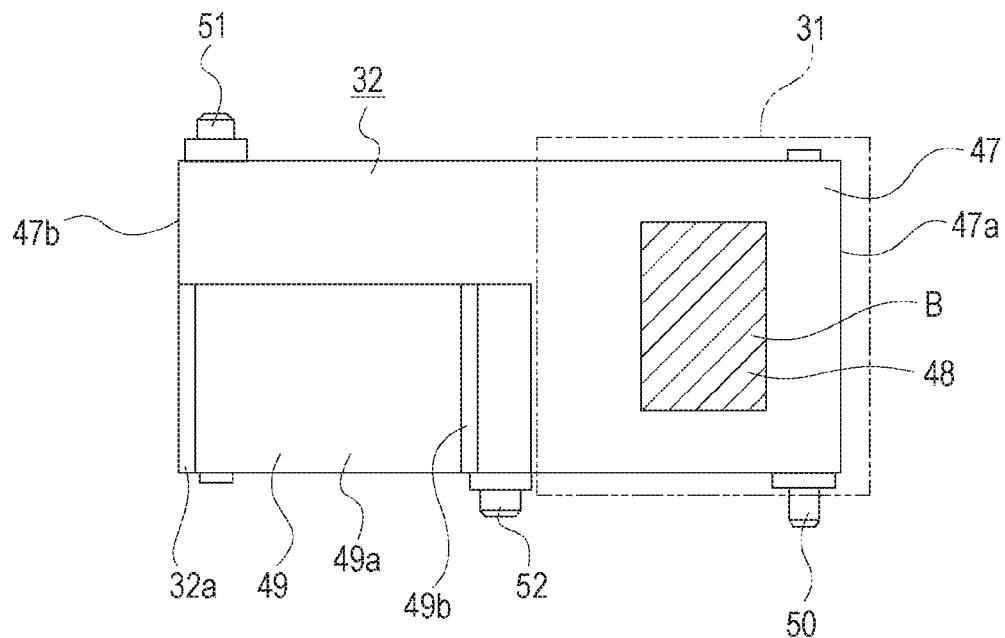
FIG. 20 is an enlarged cross-sectional view taken along line XX-XX in FIG. 18.
Figure 21:
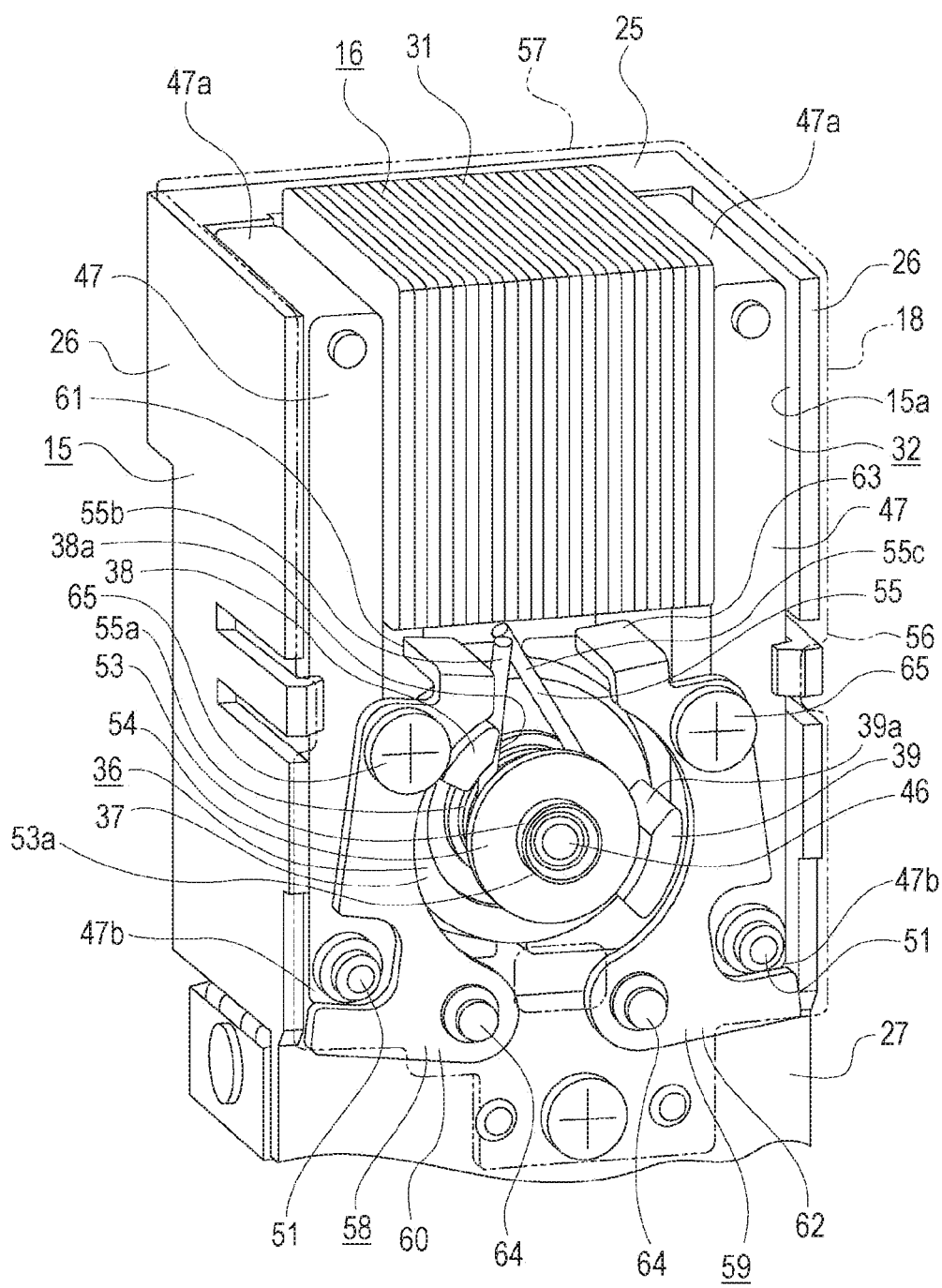

The yoke 32 to which the coil 31 is mounted is arranged in the first arrangement portion 15*a* of the housing case 15 (see FIG. 17). When the yoke 32 is arranged in the housing case 15, the first case-side positioning protrusions 50 and 50 are respect inserted into the first positioning holes 25*b* and 25*b* of the front surface 25 and the second case-side positioning protrusions 52 and 52 are respectively inserted into the second positioning holes 25*c* and 25*c* of the front surface 25, so that the yoke 32 is positioned with respect to the housing case 15. Furthermore, at this time, the insertion protrusion 25*d* of the housing case 15 is inserted into the space between the magnet arranging parts 49 and 49 of the coil 31 and the yoke 32, and the locking claws 26*b* and 26*b* of the engaging protrusions 26*a* and 26*a*, which are elastically restored after elastically deformed, are locked with rear edges of the connecting parts 47 and 47 of the yoke 32, so that the yoke 32 is held in the housing case 15.

The first case-side positioning protrusions 50 and 50 of the yoke 32 are respectively provided on the one end portions 47*a* and 47*a* of the connecting parts 47 and 47, and the one end portions 47*a* and 47*a* are not portions where the yokes 32 are made unnecessarily large, as described above. Furthermore, the second case-side positioning protrusions 52 and 52 of the yoke 32 are provided on the protrusions 49*b* and 49*b* protruding toward the coil mounting part 48 of the magnet arranging parts 49 and 49, and the protrusions 49*b* and 49*b* are portions existing inside the external shape of the yoke 32 and are not portions where the yokes 32 are made unnecessarily large.

Therefore, by providing the first case-side positioning protrusions 50 and 50 on the one end portions 47*a* and 47*a* and providing the second case-side positioning protrusions 52 and 52 on the protrusions 49*b* and 49*b*, high positioning accuracy of the yoke 32 to the housing case 15 can be secured without increasing the yoke 32 in size.

Furthermore, the one end portions 47*a* and 47*a* of the connecting parts 47 and 47 are portions protruding upward and downward with respect to the coil mounting part 48, and the protrusions 49*b* and 49*b* of the magnet arranging parts 49 and 49 are portions protruding toward the coil 31. Therefore, the one end portions 47*a* and 47*a* and the protrusions 49*b* and 49*b* are not portions where the magnetic flux passes, and are not portions where the magnetic flux generated in the yoke 32 is attenuated.

Therefore, even if the first case-side positioning protrusions 50 and 50 and the second case-side positioning protrusions 52 and 52 are provided on the one end portions 47*a* and 47*a* and the protrusions 49*b* and 49*b*, the magnetic flux generated in the yoke 32 is not affected, and the high positioning accuracy of the yoke 32 to the housing case 15 can be secured after securing favorable functionality of the first magnetic drive unit 16 and the second magnetic drive unit 17.

Furthermore, since the one end portions 47*a* and 47*a* and the protrusions 49*b* and 49*b* are not portions where the magnetic flux generated in the yoke 32 is attenuated, for example, it is possible that insertion holes are respectively formed in the one end portions 47*a* and 47*a* and the protrusions 49*b* and 49*b*, pins that are different members from the yoke 32 are inserted into the respective insertion holes, and these pins are provided as the first case-side positioning protrusions 50 and 50 and the second case-side positioning protrusions 52 and 52.

In the case where the yoke 32 is arranged in the housing case 15, the space between the magnet arranging parts 49 and 49 is located right behind the insertion hole 25*a* of the front surface 25 (see FIG. 9).

The second magnetic drive unit 17 is arranged in the second arrangement portion 15*b* of the housing case 15 (see FIG. 6). Since the second magnetic drive unit 17 has the same configuration as the first magnetic drive unit 16 and is arranged in a symmetric (line-symmetric) state in the up-down direction, description of the second magnetic drive unit 17 is omitted. Note that the drive lever 40 of the first magnetic drive unit 16 is provided as a first drive lever, and the drive lever 40 of the second magnetic drive unit 17 is provided as a second drive lever.

In the state where the drive lever 40 is mounted to the lever mounting member 33, and the lever mounting member 33 and the spring bearing member 36 are mounted to the magnet 30, the magnet 30 is inserted into the insertion hole 25*a* of the front surface 25 and between the magnet arranging parts 49 and 49 of the yoke 32 and is arranged in the housing case 15 (see FIG. 16).

In the state where the magnet 30 is arranged in the housing case 15, the portion other than both end portions in the axial direction of the rotation shaft 46 is inserted in the bearing sleeve 45, and the rotation shaft 46 is fixed in a state where a front end portion is inserted in the first shaft insertion hole 29*a* of the support plate 29.

The connecting shaft 44 mounted to the arm plate 42 of the drive lever 40 is inserted into the shaft moving hole 24*b* of the base body 13, a portion close to one end of the first link 21 or the second link 22, and the clearance hole 14*c* of the pressing plate 14 (see FIG. 5).

A spring support member 53 is mounted to a rear end portion of the rotation shaft 46 (see FIG. 16). The spring support member 53 has an approximately cylindrical support portion 53*a* having an axial direction set to the front-rear direction and a flange 53*b* projecting outward from a front end portion of the support portion 53*a*, and at least a part of the support portion 53*a* is mounted to the rotation shaft 46 by press fitting or the like. In the state where the spring support member 53 is mounted to the rotation shaft 46, the flange 53*b* is located facing a rear surface of the base 37 of the spring bearing member 36.

A power assist spring 55 is supported on the spring support member 53 (see FIGS. 12, 13, and 16). The power assist spring 55 is, for example, a torsion coil spring, and includes a coil part 55*a*, a first arm 55*b*, and a second arm 55*c*. The power assist spring 55 has the coil part 55*a* located between the spring bearing protrusions 38 and 39 of the spring bearing member 36 in a state where the coil part 55*a* is supported by the support portion 53*a* of the spring support member 53 (see FIGS. 17 and 21). The power assist spring 55 has the first arm 55*b* and the second arm 55*c* be respectively engageable with the first spring bearing edge 38*a* and the second spring bearing edge 39*a* of the spring bearing member 36.

In the state where the power assist spring 55 is supported by the spring support member 53, a pressing ring 54 is mounted to a portion on a rear end side of the spring support member 53, and dropping off of the power assist spring 55 from the spring support member 53 is prevented by the pressing ring 54.

In the state where the first magnetic drive unit 16 and the second magnetic drive unit 17 are housed in the housing case 15 as described above, the covers 18 and 18 are mounted to the housing case 15 (see FIGS. 4, 7, 8, and 16). The housing case 15, the first magnetic drive unit 16, and the second magnetic drive unit 17 are covered with the cover 18 from behind (see FIGS. 21 and 22).

As described above, in the blade opening and closing device 11, the housing case 15 mounted to the base body 13 is provided, and the first magnetic drive unit 16 and the second magnetic drive unit 17 are housed in the housing case 15.

Therefore, members separately housing the first magnetic drive unit 16 and the second magnetic drive unit 17 are not required and the number of parts can be reduced. In addition, since both the first magnetic drive unit 16 and the second magnetic drive unit 17 are housed in the housing case 15, the first magnetic drive unit 16 and the second magnetic drive unit 17 can be brought close to each other, and the blade opening and closing device 11 can be downsized.

Figure 23:
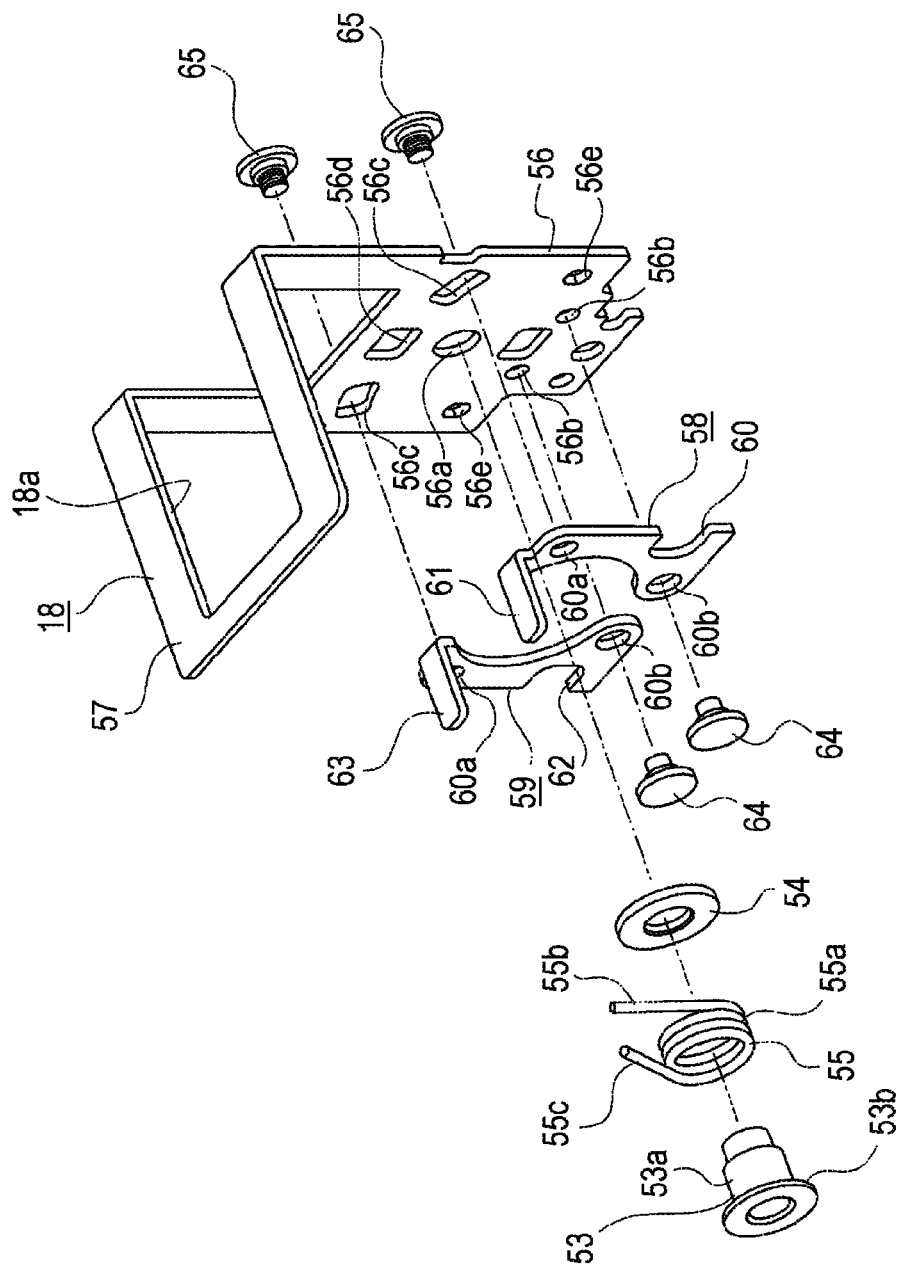
FIG. 23 is an enlarged exploded perspective view illustrating a cover and each part supported by the cover.
Figure 24:
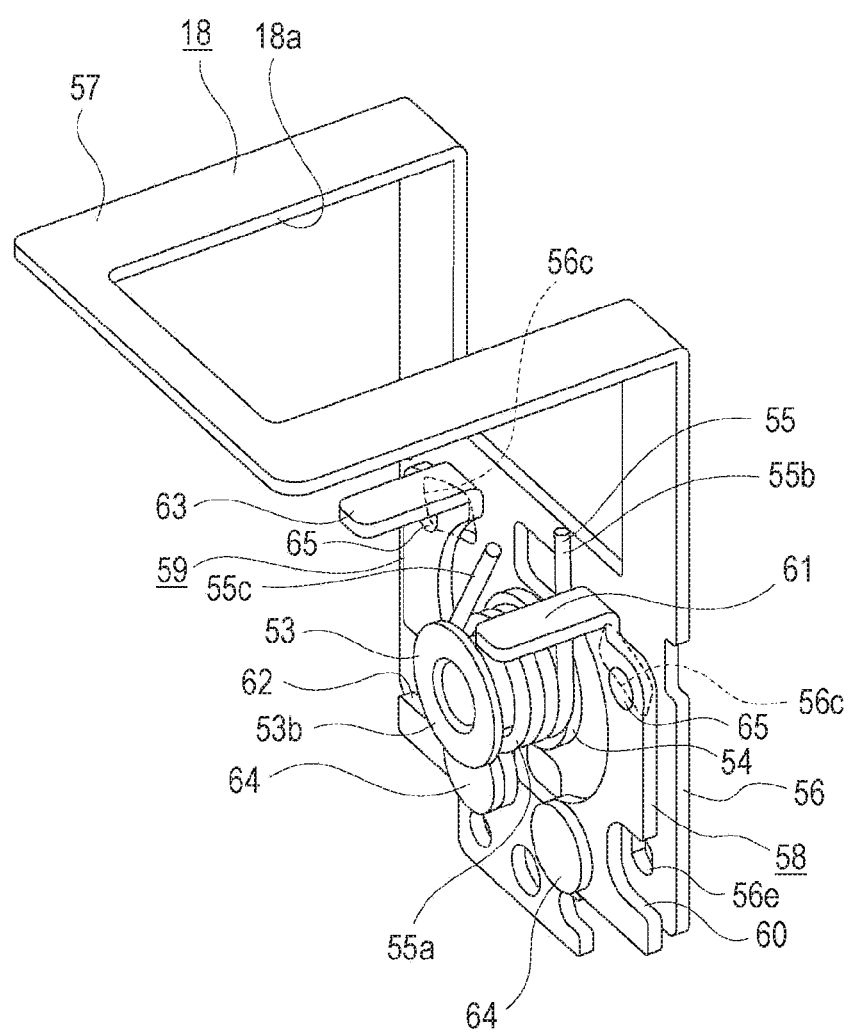
FIG. 24 is an enlarged perspective view illustrating a cover and each part supported by the cover.
Figure 25:
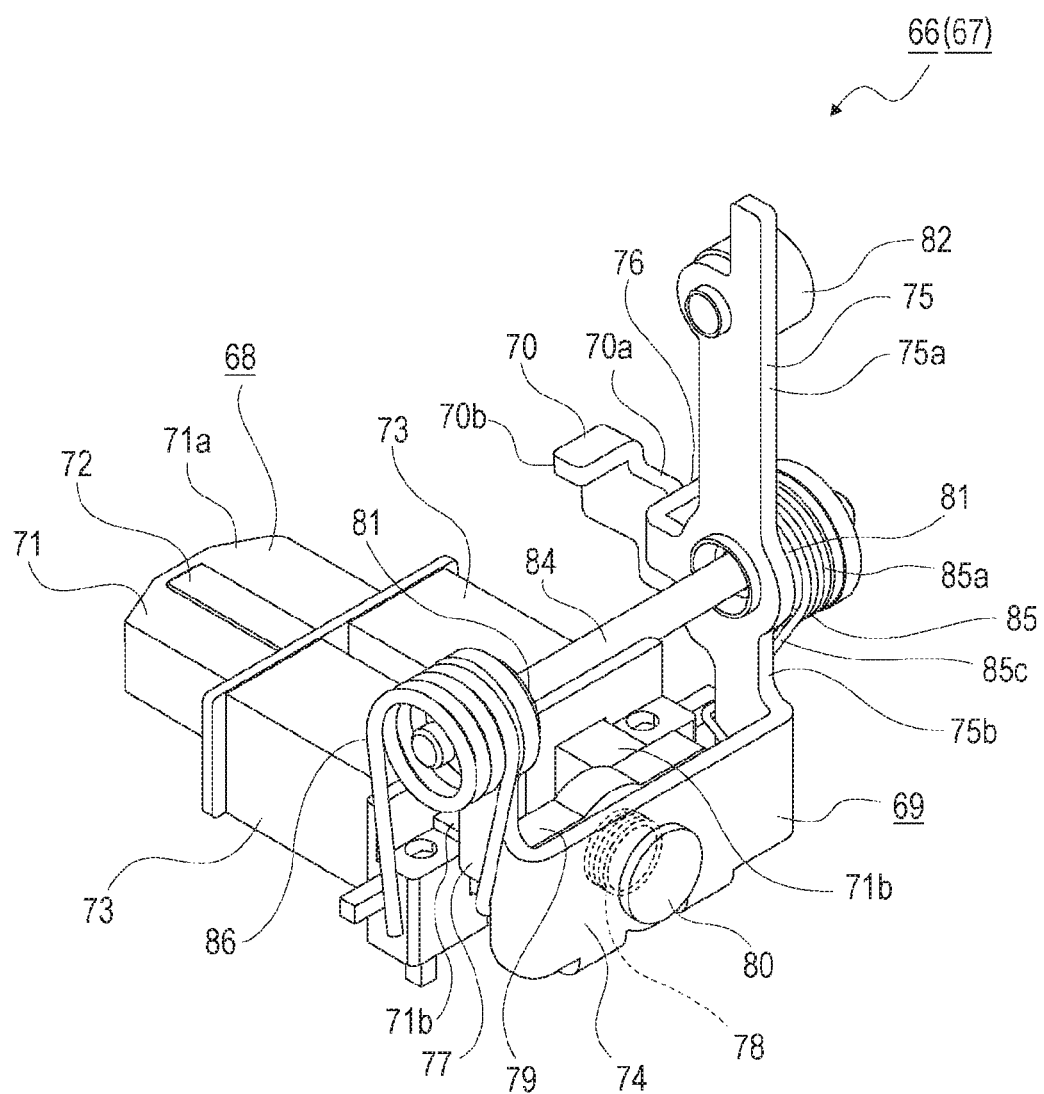
FIG. 25 is an enlarged perspective view illustrating the lock mechanism.
Figure 26:
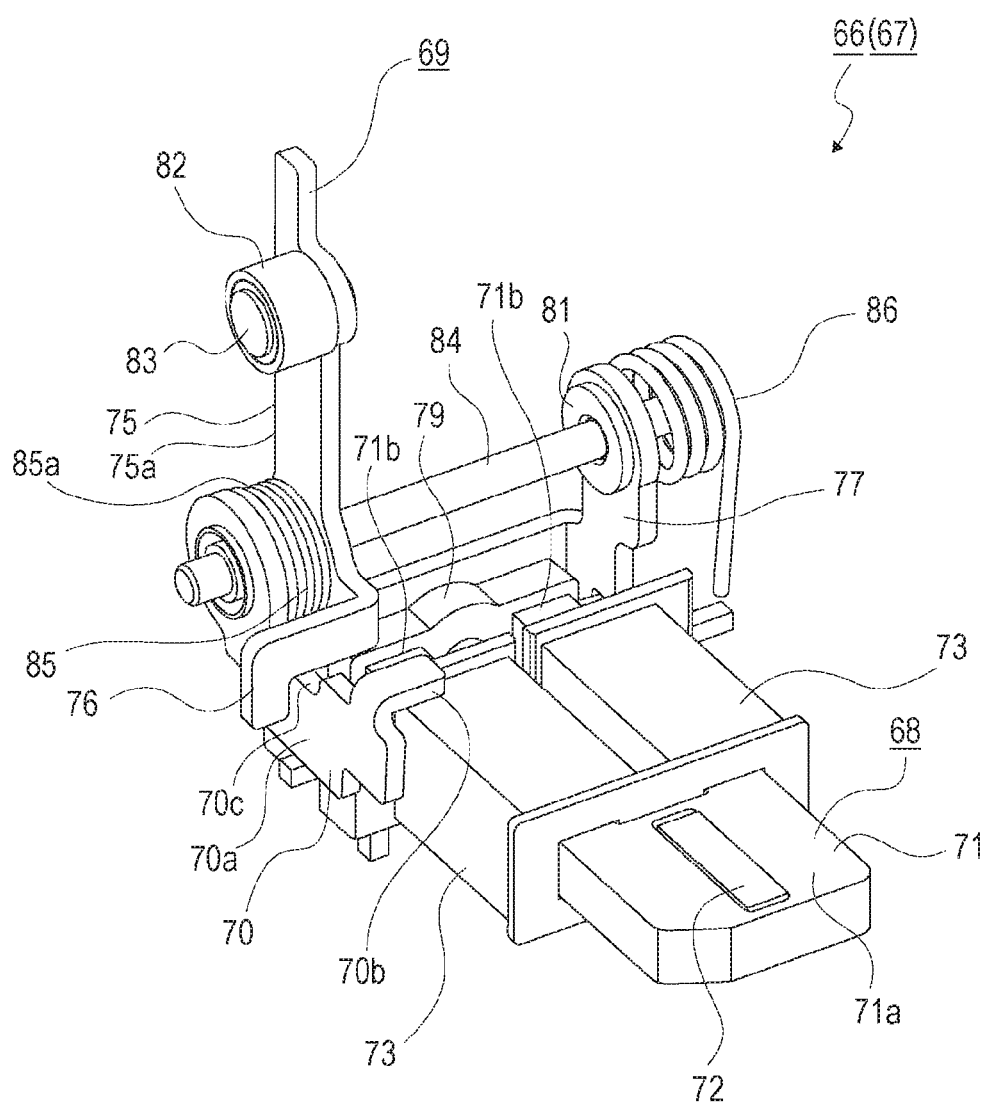
FIG. 26 is an enlarged perspective view illustrating the lock mechanism in a state of being viewed from a different direction from FIG. 25.

The cover 18 includes a first pressing surface part 56 facing the front-rear direction and a second pressing surface part 57 protruding forward from one end portion in the up-down direction of the first pressing surface part 56 (see FIGS. 23 and 24). A coil arrangement hole 18*a* is formed at a position extending from the first pressing surface part 56 to the second pressing surface part 57 in the cover 18.

A member holding hole 56*a* is formed in the first pressing surface part 56. In the first pressing surface part 56, fulcrum holes 56*b* and 56*b* are formed spaced in the right-left direction at positions on an opposite side of the coil arrangement hole 18*a* across the member holding hole 56*a*. In the first pressing surface part 56, lever stop holes 56*c* and 56*c* are formed spaced in the right-left direction between the member holding hole 56*a* and the coil arrangement hole 18*a*, and the lever stop holes 56*c* and 56*c* are formed in arc shapes with the fulcrum holes 56*b* and 56*b* as fulcrums. In the first pressing surface part 56, a working hole 56*d* is formed between the lever stop holes 56*c* and 56*c*. In the first pressing surface part 56, positioning holes 56*e* and 56*e* are formed outside the fulcrum holes 56*b* and 56*b* in the right-left direction.

The cover 18 is mounted to the housing case 15 by screws or the like. When the cover 18 is mounted to the housing case 15, the cover-side positioning protrusions 51 and 51 of the yoke 32 are respectively inserted into the positioning holes 56*e* and 56*e* of the cover 18, so that the positioning between the yoke 32 and the cover 18 is performed.

In the state where the cover 18 is mounted to the housing case 15, the first arrangement portion 15*a* is closed by the cover 18, and the coil 31 is arranged in a state where a part of the coil 31 is inserted in the coil arrangement hole 18a (see FIG. 4). A rear end portion of the spring support member 53 mounted to the rear end portion of the rotation shaft 46 is inserted into the member holding hole 56a of the cover 18, and the spring support member 53 is mounted to the first pressing surface part 56 (see FIG. 16).

A force amount adjusting part 58 and an effective range adjusting part 59 are turnably supported on the front side of the first pressing surface part 56 in the cover 18 (see FIGS. 23 and 24).

The force amount adjusting part 58 is formed in a plate shape facing the front-rear direction, and is turnably supported by the first pressing surface part 56. The force amount adjusting part 58 is located on an inner surface side of the first pressing surface part 56 and includes a portion to be supported 60 supported by the first pressing surface part 56 and a spring pressing portion 61 protruding forward from one end portion of the portion to be supported 60. In the portion to be supported 60, a position adjustment screw hole 60a is formed at a position near one end, and a shaft insertion hole 60b is formed at a position near the other end. The effective range adjusting part 59 is formed in a shape symmetrical to the force amount adjusting part 58 in the right-left direction, and is turnably supported by the first pressing surface part 56. The effective range adjusting part 59 is located on the inner surface side of the first pressing surface part 56, and includes a portion to be supported 62 and a spring pressing portion 63. A position adjustment screw hole 62a and a shaft insertion hole 62b are formed in the portion to be supported 62.

The force amount adjusting part 58 is turnably supported by the first pressing surface part 56 by a spindle 64 inserted into the shaft insertion hole 60b and mounted to one of the fulcrum holes 56b of the first pressing surface part 56. The effective range adjusting part 59 is turnably supported by the first pressing surface part 56 by a spindle 64 inserted into the shaft insertion hole 62b and mounted to the other fulcrum hole 56b of the first pressing surface part 56.

The force amount adjusting part 58 and the effective range adjusting part 59 are turned with respect to the cover 18 about the spindles 64 and 64 as fulcrums, respectively.

In the blade opening and closing device 11, set screws 65 and 65 are respectively inserted into the lever stop holes 56c and 56c of the first pressing surface part 56 from the rear and screwed with the position adjustment screw hole 60a and the position adjustment screw hole 62a, so that the force amount adjusting part 58 and the effective range adjusting part 59 can be held at desired turning positions with respect to the first pressing surface part 56.

At least a part of a first lock mechanism 66 and at least a part of a second lock mechanism 67 are arranged in the third arrangement portion 15c of the housing case 15 (see FIG. 6). Note that, although the first lock mechanism 66 and the second lock mechanism 67 are positioned in a point-symmetric state, the first lock mechanism 66 and the second lock mechanism 67 have the same configuration. Therefore, hereinafter, the configuration of the first lock mechanism 66 will be described and description of the configuration of the second lock mechanism 67 is omitted.

The first lock mechanism 66 includes an attracting body 68, an action lever 69, and a lock lever 70 (see FIGS. 12, 13, 25, and 26).

The attracting body 68 has a lock yoke 71, a lock magnet 72, and lock coils 73 and 73. The attracting body 68 is fixed to the housing case 15.

The lock yoke 71 has a holding portion 71a for holding the lock magnet 72 and attracting portions 71b and 71b protruding in the same direction in the right-left direction from the holding portion 71a. As the lock magnet 72, a permanent magnet is used, for example. The lock coils 73 and 73 are respectively mounted to portions of the lock yoke 71 other than distal end portions of the attracting portions 71b and 71b.

The action lever 69 has a base plate 74, an action protrusion 75, a pressing protrusion 76, and a protrusion to be supported 77. The base plate 74 is formed in a shape facing the right-left direction. The action protrusion 75 protrudes approximately upward from one end portion in the front-rear direction of the base plate 74, and is formed in a shape facing the front-rear direction. The pressing protrusion 76 protrudes from a position in the action protrusion 75, the position being close to the base plate 74. The protrusion to be supported 77 protrudes approximately upward from the other end portion in the front-rear direction of the base plate 74, and is formed in a shape facing the front-rear direction.

A portion to be attracted 79 is supported by the base plate 74 via a compression coil spring 78. The portion to be attracted 79 is formed in an approximately rectangular plate shape in which a width in the front-rear direction is larger than a width in the up-down direction, and is supported by the base plate 74 with a support shaft 80 inserted in the base plate 74 and the compression coil spring 78. The compression coil spring 78 is compressed between the base plate 74 and the portion to be attracted 79, and the portion to be attracted 79 is energized by the compression coil spring 78 in a direction approaching the attracting body 68 in the right-left direction with respect to the base plate 74.

Bearings 81 and 81 are respectively mounted to a portion in the action protrusion 75, the portion being close to the base plate 74, and a distal end of the protrusion to be supported 77 in the action lever 69. A roller 82 is rotatably supported with a rotation fulcrum shaft 83 as a fulcrum at a position close to the distal end of the action protrusion 75. The rotation fulcrum shaft 83 has an axial direction set to the front-rear direction.

The action lever 69 is turnable with respect to the housing case 15 with a turning shaft 84 as a fulcrum. The turning shaft 84 is inserted into the action protrusion 75 of the action lever 69, the protrusion to be supported 77 of the action lever 69, and the bearings 81 and 81 mounted to the action lever 69, and both end portions in the axial direction are supported by the connecting surface 27 of the housing case 15 and the bearing hole 29c of the support plate 29, and are rotatably supported by the housing case 15 and the support plate 29. The turning shaft 84 is inserted in an intermediate portion in a longitudinal direction (up-down direction) of the action protrusion 75. In the action protrusion 75, a portion on the side supporting a roller 81 with respect to the position where the turning shaft 84 is inserted is provided as a first portion 75a, and a portion on the side of the base plate 74 is provided as a second portion 75b. The first portion 75a is longer than the second portion 75b in the up-down direction.

The lock lever 70 is fixed at a position near a front end of the turning shaft 84. Therefore, the lock lever 70 is integrally turned with the turning shaft 84. The lock lever 70 functions as a lock part that locks the first opening and closing blade 19 and the second opening and closing blade 20 at the open position or the closed position. In the lock lever 70, the other end portion of an extending portion 70a is supported by the turning shaft 84. The lock lever 70 has the extending portion 70a extending in the approximately right-left direction, a lock protrusion 70b protruding rearward from one end portion of the extending portion 70a, and a spring bearing 70c provided at a position close to the other end of the extending portion 70a.

The pressing protrusion 76 of the action lever 69 is made engageable with the extending portion 70a of the lock lever 70.

A lock spring 85 is supported by the turning shaft 84. The lock spring 85 is, for example, a torsion coil spring, and includes a coil part 85a, a first arm 85b, and a second arm 85c. In the lock spring 85, the first arm 85b is engaged with the spring bearing 70c of the lock lever 70 and the second arm 85c is engaged with the second portion 75b of the action protrusion 75 in the action lever 69 in the state where the coil part 85a is supported by the turning shaft 84 between the action lever 69 and the lock lever 70. Therefore, the action lever 69 and the lock lever 70 are energized in the opposite direction with the turning shaft 84 as a fulcrum by the energizing force of the lock spring 85, and the pressing protrusion 76 of the action lever 69 is engaged with the extending portion 70a of the lock lever 70 in a state where a force against the energizing force is not provided in the lock spring 85.

A return spring 86 is supported by the turning shaft 84. The return spring 86 is, for example, a torsion coil spring, and the action lever 69 is energized by the return spring 86 in the same turning direction as an energizing direction by the lock spring 85

As described above, in the first lock mechanism 66 and the second lock mechanism 67, turning fulcrums of the action lever 69 and the lock lever 70 are set to the same turning shaft 84. Therefore, the action lever 69 and the lock lever 70 are turned about the same turning shaft 84 as a fulcrum, and the structure of the blade opening and closing device 11 can be simplified and downsized.

Furthermore, as described above, the first magnetic drive unit 16 and the second magnetic drive unit 17 are arranged in the first arrangement portion 15a and the second arrangement portion 15b of the housing case 15 in the up-down symmetric (line-symmetric) state, and the first lock mechanism 66 and the second lock mechanism 67 are arranged in the point-symmetric state in the up-down direction (see FIG. 16).

Specifically, the magnets 30 and 30 of the first magnetic drive unit 16 and the second magnetic drive unit 17 are arranged at the positions close to the third arrangement portion 15c, and the coils 31 and 31 are respectively arranged in the upper and lower end portions of the housing case 15. Note that the drive lever 40 operated by the first magnetic drive unit 16 is formed in a shape in which the arm plate 42 extends in one direction, and the drive lever 40 operated by the second magnetic drive unit 17 is formed in a shape in which the arm plate 42 is bent. The difference between the shapes corresponds to the difference between an operation locus of the first opening and closing blade 19 and the operation locus of the second opening and closing blade 20, and functions and configurations of the drive levers 40 and 40 are the same.

Figure 27:
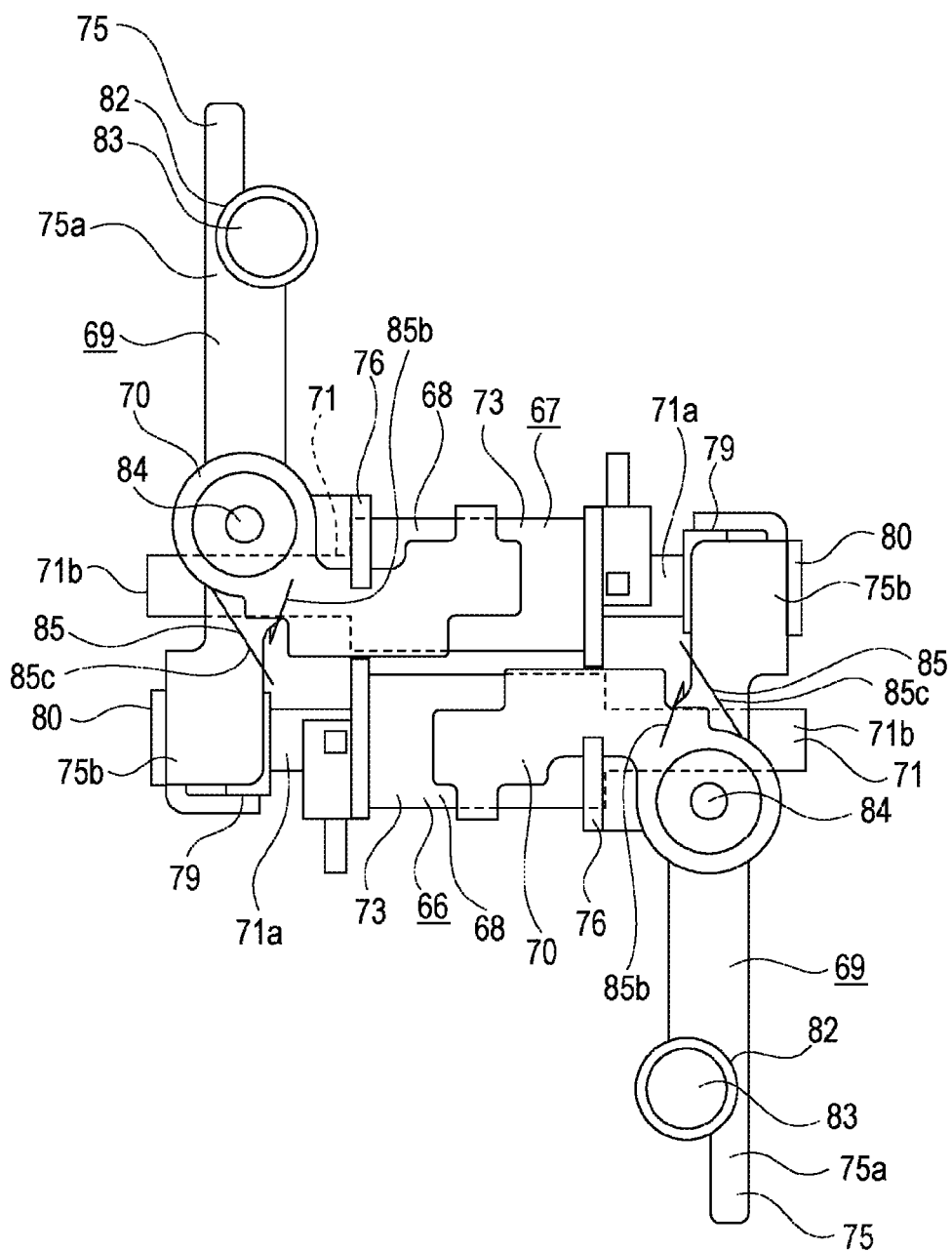
FIG. 27 is an enlarged front view illustrating the first lock mechanism and the second lock mechanism.

Furthermore, in the blade opening and closing device 11, a part of the first lock mechanism 66 and a part of the second lock mechanism 67 are located to overlap in the front-rear direction that is the direction orthogonal to the up-down direction that is the arranging direction of the first magnetic drive unit 16 and the second magnetic drive unit 17 (see FIG. 27). Specifically, a part of the attracting body 68 in the first magnetic drive unit 16 is located on the rear side of the action lever 69 and the lock lever 70 in the second magnetic drive unit 17, and a part of the attracting body 68 in the second magnetic drive unit 17 is located at the rear side of the action lever 69 and the lock lever 70 in the first magnetic drive unit 16.

Note that the attracting body 68, the action lever 69, and the lock lever 70 of the first lock mechanism 66 are provided as a first attracting body, a first action lever, and a first lock lever, and the attracting body 68, the action lever 69, and the lock lever 70 of the second lock mechanism 67 are provided as a second attracting body, a second action lever, and a second lock lever As described above, in the blade opening and closing device 11, the first magnetic drive unit 16 and the second magnetic drive unit 17 are arranged in the line-symmetric arrangement state.

Therefore, since the arrangement state of the first magnetic drive unit 16 and the second magnetic drive unit 17 is simplified, and the combined arrangement space for the first magnetic drive unit 16 and the second magnetic drive unit 17 is minimized, the first magnetic drive unit 16 and the second magnetic drive unit 17 can be easily assembled to the housing case 15, and the blade opening and closing device 11 can be downsized.

Furthermore, in the blade opening and closing device 11, the first lock mechanism 66 and the second lock mechanism 67 are located in the point-symmetric arrangement state.

Therefore, since the arrangement state of the first lock mechanism 66 and the second lock mechanism 67 is simplified, and the combined arrangement space for the first lock mechanism 66 and the second lock mechanism 67 is minimized, the first lock mechanism 66 and the second lock mechanism 67 can be easily assembled to the housing case 15, and the blade opening and closing device 11 can be further downsized.

Figure 22:
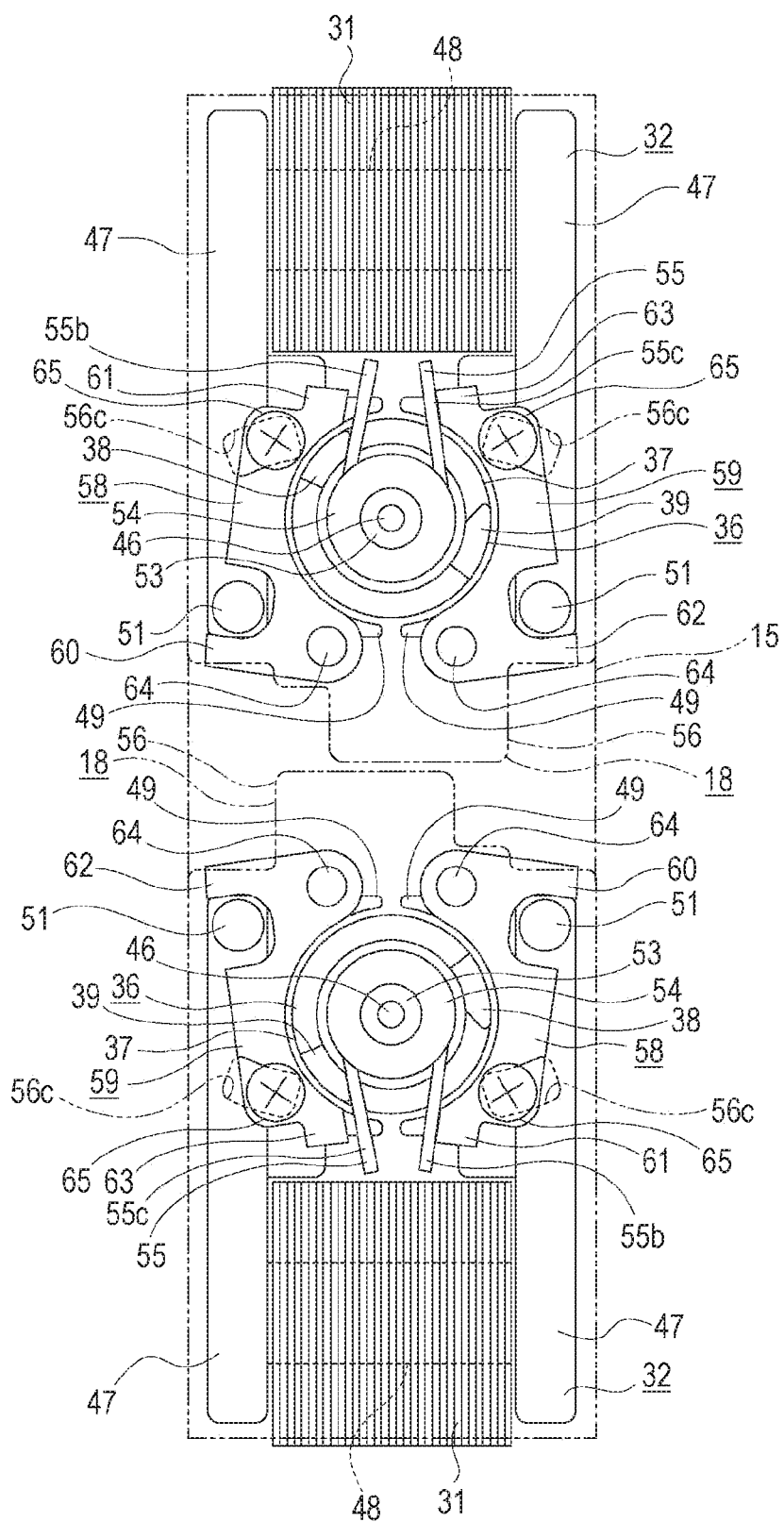

Moreover, in the blade opening and closing device 11, the force amount adjusting parts 58 and 58 and the effective range adjusting parts 59 and 59 are located in the line-symmetric or point-symmetric arrangement state (see FIG. 22).

Therefore, since the arrangement state of the force amount adjusting parts 58 and 58 and the effective range adjusting parts 59 and 59 is simplified, and the combined arrangement space for the force amount adjusting parts 58 and 58 and the effective range adjusting parts 59 and 59 is minimized, the force amount adjusting parts 58 and 58 and the effective range adjusting parts 59 and 59 can be easily assembled to the covers 18, and the blade opening and closing device 11 can be further downsized.

Furthermore, in the blade opening and closing device 11, since the parts constituting the first lock mechanism 66 and the parts constituting the second lock mechanism 67 are the same parts, the parts constituting the first lock mechanism 66 and the parts constituting the second lock mechanism 67 can be made common. Therefore, the manufacturing cost of the blade opening and closing device 11 can be reduced.

The first link 21 and the second link 22 are respectively connected to the first opening and closing blade 19 and the second opening and closing blade 20, and the first opening and closing blade 19 and the second opening and closing blade 20 are respectively connected to the connecting shafts 44 and 44 and the rotation shafts 46 and 46 of the first magnetic drive unit 16 and the second magnetic drive unit 17 via the first link 21 and the second link 22 (see FIG. 4). Both the first link 21 and the second link 22 are parallel links.

The first link 21 includes first arms 87 and 88 located spaced in the up-down direction, and a connecting hole 87a extending in a predetermined direction is formed in the first arm 87. The first link 21 is connected to the drive lever 40 by the connecting shaft 44 of the first magnetic drive unit 16 being slidably inserted into the connecting hole 87a of the first arm 87. One end portions of the first arms 87 and 88 are turnably connected to the base body 13. Note that the rotation shaft 46 inserted in one of the shaft insertion holes 24a of the base body 13 is inserted into one end portion of the first arm 87, and the first arm 87 is turned about the rotation shaft 46 as a fulcrum.

The second link 22 includes second arms 89 and 90 located spaced in the up-down direction, and a connecting hole 89a extending in a predetermined direction is formed in the second arm 89. The second link 22 is connected to the drive lever 40 by the connecting shaft 44 of the second magnetic drive unit 17 being slidably inserted into the connecting hole 89a of the second arm 89. One end portions of the second arms 89 and 90 are turnably connected to the base body 13. Note that the rotation shaft 46 inserted in the other shaft insertion hole 24a of the base body 13 is inserted into one end portion of the second arm 89, and the second arm 89 is turned about the rotation shaft 46 as a fulcrum.

The first opening and closing blade 19 includes a plurality of sheet-like first sectors 91, 91, and 91. In the first opening and closing blade 19, at least parts of the first sectors 91, 91, and 91 are located to overlap in a thickness direction, and are moved between the open position where the opening 13a of the base body 13 is opened and the closed position where the opening 13a is closed.

One end portions of the first sectors 91, 91, and 91 are turnably connected to portions of the first arms 87 and 88. Therefore, when the magnet 30 of the first magnetic drive unit 16 is rotated, the first arms 87 and 88 are moved while maintaining the parallel state with the rotation of the magnet 30, and the first sectors 91, 91, and 91 are moved in an approximately up-down direction with the movement of the first arms 87 and 88. At this time, the first sectors 91, 91, and 91 have different moving amounts in the approximately up-down direction, and overlapping areas vary.

The second opening and closing blade 20 includes a plurality of sheet-like second sectors 92, 92, and 92. In the second opening and closing blade 20, at least parts of the second sectors 92, 92, and 92 are located to overlap in the thickness direction, and are moved between the open position where the opening 13a of the base body 13 is opened and the closed position where the opening 13a is closed.

One end portions of the second sectors 92, 92, and 92 are turnably connected to portions of the second arms 89 and 90. Therefore, when the magnet 30 of the second magnetic drive unit 17 is rotated, the second arms 89 and 90 are moved while maintaining the parallel state with the rotation of the magnet 30, and the second sectors 92, 92, and 92 are moved in an approximately up-down direction with the movement of the second arms 89 and 90. At this time, the second sectors 92, 92, and 92 have different moving amounts in the approximately up-down direction, and overlapping areas vary.

As described above, when the first opening and closing blade 19 and the second opening and closing blade 20 are moved, the overlapping areas vary according to the positions to which the first sectors 91, 91, and 91 and the second sectors 92, 92, and 92 are moved, and the area becomes the smallest at the open position where the opening 13a is opened.

Therefore, the arrangement space of the first opening and closing blade 19 and the second opening and closing blade 20 becomes the small at the open position, and the area of the first opening and closing blade 19 and the second opening and closing blade 20 becomes the largest at the closed position. Therefore, the blade opening and closing device 11 can be downsized in the moving direction of the first opening and closing blade 19 and the second opening and closing blade 20, and the sufficiently large opening 13a can be formed.

A first sheet (not illustrated) is arranged between the first opening and closing blade 19 and the second opening and closing blade 20. A contact between the first opening and closing blade 19 and the second opening and closing blade 20 is prevented and smooth operation of the first opening and closing blade 19 and the second opening and closing blade 20 is achieved by the first sheet.

Furthermore, a second sheet (not illustrated) is arranged between the second opening and closing blade 20 and the pressing plate 14, and smooth operation of the second opening and closing blade 20 is achieved by the second sheet.

<Operation of Blade Opening and Closing Device>

Hereinafter, a lock operation and the like in the blade opening and closing device 11 will be described. Note that, since the lock operations regarding the first opening and closing blade 19 and the second opening and closing blade 20 are similar, hereinafter, only the lock operation regarding the first opening and closing blade 19 will be described in detail, and detailed description of the lock operation regarding the second opening and closing blade 20 is omitted.

First, an initial state of the first opening and closing blade 19 and the second opening and closing blade 20 will be described (see FIG. 28).

In the state before the power button 6 of the imaging apparatus 1 is operated, no electric conduction is performed for the coils 31 and 31, and for example, the first opening and closing blade 19 is held at the closed position and the second opening and closing blade 20 is held at the open position. Therefore, the opening 13a of the base body 13 is closed by the first opening and closing blade 19.

Figure 29:
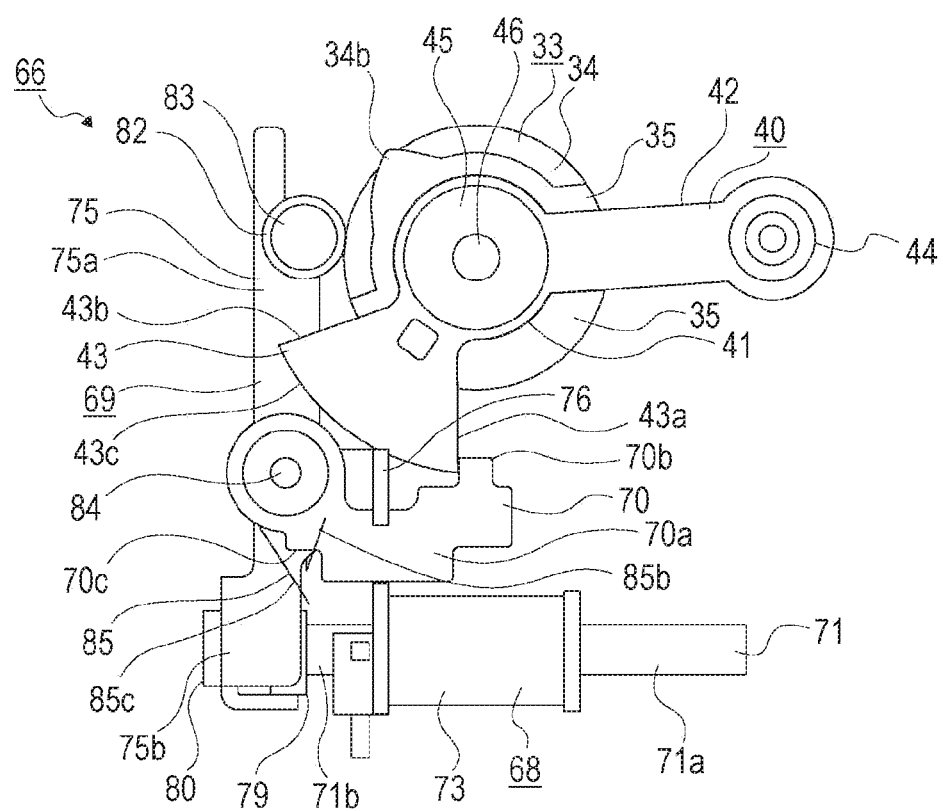
FIG. 29 illustrates an operation of the blade opening and closing device together with FIGS. 30 to 36, and is a front view illustrating a state in which a lock protrusion is engaged with a first engagement portion of an engagement piece.

At this time, the first opening and closing blade 19 is locked as follows at the closed position (see FIG. 29).

The portion to be attracted 79 supported by the action lever 69 via the compression coil spring 78 is attracted by an attracting portion 68b with the magnetic flux in the lock yoke 71 by the lock magnet 72, and the action lever 69 is held in a vertically extending state.

In the lock spring 85, the first arm 85b is engaged with the spring bearing 70c of the lock lever 70, and the second arm 85c is engaged with the second portion 75b of the action protrusion 75 in the action lever 69. Therefore, the action lever 69 and the lock lever 70 are energized by the energizing force of the lock spring 85 in the opposite direction with the turning shaft 84 as a fulcrum, and the pressing protrusion 76 of the action lever 69 is engaged with the extending portion 70a of the lock lever 70 from the magnet 30 side.

The lock lever 70 is energized in a direction in which the extending portion 70a approaches the magnet 30 by the energizing force of the lock spring 85 and is at a locked position, and the lock protrusion 70b is engaged with the first engagement portion 43a of the engagement piece 43 in the drive lever 40.

The lock protrusion 70b is engaged with the first engagement portion 43a in this way, the rotation of the drive lever 40 and the magnet 30 is restricted, and the first opening and closing blade 19 is locked at the closed position.

Figure 30:
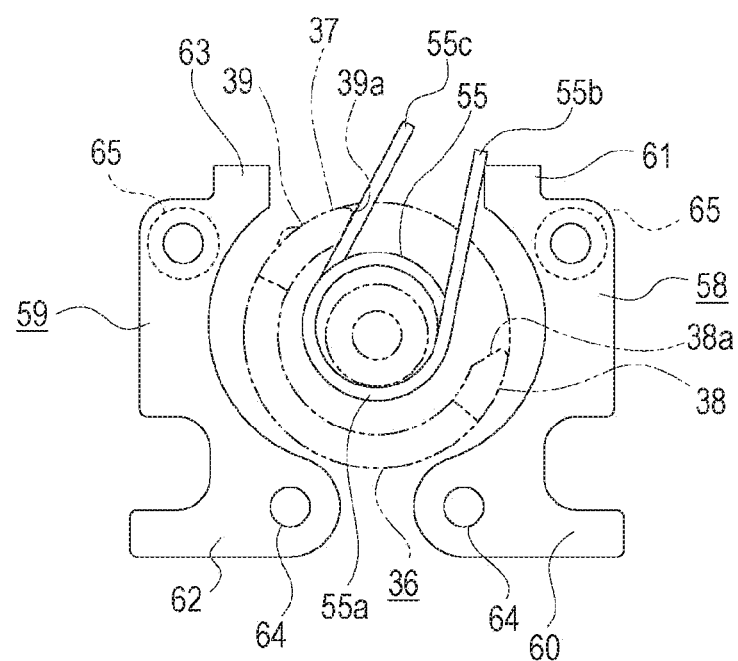
FIG. 30 is a front view illustrating a state in which an energizing force in the same direction as a rotation direction of the magnet is provided from the power assist spring to the magnet.

At this time, in the power assist spring 55, the first arm 55b is engaged with the spring pressing portion 61 of the force amount adjusting part 58, and the second arm 55c is engaged with the spring bearing edge 39a of the spring bearing member 36 (see FIG. 30). Therefore, an energizing force in a direction in which the first engagement portion 43*a* is pressed against the lock protrusion 70*b* is provided to the drive lever 40 by the power assist spring 55. At this time, the second arm 55*c* is not engaged with the spring pressing portion 63 of the effective range adjusting part 59.

When the electric conduction is performed for the coil 31 in the state where the first opening and closing blade 19 is locked at the closed position as described above, the magnetic flux generated in the first magnetic drive unit 16 provides a rotational force to the magnet 30. At this time, the energizing force in the rotating direction is provided to the drive lever 40 by the power assist spring 55. Therefore, the provided energizing force acts as assist power to the rotation of the drive lever 40.

Figure 31:
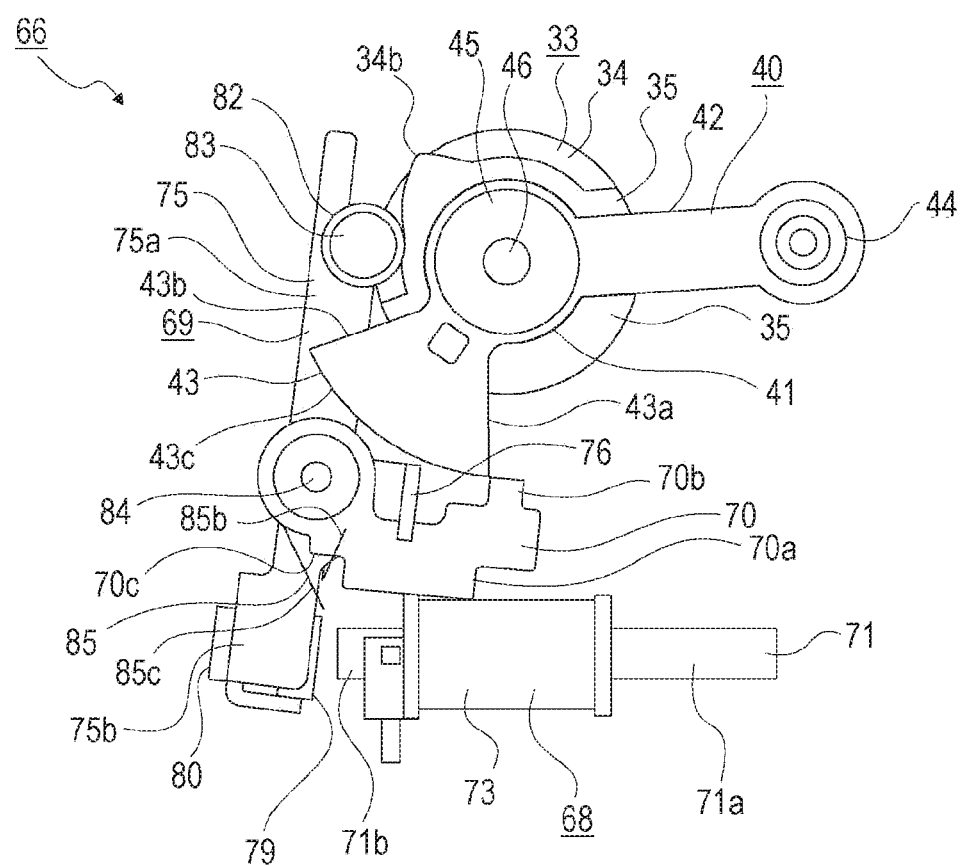
FIG. 31 is a front view illustrating a state in which a lock lever is turned and the engagement of the lock protrusion with the engagement piece is released, following FIG. 29.

When the electric conduction is performed for the coil 31, electric conduction is performed for the lock coil 73 at approximately the same time. When the electric conduction is performed for the lock coil 73, a magnetic flux is generated in an opposite direction to the magnetic flux in the lock yoke 71 by the lock magnet 72 and the magnetic flux in the lock yoke 71 decreases, and an attracting force of the attracting portion 68*b* to the portion to be attracted 79 decreases relative to the energizing force of the return spring 86. Therefore, the action lever 69 is turned in a direction in which the second portion 75*a* is away from the attracting body 68 (see FIG. 31). The action lever 69 is turned to a position where the roller 82 comes close to or comes in contact with the lever mounting member 33.

When the action lever 69 is turned, the lock lever 70 is pressed by the pressing protrusion 76 of the action lever 69, the lock lever 70 is turned from the locked position to an unlocked position, and the lock protrusion 70*b* is separated from the first engagement portion 43*a* of the engagement piece 43, and the engagement is released.

At this time, the rotational force is provided to the magnet 30 by the electric conduction to the coil 31, and the assist power by the power assist spring 55 is generated. Therefore, the drive lever 40 is integrally turned with the magnet 30 by combined power of the rotational force of the magnet 30 and the assist power by the power assist spring 55. Therefore, the first opening and closing blade 19 is moved from the closed position to the open position at a high speed.

Figure 32:
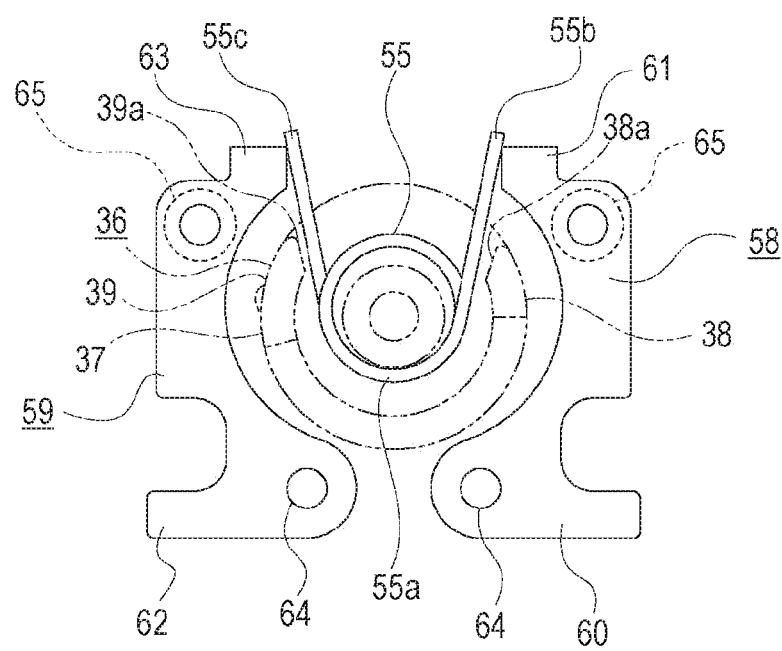
FIG. 32 is a front view illustrating a state in which provision of the energizing force from the power assist spring to the magnet is stopped, following FIG. 30.

When the magnet 30 and the drive lever 40 are rotated at a fixed angle, the first arm 55*b* comes in contact with the spring pressing portion 63 of the effective range adjusting part 59, the second arm 55*c* is separated from the spring bearing edge 39*a*, and the first arm 55*b* and the second arm 55*c* are not engaged with the first spring bearing edge 38*a* and the second spring bearing edge 39*a* in the power assist spring 55 (see FIG. 32). Therefore, the energizing force is not provided from the power assist spring 55 to the drive lever 40.

Figure 33:
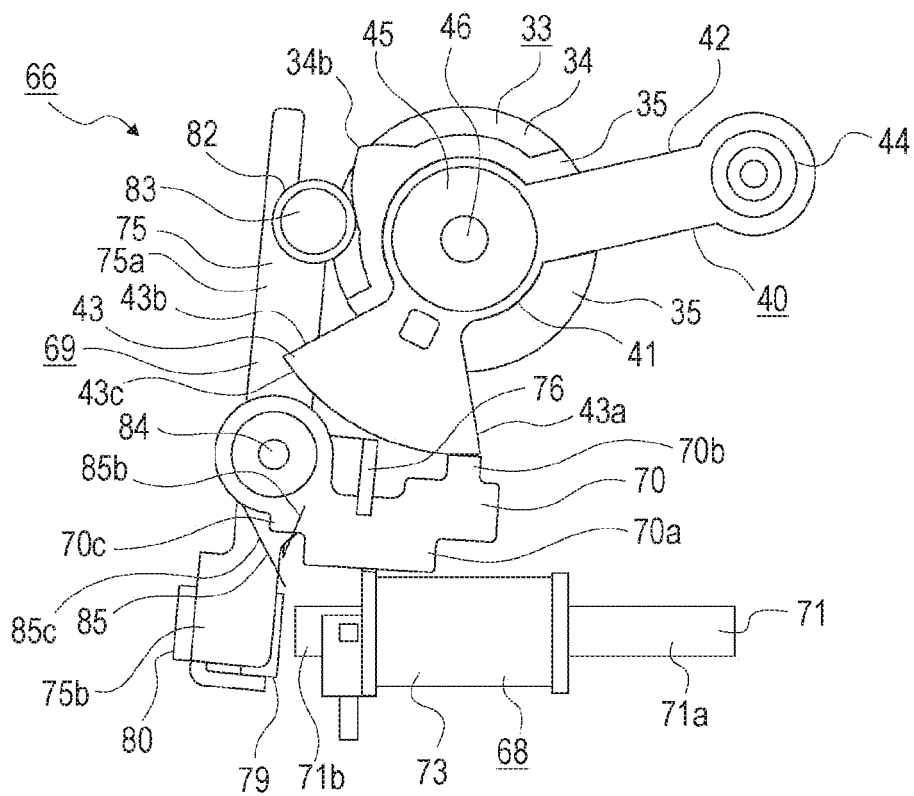
FIG. 33 is a front view illustrating a state in which the magnet is rotated and the lock protrusion is slid on a sliding portion of the engagement piece, following FIG. 31.

When the magnet 30 and the drive lever 40 are integrally rotated, the lock lever 70 is energized in the direction of approaching the magnet 30 by the lock spring 85, and the lock protrusion 70*b*, the engagement of which with the first engagement portion 43*a* of the engagement piece 43 has been released, is slid on the sliding portion 43*c* of the engagement piece 43 (see FIG. 33).

Furthermore, after the lock with the drive lever 40 by the lock lever 70 is released, in the middle of the magnet 30 and the drive lever 40 being integrally rotated, the electric conduction to the lock coil 73 is stopped. When the electric conduction to the lock coil 73 is stopped, the magnetic flux by the electric conduction to the lock coil 73 disappears, and the magnetic flux in the lock yoke 71 by the lock magnet 72 is recovered. Therefore, the attracting force of the attracting portion 68*a* in the attracting body 68 to the portion to be attracted 79 becomes large.

Figure 34:
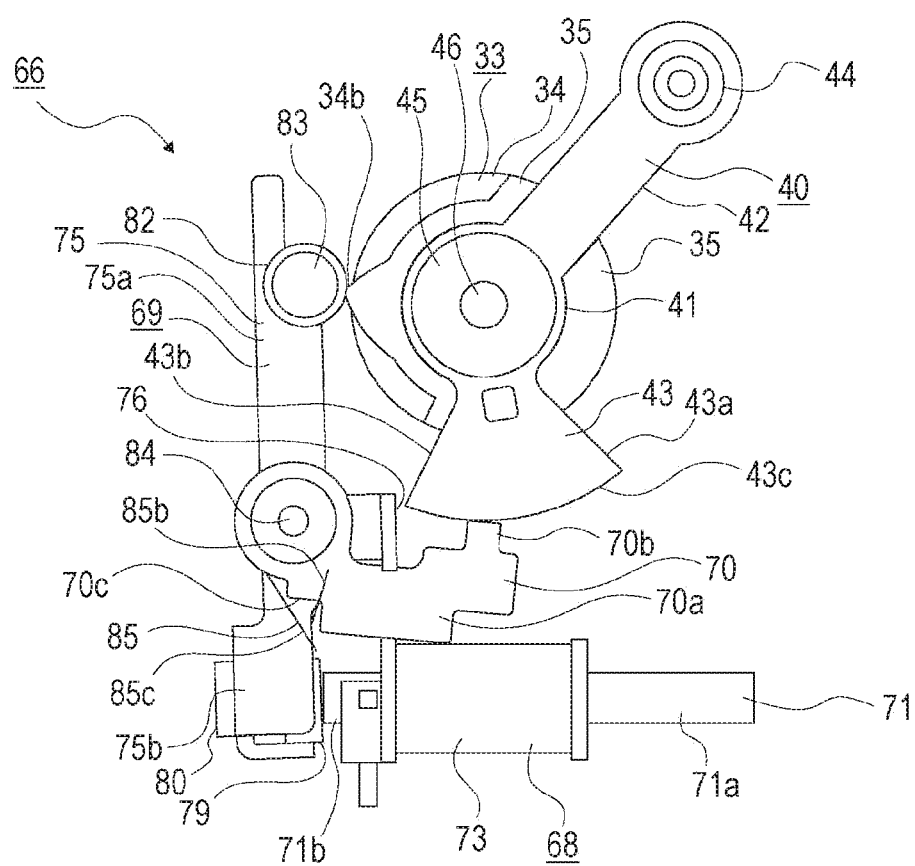
FIG. 34 is a front view illustrating a state in which the magnet is rotated and a roller supported by an action lever is pressed by a pressing protrusion of a lever mounting member, following FIG. 33.

When the magnet 30 and the drive lever 40 is further integrally rotated, the roller 82 supported by the action lever 69 is pressed by the pressing protrusion 34*b* of the lever mounting member 33 (see FIG. 34). When the roller 82 is pressed by the pressing protrusion 34*b*, the action lever 69 is turned in the direction in which the second portion 75*b* approaches the attracting portion 68*b* of the attracting body 68.

At this time, the electric conduction to the lock coil 73 is cancelled and the magnetic flux in the lock yoke 71 is recovered. Therefore, the portion to be attracted 79 is attracted by the attracting portion 68*a* of the attracting body 68, and the action lever 69 is turned and held again in the vertically extending state. Since the lock lever 70 is energized in the direction of approaching the magnet 30 by the lock spring 85, the lock protrusion 70*b* is slid on the sliding portion 43*c* of the engagement piece 43.

Figure 35:
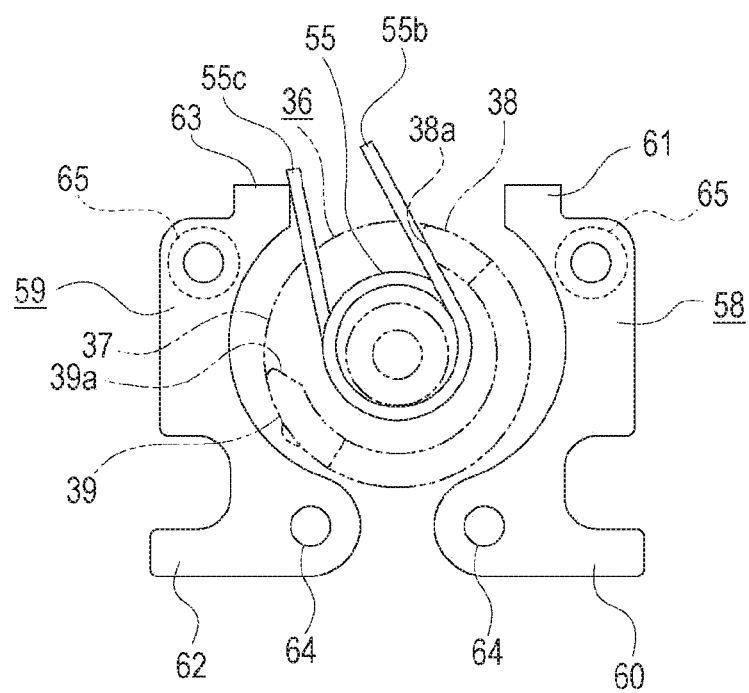
FIG. 35 is a front view illustrating a state in which an energizing force in an opposite direction to the rotation direction of the magnet is provided from the power assist spring to the magnet, following FIG. 32.

When the magnet 30 and the drive lever 40 are integrally rotated and the action lever 69 is turned in the direction of being the vertically extending state, the first spring bearing edge 38*a* of the spring bearing member 36 comes in contact with the first arm 55*b* of the power assist spring 55 at the same time (see FIG. 35). At this time, the second arm 55*c* of the power assist spring 55 is in contact with the spring pressing portion 63 of the effective range adjusting part 59. Therefore, the first arm 55*b* is pressed in a direction of approaching the second arm 55*c* by the first spring bearing edge 38*a* with the rotation of the magnet 30. Therefore, the energizing force in the opposite direction to the rotation direction is provided from the power assist spring 55 to the magnet 30 and the drive lever 40. The magnet 30 and the drive lever 40 are decelerated by the energizing force in the opposite direction to the rotation direction, and this energizing force acts on the drive lever 40 and the magnet 30 as the assist power in the decelerating direction.

Figure 36:
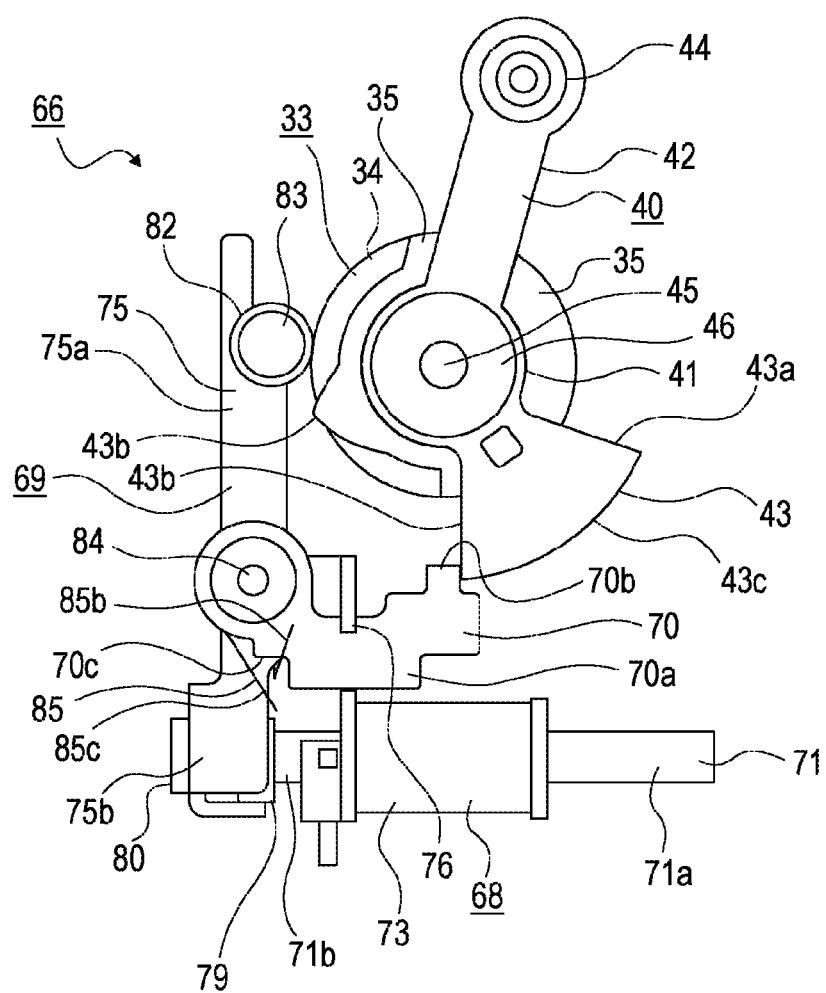
FIG. 36 is a front view illustrating a state in which the lock protrusion is engaged with a second engagement portion of the engagement piece, following FIG. 34.

When the magnet 30 and the drive lever 40 are further rotated, the sliding of the lock protrusion 70*b* of the lock lever 70 with respect to the sliding portion 43*c* is released by the rotation of the drive lever 40, and the lock lever 70 is turned in the direction of approaching the magnet 30 by the energizing force of the lock spring 85 and reaches the locked position again from the unlocked position (see FIG. 36). When the lock lever 70 is turned, the lock protrusion 70*b* is engaged with the second engagement portion 43*b* of the engagement piece 43. When the lock protrusion 70*b* is engaged with the second engagement portion 43*b*, the electric conduction to the coil 31 is stopped and the rotation of the magnet 30 and the drive lever 40 is stopped.

When the lock protrusion 70*b* of the lock lever 70 is engaged with the second engagement portion 43*b*, rotation of the magnet 30 in the opposite direction to the above direction is restricted. At this time, the first opening and closing blade 19 is moved to the open position and is locked at the open position.

During a period from immediately before the first opening and closing blade 19 is moved to the open position to when moved to the open position, the energizing force of the power assist spring 55 acts on the drive lever 40 and the magnet 30 as the assist power in the decelerating direction, as described above. Therefore, the first opening and closing blade 19 is decelerated during the period from immediately before the first opening and closing blade 19 is moved to the open position to when moved to the open position Note that, in the above description, the lock operation regarding the first opening and closing blade 19 has been described. However, as for the second opening and closing blade 20, a locked state is set at the closed position or the open position according to a similar operation to the above operation.

Meanwhile, when the magnet 30 is rotated in the opposite direction and the first opening and closing blade 19 is moved toward the closed position in the state where the first opening and closing blade 19 is in the open position, the portion to be attracted 79, the action lever 69, and the lock lever 70 are operated similarly to the above operation, engagement of the lock protrusion 70b with the second engagement portion 43b is released, next, the lock protrusion 70b is slid on the sliding portion 43c, and then the lock protrusion 70b is engaged with the first engagement portion 43a.

At the start of the rotation of the magnet 30 in the opposite direction, the second arm 55c of the power assist spring 55 comes in contact with the spring pressing portion 63 of the effective range adjusting part 59, and the first arm 55b is pressed in the direction of approaching the second arm 55c by the first spring bearing edge 38a (see FIG. 35). Therefore, at a predetermined rotation position immediately after the start from the start of the rotation of the magnet 30 in the opposite direction, the rotational force in the same direction as the rotation of the magnet 30 in the opposite direction is provided to the drive lever 40 by the power assist spring 55, and a large torque is provided to the magnet 30.

Furthermore, from a predetermined rotation position before the stop of the rotation of the magnet 30 in the opposite direction to a stop position, the first arm 55b of the power assist spring 55 comes in contact with the spring pressing portion 61 of the force amount adjusting part 58, and the second arm 55c is pressed in the direction of approaching the first arm 55b by the second spring bearing edge 39a. Therefore, from the predetermined rotation position before the stop of the rotation of the magnet 30 in the opposite direction to the stop position, the rotational force in the opposite direction to the rotation of the magnet 30 in the opposite direction is provided to the drive lever 40 by the power assist spring 55, and the magnet 30 and the drive lever 40 are decelerated.

As described above, the magnet 30 and the drive lever 40 are energized in the operation direction by the power assist spring 55 from the start position of the operation to a predetermined operation position after the start of the operation, and the rotational force in the same direction as the rotation of the magnet 30 is provided to the drive lever 40 by the power assist spring 55, and a large torque to the magnet 30 is provided.

Therefore, a torque in a predetermined rotation direction is provided to the drive lever 40 and the magnet 30 by the power assist spring 55, and operation speed of the first opening and closing blade 19 and the second opening and closing blade 20 can be improved.

Furthermore, a current amount to be supplied to the coil 31 can be controlled according to the force amount (spring force) of the power assist spring 55, and the operation speed of the first opening and closing blade 19 and the second opening and closing blade 20 can be set to a desired speed while reducing the power control.

Moreover, the drive lever 40 is energized in the operation direction by the power assist spring 55 from the start position of the operation to a predetermined operation position after the start of the operation, and is energized in the opposite direction to the operation direction by the power assist spring 55 from a predetermined operation position before the end of the operation to the end position of the operation.

Therefore, separate power assist springs for energizing the drive lever 40 in the opposite direction are unnecessary, and the functionality of the blade opening and closing device 11 can be improved while reducing the number of parts.

Furthermore, in the blade opening and closing device 11, the power assist spring 55 is located on the opposite side of the drive lever 40 across the magnet 30.

Therefore, since the drive lever 40 for operating the first opening and closing blade 19 or the second opening and closing blade 20 and the power assist spring 55 for providing the energizing force in the operation direction to the drive lever 40 are located on the opposite side to each other across the magnet 30, the power assist spring 55 and the drive lever 40 do not interfere and the degree of freedom of the arrangement positions of the power assist spring 55 and the drive lever 40 becomes high, and the blade opening and closing device 11 can be downsized while securing favorable functionality by the power assist spring 55.

Furthermore, since the rotation shaft 46 of the magnet 30 is located inside the external shape of the power assist spring 55, the magnet 30 and the power assist spring 55 are located side by side in the axial direction of the rotation shaft 46, and the blade opening and closing device 11 can be downsized in the direction orthogonal to the rotation shaft 46.

Moreover, since the torsion coil spring is used as the power assist spring 55, and the coil part 55a of the power assist spring 55 is located on an inside with respect to the outer peripheral surface of the magnet 30, the coil part 55a does not protrude outside the outer peripheral surface of the magnet 30, and the blade opening and closing device 11 can be further downsized in the direction orthogonal to the rotation shaft 46.

Furthermore, since the blade opening and closing device 11 is provided with the spring support member 53 for supporting the power assist spring 55, and the spring support member 53 is inserted in the coil part 55a, the power assist spring 55 is supported by the spring support member 53 in the state where the spring support member 53 is located inside the coil part 55a, and the blade opening and closing device 11 in the direction orthogonal to the rotation shaft 46 can be downsized while securing the stable supporting state of the power assist spring 55.

Furthermore, the blade opening and closing device 11 is provided with the spring bearing member 36 for receiving the first arm 55b and the second arm 55c of the power assist spring 55, and the spring bearing member 36 is mounted to one end surface (rear surface) of the magnet 30 in the axial direction of the rotation shaft 46 and is located on an inside with respect to the outer peripheral surface of the magnet 30.

Therefore, since the spring bearing member 36 receives the first arm 55b and the second arm 55c in the state of being located on an inside with respect to the outer peripheral surface of the magnet 30, the blade opening and closing device 11 in the direction orthogonal to the rotation shaft 46 can be downsized.

Moreover, since the magnet 30 and the spring bearing member 36 are integrally rotated, the spring bearing member 36 and the magnet 30 are rotated in the same direction at the same time, and the reliability of the operation of the spring bearing member 36 can be improved.

Note that the spring bearing member 36 and the magnet 30 may be formed by integral such as insert molding. In this case, a structure in which the spring bearing member 36 and the magnet 30 are integrated is formed, and thus high positioning accuracy is secured between the spring bearing member 36 and the magnet 30, and the molding accuracy of the spring bearing member 36 and the magnet 30 can be improved.

Furthermore, in the blade opening and closing device 11, the drive lever 40 is provided with the engagement piece 43 that functions as the portion to be locked, and the lock lever 70 that functions as the lock part is moved between the locked position where the locked state is set and the unlocked position where the locked state is released according to change in magnetic force with the rotation of the magnet 30.

Therefore, since the lock part and the portion to be locked are operated by the first magnetic drive unit 16 or the second magnetic drive unit 17, separate drive units for operating the lock part and the portion to be locked are not necessary, and the first opening and closing blade 19 and the second opening and closing blade 20 can be locked while simplifying the structure.

Moreover, the first opening and closing blade 19 and the second opening and closing blade 20 are moved between the open position where the opening 13a of the base body 13 is opened and the closed position where the opening 13a is closed, and the locked states are set at the open position and the closed position.

Therefore, the first opening and closing blade 19 and the second opening and closing blade 20 are locked at the two positions of the open position and the closed position by the single mechanism including the lock part and the portion to be locked, and the structure can be simplified and downsized.

Furthermore, since the first engagement portion 43a to be engaged with the lock part at the open position and the second engagement portion 43b to be engaged with the lock part at the closed position are formed in the engagement piece 43 that functions as the portion to be locked, the two engagement portions for locking the lock part at two positions are formed in the portion to be locked, and reduction in the number of parts and downsizing can be achieved.

In addition, since the drive lever 40 is provided with the engagement piece 43 that functions as the portion to be locked, and both edges of the engagement piece 43 are formed as the first engagement portion 43a and the second engagement portion 43b, the lock part is engaged with the both edges of the engagement piece 43 and is locked at the two positions, and the structure for locking the lock part at two positions can be simplified with the simple structure.

Moreover, sine the rotation fulcrums of the magnet 30 and the drive lever 40 coincide as the rotation shaft 46, the magnet 30 and the drive lever 40 are located side by side in the axial direction of the rotation shaft 46, and the structure of the blade opening and closing device 11 can be simplified and the structure of the blade opening and closing device 11 in the direction orthogonal to the axial direction of the rotation shaft 46 can be downsized.

Furthermore, since the drive lever 40 is fixed to the magnet 30 via the lever mounting member 33, the magnet 30 and the drive lever 40 are integrally rotated about the same rotation shaft 46 as a fulcrum, and the control can be facilitated, and the structure can be simplified and downsized by space saving.

Furthermore, since the drive lever 40 and the magnet 30 are turned in the same direction at the same time as the magnet 30 and the drive lever 40 are integrally rotated, the reliability of the operation of the drive lever 40 can be improved.

Moreover, in the blade opening and closing device 11, the arranging direction (up-down direction) of the first magnetic drive unit 16 and the second magnetic drive unit 17 coincides with the arranging direction of the first opening and closing blade 19 and the second opening and closing blade 20.

Therefore, since the first magnetic drive unit 16 and the second magnetic drive unit 17 are arranged in the order coinciding with the arranging direction of the first opening and closing blade 19 and the second opening and closing blade 20, the opening and closing operation of the first opening and closing blade 19 and the second opening and closing blade 20 can be easily performed while securing downsizing of the blade opening and closing device 11.

Furthermore, the arranging direction (up-down direction) of the first lock mechanism 66 and the second lock mechanism 67 coincides with the arranging direction of the first opening and closing blade 19 and the second opening and closing blade 20.

Therefore, since the first lock mechanism 66 and the second lock mechanism 67 are arranged in the order coinciding with the arranging direction of the first opening and closing blade 19 and the second opening and closing blade 20, the opening and closing operation of the first opening and closing blade 19 and the second opening and closing blade 20 can be easily performed while further securing downsizing of the blade opening and closing device 11.

As described above, in the blade opening and closing device 11, at least a part of the first lock mechanism 66 and at least a part of the second lock mechanism 67 are located between the first magnetic drive unit 16 and the second magnetic drive unit 17.

Therefore, since the first magnetic drive unit 16 and the second magnetic drive unit 17 are located on the opposite side across at least a part of the first lock mechanism 66 and at least a part of the second lock mechanism 67, the influence of the magnetic flux generated in one magnetic drive unit on the other magnetic drive unit can be decreased while securing downsizing of the blade opening and closing device 11.

Furthermore, at least a part of the second lock mechanism 67 is located between the first magnetic drive unit 16 and at least a part of the first lock mechanism 66, and at least a part of the first lock mechanism 66 is located between the second magnetic drive unit 17 and at least a part of the second lock mechanism 67.

Therefore, the first magnetic drive unit 16 and at least a part of the first lock mechanism 66 are located on the opposite side across at least a part of the second lock mechanism 67, and the second magnetic drive unit 17 and at least a part of the second lock mechanism 67 are located on the opposite side across at least a part of the first lock mechanism 66. Thereby, the operation of the first lock mechanism 66 can be less easily affected by the magnetic flux of the first magnetic drive unit 16 at the time of the operation of the first magnetic drive unit 16 and the first lock mechanism 66, and the operation of the second lock mechanism 67 can be less easily affected by the magnetic flux of the second magnetic drive unit 17 at the time of the operation of the second magnetic drive unit 17 and the second lock mechanism 67.

Moreover, in the blade opening and closing device 11, a part of the first lock mechanism 66 and a part of the second lock mechanism 67 are located to overlap and intersect in the front-rear direction that is the direction orthogonal to the up-down direction that is the arranging direction of the first magnetic drive unit 16 and the second magnetic drive unit 17.

Therefore, since the arrangement space of the first lock mechanism 66 and the second lock mechanism 67 becomes small in the arranging direction of the first magnetic drive unit 16 and the second magnetic drive unit 17, the first lock mechanism 66 and the second lock mechanism 67 can be located to be close to each other in the arranging direction of the first magnetic drive unit 16 and the second magnetic drive unit 17, and the blade opening and closing device 11 can be downsized.

Moreover, in the first lock mechanism 66, the turning shaft 84 of the action lever 69 is located between the first magnetic drive unit 16 and the attracting body 68, and in the second lock mechanism 67, the turning shaft 84 of the action lever 69 is located between the second magnetic drive unit 17 and the attracting body 68.

Therefore, since the distance between the turning shaft 84 and the attracting body 68 becomes large in the first lock mechanism 66 and the second lock mechanism 67, a holding force for the action lever 69 by the attracting body 68 can be made large, and the reliability of the operation of the first lock mechanism 66 and the second lock mechanism 67 can be improved.

In other words, the turning shaft 84 of the first lock mechanism 66 is located between the first magnetic drive unit 16 and the attracting body 68, and the turning shaft 84 of the second lock mechanism 67 is located between the second magnetic drive unit 17 and the attracting body 68, whereby the second portions 75b and 75b of the action levers 69 and 69 can be made long. Therefore, attracting positions of the portions to be attracted 79 and 79 by the attracting bodies 68 and 68 can be set to positions separated from the turning shafts 84 and 84, and the holding force for the action levers 69 by the attracting bodies 68 can be made large.

Furthermore, in the blade opening and closing device 11, the partition 28 is provided between the first magnetic drive unit 16, and the first lock mechanism 66 and the second lock mechanism 67, and the partition 28 is provided between the second magnetic drive unit 17, and the first lock mechanism 66 and the second lock mechanism 67, in the housing case 15.

Therefore, since the first magnetic drive unit 16 or the second magnetic drive unit 17 is partitioned from the first lock mechanism 66 or the second lock mechanism 67 by the partitions 28 and 28, the first lock mechanism 66 and the second lock mechanism 67 can be less easily affected by the magnetic flux of the first magnetic drive unit 16 or the magnetic flux of the second magnetic drive unit 17 at the time of the operation of the first magnetic drive unit 16 or the second magnetic drive unit 17.

Figure 37:
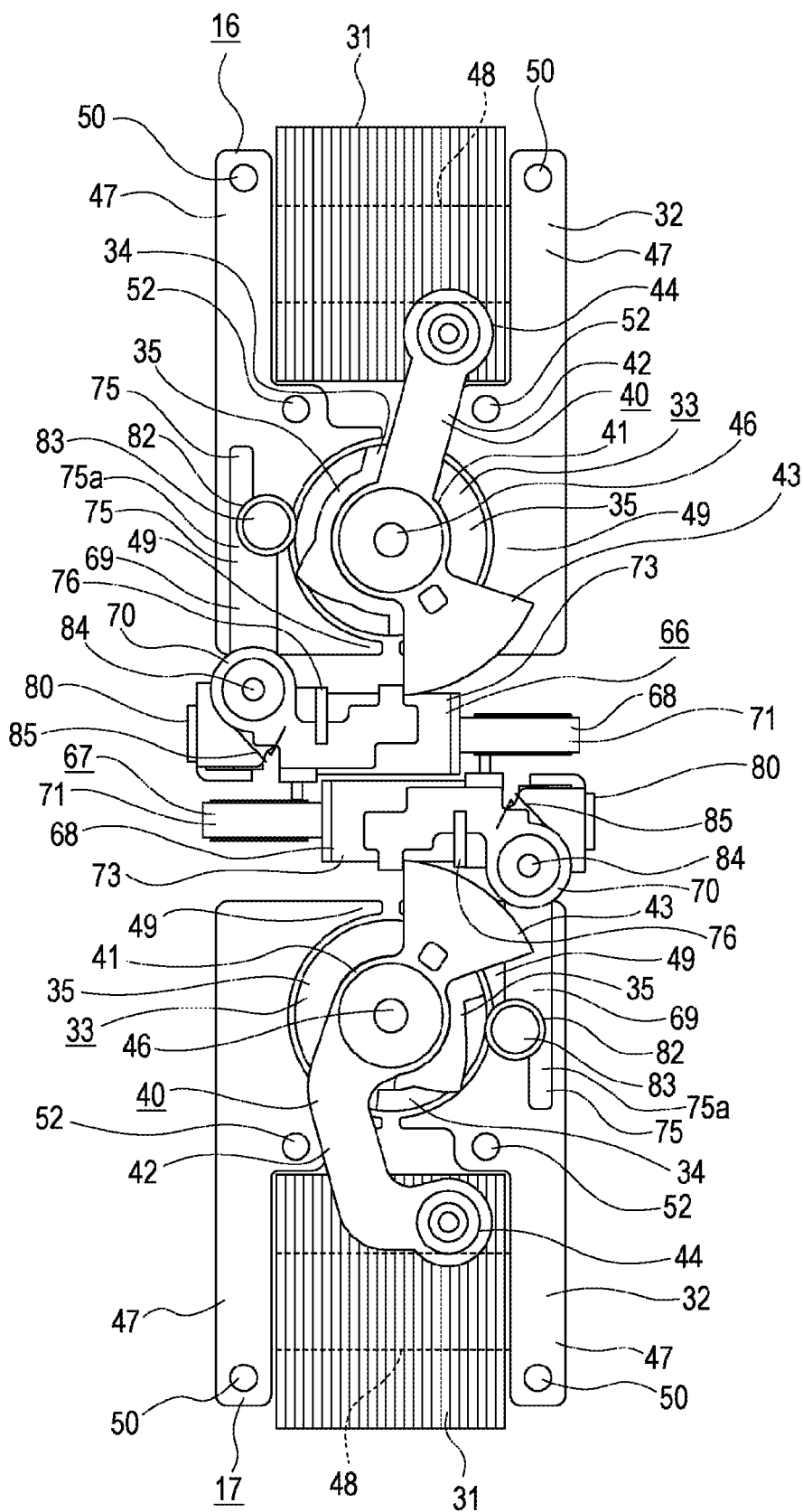
FIG. 37 is a front view illustrating another arrangement state of the first magnetic drive unit, the second magnetic drive unit, the first lock mechanism, and the second lock mechanism.

Note that, in the above description, an example in which a part of the second lock mechanism 67 is located between the first magnetic drive unit 16 and the first lock mechanism 66, and a part of the first lock mechanism 66 is located between the second magnetic drive unit 17 and the second lock mechanism 67 has been described. However, a part of the first lock mechanism 66 may be located on the first magnetic drive unit 16 side, and a part of the second lock mechanism 67 may be located on the second magnetic drive unit 17 (see FIG. 37).

With such a configuration, the action lever 69 in the longitudinal direction can be made short. Therefore, the action lever 69 becomes small in weight, and the blade opening and closing device 11 can be reduced in weight.

<Operation Example of Opening and Closing Blade>

Hereinafter, an example of a specific operation of the first opening and closing blade 19 and the second opening and closing blade 20 will be described.

In the state where the power button 6 of the imaging apparatus 1 is not operated, the first opening and closing blade 19 is set to the closed position, and the second opening and closing blade 20 is set to the open position, as described above (see FIG. 28).

Figure 38:
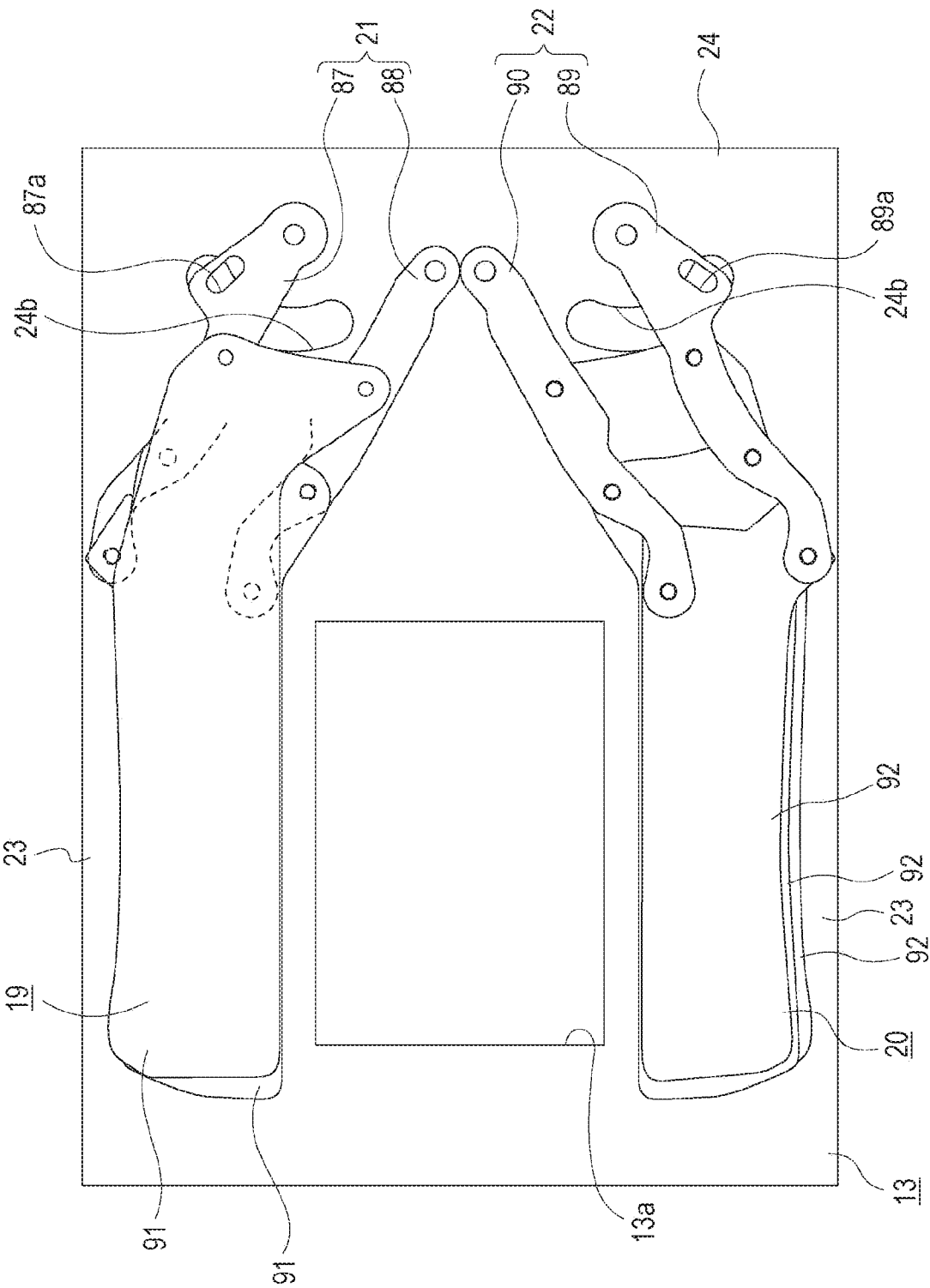
FIG. 38 is a front view illustrating a state in which the first opening and closing blade and the second opening and closing blade are at the open position.

When the power button 6 of the imaging apparatus 1 is operated, a live view mode in which a photographer can visually recognize an object with the display 7 or the finder 9 is set, for example. At this time, a drive current is supplied to the coil 31 of the first magnetic drive unit 16, a drive force is generated in the first magnetic drive unit 16, and the first opening and closing blade 19 is moved from the closed position to the open position (see FIG. 38).

When the first opening and closing blade 19 is moved to the open position, the opening 13a is opened and light taken in from the optical system 10 becomes incident on the imaging element 12, and the photographer can visually recognize the object with the display 7 or the finder 9.

Figure 39:
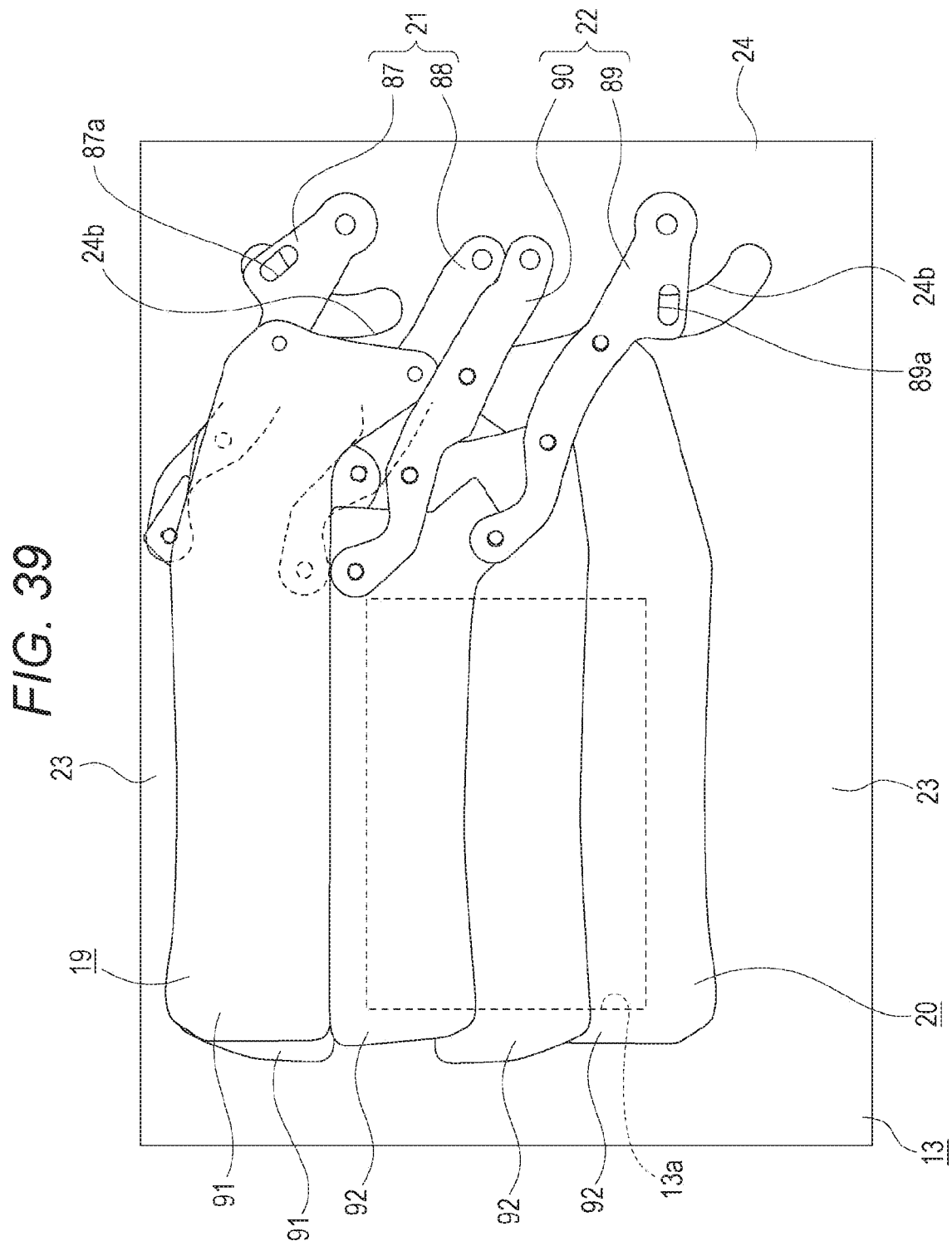
FIG. 39 is a schematic front view illustrating a state in which the first opening and closing blade is at the open position and the second opening and closing blade is at the closed position.

Next, when the shutter button 4 is operated and the object is captured, the drive current is supplied to the coil 31 of the second magnetic drive unit 17, the drive force is generated in the second magnetic drive unit 17, the second opening and closing blade 20 is moved from the open position to the closed position, and the opening 13a is closed (see FIG. 39).

Figure 40:
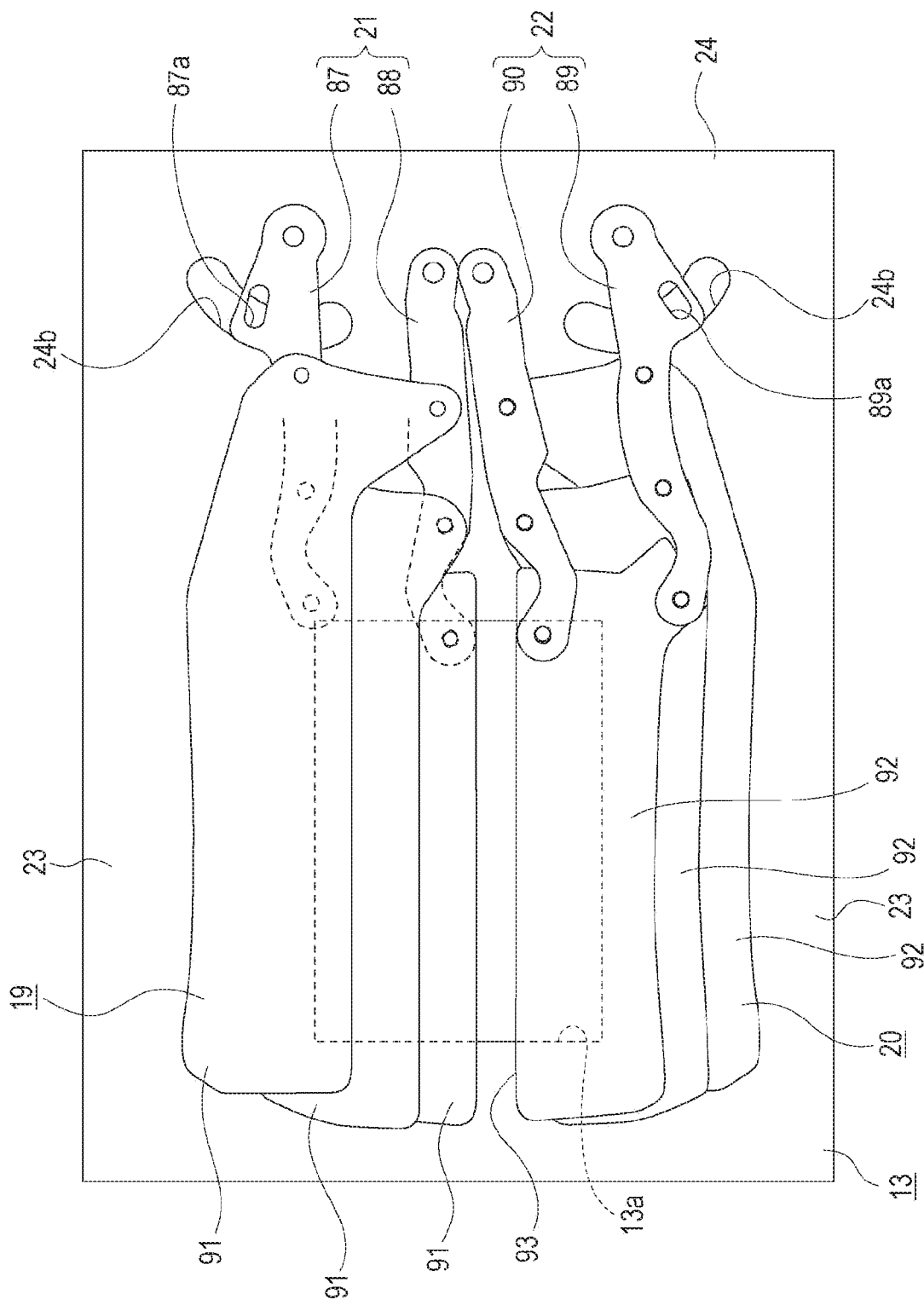
FIG. 40 is a front view illustrating a state where slid traveling is being performed.
Figure 41:
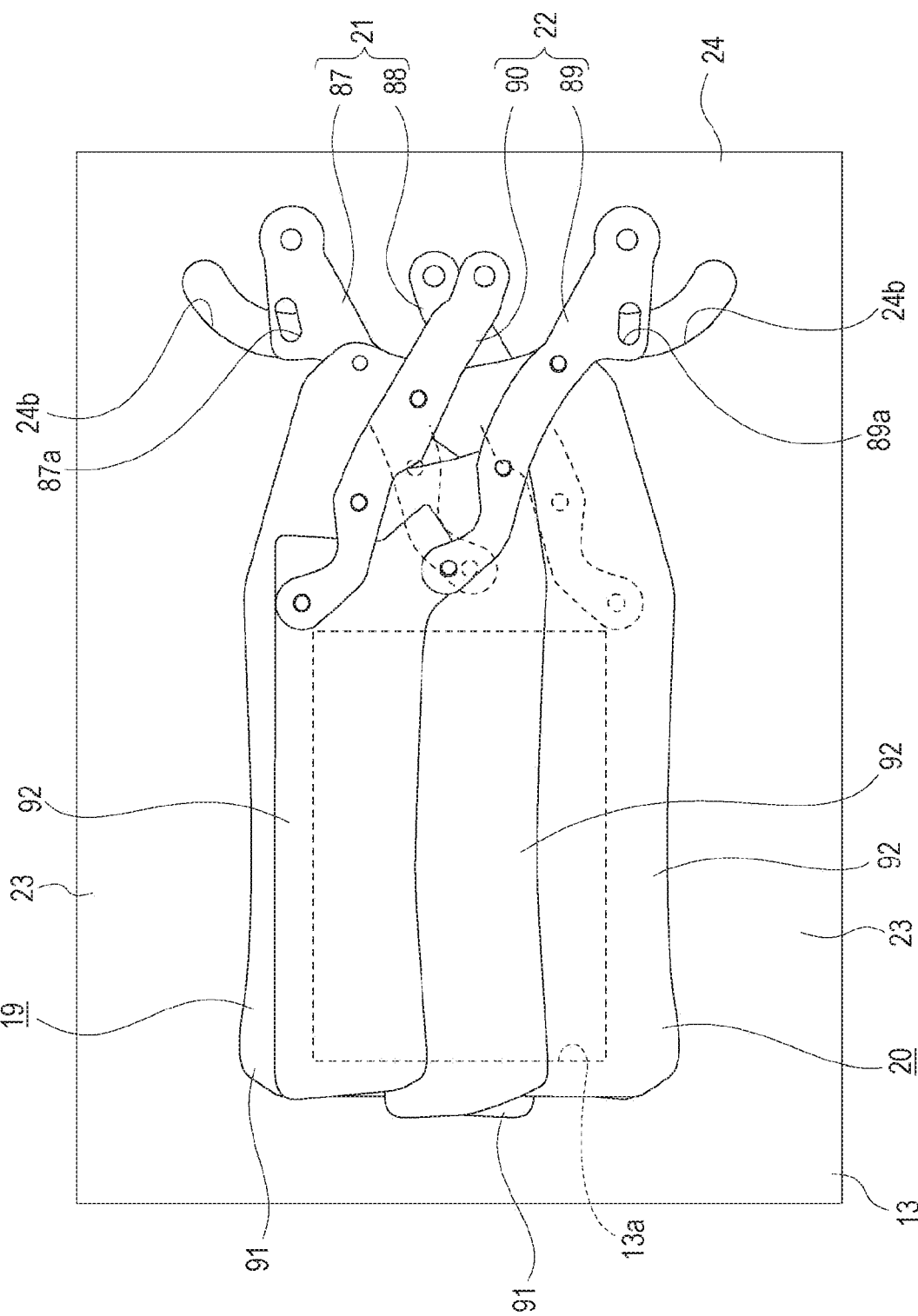
FIG. 41 is a front view illustrating a state in which the first opening and closing blade and the second opening and closing blade are at the closed position.
Figure 42:
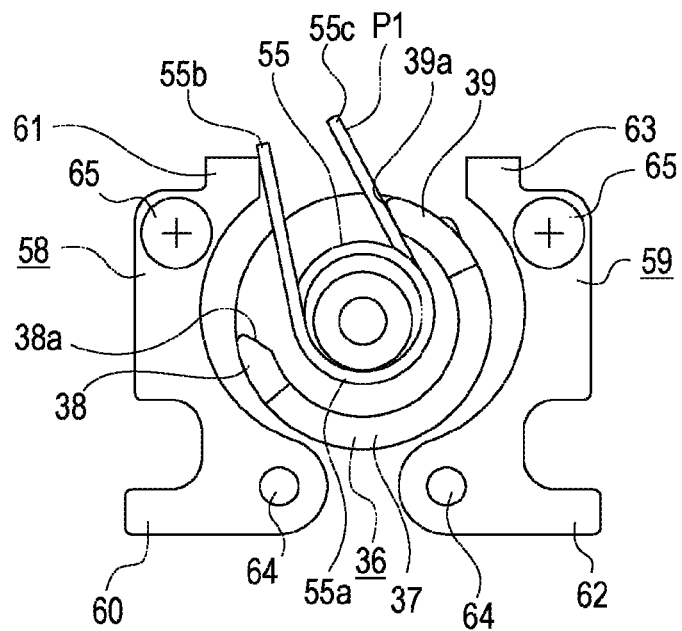
FIG. 42 illustrates adjustment of the power assist spring by the force amount adjusting part together with FIG. 43, and is a back view illustrating a state before the adjustment is performed.

When the second opening and closing blade 20 is moved to the closed position, the drive current in the opposite direction is supplied to the coil 31 of the second magnetic drive unit 17, and the second opening and closing blade 20 is moved from the closed position to the open position. When the second opening and closing blade 20 is moved toward the open position, the drive current in the opposite direction is supplied to the coil 31 of the first magnetic drive unit 16 immediately after the start of the movement of the second opening and closing blade 20 toward the open position, and the first opening and closing blade 19 is move following the second opening and closing blade 20 from the open position to the closed position. When the first opening and closing blade 19 is moved following the second opening and closing blade 20, a slit 93 having a predetermined width is formed between the second opening and closing blade 20 and the first opening and closing blade 19 (see FIG. 40), and the second opening and closing blade 20 and the first opening and closing blade 19 are moved to the open position or the closed position in the state where the slit 93 having a fixed width is formed.

The operation in which the second opening and closing blade 20 and the first opening and closing blade 19 are moved in the state where the slit 93 is formed is an operation referred to as slit traveling, and light sequentially enters the imaging element 12 from one end portion to the other end portion through the transmission hole 14a of the pressing plate 14, the slit 93, and the opening 13a of the base body 13 by the slit traveling, and exposure is performed.

Figure 28:
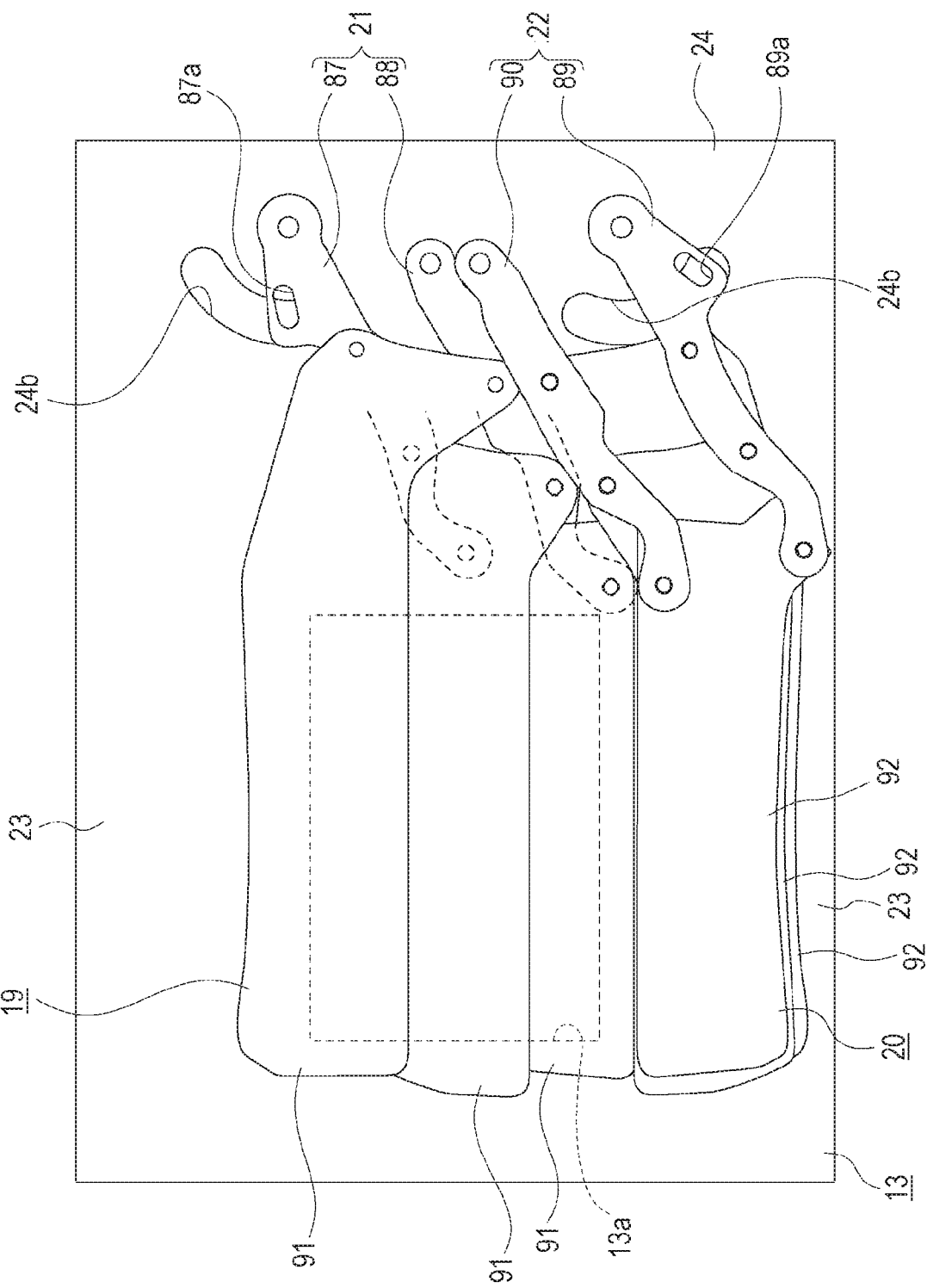
FIG. 28 is a schematic front view illustrating a state in which a first opening and closing blade is at a closed position and a second opening and closing blade is at an open position.

When the slit traveling is terminated, the second opening and closing blade 20 is moved to the open position and the first opening and closing blade 19 is moved to the closed position, and the opening 13a is closed again (see FIG. 28).

Next, the drive current is supplied to the coil 31 of the second magnetic drive unit 17, the second opening and closing blade 20 is moved to the closed position, and the opening 13a is closed by the second opening and closing blade 20 and the first opening and closing blade 19 (see FIG. 35). In the state where the opening 13a is closed by the second opening and closing blade 20 and the first opening and closing blade 19, the light having entered the imaging element 12 is sequentially photoelectrically converted and an image signal is generated at the time of the slit traveling, and the generated image signal is transferred to a memory and an image of the object is generated.

Note that the operation in which the light having entered the imaging element 12 is sequentially photoelectrically converted and the image signal is transferred to the memory at the time of the slit traveling may be performed in the state where the second opening and closing blade 20 is moved to the open position and the first opening and closing blade 19 is moved to the closed position, and the opening 13*a* is closed when the slit traveling is terminated (see FIG. 28).

<Adjustment of Power Assist Spring>

Hereinafter, adjustment by the force amount adjusting part 58 and the effective range adjusting part 59 of the power assist spring 55 will be described (see FIGS. 42 to 45).

As described above, the force amount adjusting part 58 and the effective range adjusting part 59 are turnably supported by the first pressing surface part 56 of the cover 18. The set screws 65 and 65 are respectively inserted into the lever stop holes 56*c* and 56*c* and screwed with the position adjustment screw hole 60*a* and the position adjustment screw hole 62*a*, so that the force amount adjusting part 58 and the effective range adjusting part 59 are held at desired turning positions with respect to the first pressing surface part 56. At this time, a jig or the like (not illustrated) is inserted through the working hole 56*d* into the first pressing surface part 56, and the first arm 55*b* or the second arm 55*c* of the power assist spring 55 can be displaced by the jig or the like, for example, to be in a non-contact state with the force amount adjusting part 58, the effective range adjusting part 59, the first spring bearing protrusion 38 of the spring bearing member 36, or the second spring bearing protrusion 39 of the spring bearing member 36.

As described above, the first arm 55*b* or the second arm 55*c* is made in a non-contact state with the force amount adjusting part 58, the effective range adjusting part 59, the first spring bearing protrusion 38, or the second spring bearing protrusion 39, so that adjustment by the force amount adjusting part 58 or the effective range adjusting part 59 becomes possible in a state where no energizing force of the power assist spring 56 is provided to the force amount adjusting part 58, the effective range adjusting part 59, or the spring bearing member 36, and the turning position of the force amount adjusting part 58 or the effective range adjusting part 59 can be easily set with high accuracy.

As described above, in the blade opening and closing device 11, the working hole 56*d* for performing adjustment regarding the energizing force of the power assist spring 55 is formed in the cover 18.

Therefore, the adjustment regarding the energizing force of the power assist spring 55 can be performed through the working hole 56*d* in a state where each part such as the cover 18 is assembled in the housing case 15, and the adjustment regarding the energizing force of the power assist spring 55 can be appropriately and easily performed in the assembled state of the each part.

Figure 43:
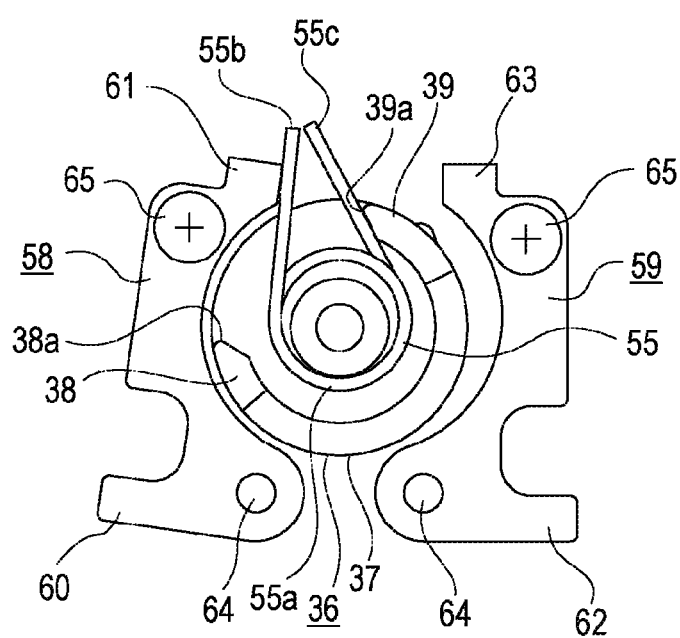
FIG. 43 is a back view illustrating a state in which the adjustment has been performed.
Figure 44:
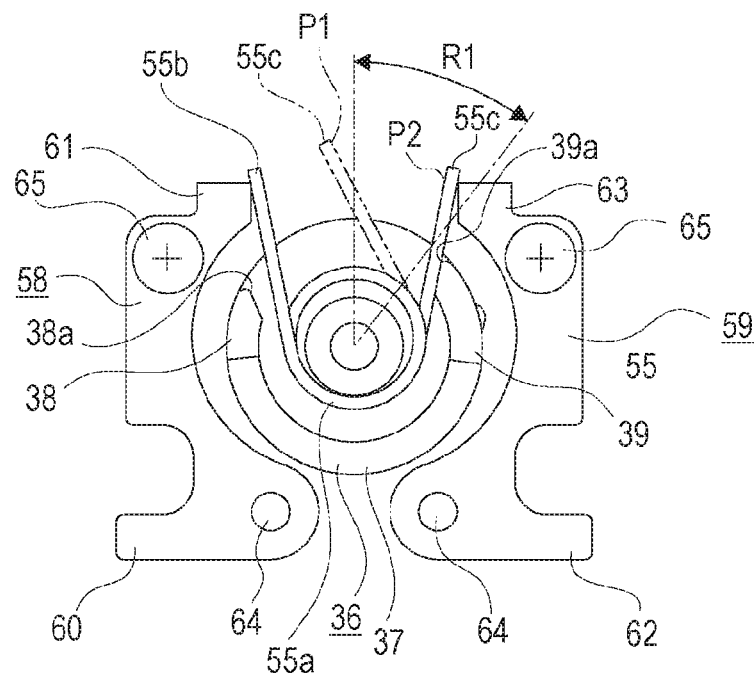
FIG. 44 illustrates adjustment of the power assist spring by the effective range adjusting part together with FIG. 45, and is a back view illustrating a state before the adjustment is performed.

In the adjustment by the force amount adjusting part 58, the force amount adjusting part 58 is turned to a desired position in the state where the first arm 55*b* of the power assist spring 55 is in contact with the spring pressing portion 61 of the force amount adjusting part 58 and the second arm 55*c* of the power assist spring 55 is pressed by the second spring bearing edge 39*a* of the spring bearing member 36 (see FIG. 42), for example, so that the energizing force (force amount) of the power assist spring 55 to the magnet 30 and the drive lever 40 can be changed (see FIG. 43).

As described above, the blade opening and closing device 11 is provided with the force amount adjusting part 58 for adjusting the energizing force of the power assist spring 55.

Therefore, since the energizing force of the power assist spring 55 can be adjusted by the force amount adjusting part 58, a desired energizing force is provided to the drive lever 40 from the power assist spring 55 regardless of variations of the energizing force due to the processing accuracy of the power assist spring 55, the assembly accuracy of each part, or the like, and the first opening and closing blade 19 and the second opening and closing blade 20 can be operated at a desired speed.

Figure 45:
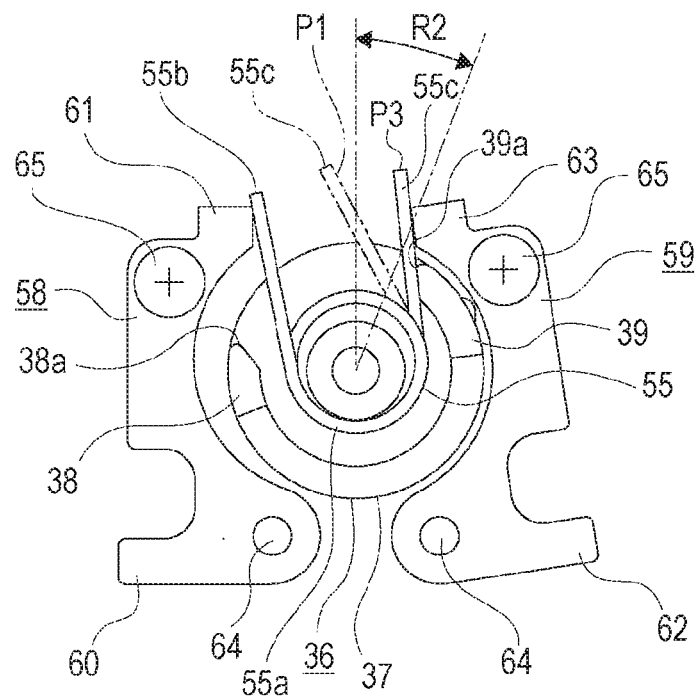
FIG. 45 is a back view illustrating a state in which the adjustment has been performed.

In the adjustment by the effective range adjusting part 59, the effective range adjusting part 59 is turned to a desired position in the state where the first arm 55*b* of the power assist spring 55 is in contact with the spring pressing portion 61 of the force amount adjusting part 58, and the second arm 55*c* of the power assist spring 55 is in contact with the spring pressing portion 63 of the effective range adjusting part 59 (see FIG. 44), for example, whereby the range (angle) of generation of the energizing force of the power assist spring 55 to the magnet 30 and the drive lever 40 can be changed (see FIG. 45).

For example, the position of the second arm 55*c* of the power assist spring 55 corresponding to an operation start position (traveling start position of the opening and closing blade) is defined as position P1 (see FIGS. 42, 44, and 45), the position of the second arm 55*c* before adjustment is defined as position P2 (see FIG. 44), and the position of the second arm 55*c* after adjustment is defined as position P3 (see FIG. 45). The range in which the energizing force for the magnet 30 and the drive lever 40 by the power assist spring 55 is generated is an operation range R1 of P1 and P2 before adjustment (see FIG. 44), and an operation range R2 of P1 and P3 after adjustment (see FIG. 45).

As described above, the blade opening and closing device 11 is provided with the effective range adjusting part 59 for adjusting the range in which the energizing force of the power assist spring 55 is provided.

Therefore, since the range in which the energizing force of the power assist spring 55 is provided can be adjusted by the effective range adjusting part 59, the energizing force is provided from the power assist spring 55 to the drive lever 40 in a desired range regardless of variations of the range of the energizing force due to the processing accuracy of the power assist spring 55, the assembly accuracy of each part, or the like, and the first opening and closing blade 19 and the second opening and closing blade 20 can be operated at a desired speed.

Furthermore, the blade opening and closing device 11 is provided with the cover 18 that covers the magnet 30 and the power assist spring 55, and the force amount adjusting part 58 and the effective range adjusting part 59 are supported on the inner surface side of the cover 18.

Therefore, since the magnet 30 and the power assist spring 55 are covered with the cover 18, and the force amount adjusting part 58 and the effective range adjusting part 59 are supported by the cover 18, special parts for supporting the force amount adjusting part 58 and the effective range adjusting part 59 are not necessary, and the magnet 30 and the power assist spring 55 can be protected and the force amount adjusting part 58 and the effective range adjusting part 59 can be supported while decreasing the number of parts.

Note that the positions of the force amount adjusting part 58 and the effective range adjusting part 59 may be located in the opposite direction to the above description in the right-left direction.

Moreover, since the power assist spring 55 is located between the force amount adjusting part 58 and the effective range adjusting part 59, the force amount adjusting part 58 and the effective range adjusting part 59 are located on the opposite side to each other across the power assist spring 55, the force amount adjusting part 58 and the effective range adjusting part 59 do not interfere, and the adjustment by the force amount adjusting part 58 and the effective range adjusting part 59 with respect to the power assist spring 55 can be easily and reliably performed.

Furthermore, the force amount adjusting part 58 is turnably supported by the cover 18, and energizing force of the power assist spring 55 is changed according to the turning position of the force amount adjusting part 58 with respect to the cover 18.

Therefore, the energizing force provided from the power assist spring 55 to the drive lever 40 is changed as the force amount adjusting part 58 is turned with respect to the cover 18, and thus the adjustment of the energizing force by the force amount adjusting part 58 can be easily performed.

In addition, the effective range adjusting part 59 is turnably supported by the cover 18, and the range of the energizing force provided from the power assist spring 55 to the drive lever 40 is changed according to the turning position of the effective range adjusting part 59 with respect to the cover 18.

Therefore, the range of the energizing force provided from the power assist spring 55 to the drive lever 40 is changed as the effective range adjusting part 59 is turned with respect to the cover 18, and thus the adjustment of the energizing force by the effective range adjusting part 59 can be easily performed.

<Others>

In the blade opening and closing device 11, when the lock protrusion 70b of the lock lever 70 is slid on the sliding portion 43c of the engagement piece 43 at the time of the turning of the drive lever 40, a sound due to sliding (shutter sound) may occur, and the occurring sound may become an abnormal sound. Therefore, to reduce or prevent the occurrence of sound due to sliding or to change the tone, the timing of the turning of the lock lever 70 relative to the drive lever 40 may be changed, or the material of the lock lever 70 or the engagement piece 43 may be changed, for example.

<Control Configuration of Imaging Apparatus>

Figure 46:
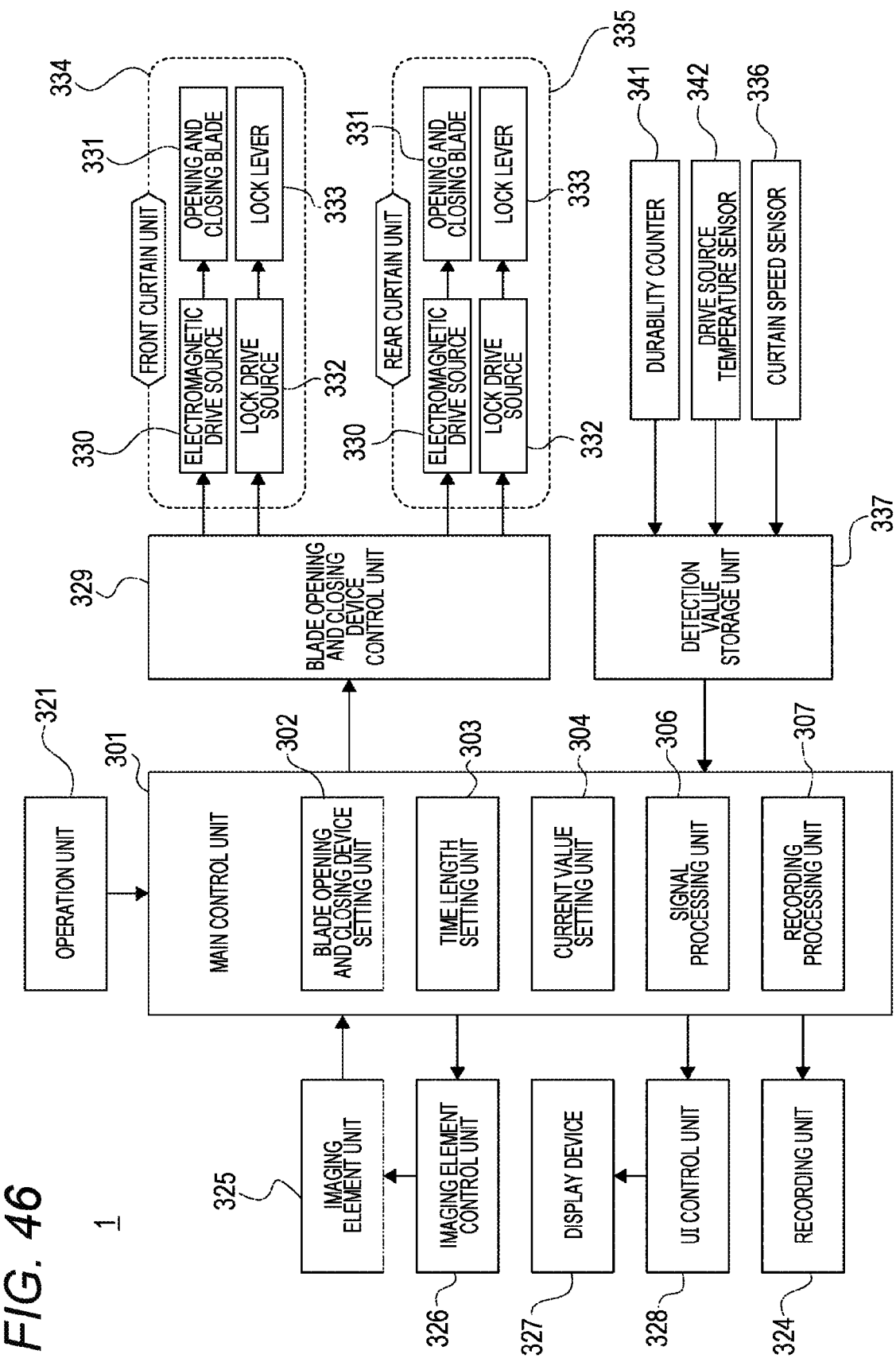
FIG. 46 is a block diagram of the imaging apparatus.

Hereinafter, a control configuration of the imaging apparatus 1 including the blade opening and closing device 11 will be described (see FIG. 46).

The imaging apparatus 1 includes an imaging element unit 325 that receives incident light from an optical system (not illustrated). The imaging element unit 325 includes, for example, an imaging element 12 of a charge coupled device (CCD) type, a complementary metal oxide semiconductor (CMOS) type, or the like, and a peripheral circuit system, and receives incident light and converts the incident light into an electrical signal. Then, for the electrical signal obtained by photoelectric conversion in the imaging element 12, for example, correlated double sampling (CDS) processing, automatic gain control (AGC) processing, and the like are executed, and analog/digital (A/D) conversion processing is further performed. Then, a captured image signal as digital data is supplied to a main control unit 301.

The main control unit 301 performs operation control of each unit of the imaging apparatus 1 and signal processing of the captured image signal. The main control unit 301 includes a microcomputer (arithmetic processing unit) provided with, for example, a central processing unit (CPU), a read only memory (ROM), a random access memory (RAM), a flash memory, and the like.

The CPU executes a program stored in the ROM, the flash memory, or the like to control the entire imaging apparatus 1 in an integrated manner.

The RAM is used for temporary storage of data, programs, and the like, as a work area for various data processing by the CPU.

The ROM and the flash memory (nonvolatile memory) are used to store an operating system (OS) for the CPU to control each unit, content files such as image files, an application program for various operations, firmware, and the like.

Note that the control function and the captured image signal processing function may be separately configured as separate chips, for example, a microcomputer, a digital signal processor (DSP), and the like.

The main control unit 301 has functions as a blade opening and closing device setting unit 302, a time length setting unit 303, a current value setting unit 304, a signal processing unit 306, a recording processing unit 307. These functions are operation functions realized by processing executed by a program by the microcomputer, and illustrate a software configuration.

The signal processing unit 306 and the recording processing unit 307 are functions as the normal imaging apparatus 1. Note that, although illustration is omitted, in practice, the main control unit 301 is assumed to have more various functions.

First, functions as the signal processing unit 306 and the recording processing unit 307 and peripheral configurations, and control processing of the main control unit 301 by functions (not illustrated) will be described.

The signal processing unit 306 applies various types of signal processing to a digital signal (captured image signal) from the imaging element unit 325. The signal processing unit 306 performs noise removal processing, color correction processing, contour enhancement processing, resolution conversion processing, codec processing, and the like for the captured image signal. Thereby, the signal processing unit 306 generates image data for recording, transmission, display, and the like, as a still image or a moving image.

The recording processing unit 307 is a function to perform control for causing a recording unit 324 to record the image data processed in the signal processing unit 306 in a recording medium. In other words, the recording processing unit 307 supplies the image data encoded for recording to the recording unit 324, provides a recording instruction and recording address information, and causes the recording unit 324 to execute a recording operation. Furthermore, the recording processing unit 307 can provide a reading instruction and reading address information to the recording unit 324 to cause the recording unit 324 to execute reading of the image data and the like from the recording medium.

The recording unit 324 stores the image data in the storage medium on the basis of the control of the main control unit 301 (recording processing unit 307). The storage medium may be a removable medium as a memory card, an optical disc, a magnetic tape, or the like, or may be a fixed-type hard disk drive (HDD), semiconductor memory module, or the like.

The main control unit 301 has a display control function as a function (not illustrated). The main control unit 301 supplies an instruction and display data to a user interface (UI) control unit 328 to cause the UI control unit 328 to execute display on a display device 327.

The display device 327 is a display unit that performs various displays for a user (imaging person), and is formed including a display device such as a liquid crystal display (LCD) or an organic electro-luminescence (EL) as the display 7 formed on the housing of the imaging apparatus 1. Note that the display device 327 may be formed using an LCD, an organic EL display, or the like in the form of a so-called viewfinder.

For such a display device 327, the main control unit 301 performs control to display, for example, a so-called through image (object monitoring image) being captured or display an image reproduced by the recording unit 324.

Furthermore, the main control unit 301 instructs the UI control unit 328 to display various operation menus, icons, messages, and the like, as graphical user interface (GUI), on a screen.

The main control unit 301 has a function to detect operation information, and detects user operation information by an operation unit 321.

The operation unit 321 collectively shows operators and input devices for the user to perform various operation inputs. Operators such as the shutter button 4 (release button), the zoom switch 5, the power button 6 provided on the housing 2 of the imaging apparatus 1, other menu buttons, an enter button, a cross key, a cancel button, a mode key, and a slide key are collectively shown as the operation unit 321.

Furthermore, in a case where the display device 327 is provided with a touch panel, various operations may be made possible by a touch panel operation using icons, menus, or the like to be displayed on the display device 327, or a tap operation, a slide operation, and the like of the user may be detected by a touch pad or the like. Moreover, a separate remote controller may be used as the operation unit 321. These touch panel, touch pad, and remote controller are also included in the operation unit 321.

Furthermore, the main control unit 301 has a function to control the operation of the imaging element 12. In other words, the main control unit 301 instructs an imaging element control unit 326 to operate the imaging element 12 in the imaging element unit 325, and controls a photoelectric conversion operation. The main control unit 301 issues an on/off instruction for the photoelectric conversion operation, a timing instruction, a synchronization signal supply, and the like to the imaging element control unit 326. The imaging element control unit 326 controls charge accumulation, transfer (read), and reset operation of the imaging element 12 according to the instruction.

Moreover, the main control unit 301 controls focus/zoom operation, autofocus, operations of necessary units for a communication operation with an external device by a communication unit (not illustrated), and the like.

Next, travel control of the blade opening and closing device 11 will be described.

For example, the blade opening and closing device setting unit 302 in the main control unit 301 performs settings related to the operation of the blade opening and closing device 11 on the basis of a user operation or a program. A blade opening and closing device control unit 329 controls the operation of the front curtain unit 334 and the rear curtain unit 335 on the basis of the setting. The front curtain unit 334 represents a mechanism related to the first opening and closing blade 19, and the rear curtain unit represents a mechanism related to the second opening and closing blade 20.

Each of the front curtain unit 334 and the rear curtain unit 335 includes an electromagnetic drive source 330, an opening and closing blade 331, a lock drive source 322, and a lock lever 333.

These elements correspond as follows in the structure of the blade opening and closing device 11. The electromagnetic drive source 330 is the first magnetic drive unit 16 or the second magnetic drive unit 17. The opening and closing blade 331 is the first opening and closing blade 19 or the second opening and closing blade 20. The lock drive source 322 is the attracting body 68. The lock lever 333 corresponds to the lock lever 70.

The blade opening and closing device control unit 329 performs electric conduction to the electromagnetic drive source 330 and the lock drive source 322 for each of the front curtain unit 334 and the rear curtain unit 335, thereby driving the opening and closing blade 331 and the lock lever 333. Thereby, the curtain travel of the above-described opening and closing blade 331 is executed. Regarding the curtain travel, the imaging apparatus 1 includes a durability counter 341, a drive source temperature sensor 342, a curtain speed sensor 336, and a detection value storage unit 337.

The durability counter 341 counts the number of times of curtain travel of the opening and closing blade 331. A count value of the durability counter 341 is stored in the detection value storage unit 337 in an updated state each time. The drive source temperature sensor 342 detects the temperature of the electromagnetic drive source 330. Information of the detected temperature is stored in the detection value storage unit 337. The curtain speed sensor 336 detects the curtain traveling speed. Information of the detection speed is stored in the detection value storage unit 337. As a result, the main control unit 301 can confirm the number of times of traveling, a temperature state, and a curtain speed state with reference to the detection value storage unit 337 when necessary.

<Present Technology>

The present technology can also have the following configurations.

(1)

A blade opening and closing device including:

a first magnetic drive unit including a first coil to which a drive current is supplied and a first magnet rotated with electric conduction to the first coil;

a second magnetic drive unit including a second coil to which a drive current is supplied and a second magnet rotated with electric conduction to the second coil;

a first drive lever operated by the first magnetic drive unit;

a second drive lever operated by the second magnetic drive unit;

a first opening and closing blade that opens and closes an opening by an operation of the first drive lever;

a second opening and closing blade that opens and closes the opening by an operation of the second drive lever;

a first lock mechanism that locks the first drive lever at a predetermined position; and a second lock mechanism that locks the second drive lever at a predetermined position, in which at least a part of the first lock mechanism and at least a part of the second lock mechanism are located between the first magnetic drive unit and the second magnetic drive unit.

(2)

The blade opening and closing device according to (1), in which at least a part of the second lock mechanism is located between the first magnetic drive unit and at least a part of the first lock mechanism, and at least a part of the first lock mechanism is located between the second magnetic drive unit and at least a part of the second lock mechanism.

(3)

The blade opening and closing device according to (2), in which a part of the first lock mechanism and a part of the second lock mechanism are located to intersect in a direction orthogonal to an arranging direction of the first magnetic drive unit and the second magnetic drive unit.

(4)

The blade opening and closing device according to (2) or (3), in which the first lock mechanism is provided with a first lock lever that restricts the operation of the first drive lever according to a turning position, a first action lever that restricts turn of the first lock lever according to a turning position, and a first attracting body that holds the first action lever by attraction, the second lock mechanism is provided with a second lock lever that restricts the operation of the second drive lever according to a turning position, a second action lever that restricts turn of the second lock lever according to a turning position, and a second attracting body that holds the second action lever by attraction, the second attracting body is located between the first magnetic drive unit and the first attracting body, the first attracting body is located between the second magnetic drive unit and the second attracting body, a turning shaft of the first action lever is located between the first magnetic drive unit and the first attracting body, and a turning shaft of the second action lever is located between the second magnetic drive unit and the second attracting body.

(5)

The blade opening and closing device according to any one of (1) to (3), in which the first lock mechanism is provided with a first lock lever that restricts the operation of the first drive lever according to a turning position and a first action lever that restricts turn of the first lock lever according to a turning position, the second lock mechanism is provided with a second lock lever that restricts the operation of the second drive lever according to a turning position and a second action lever that restricts turn of the second lock lever according to a turning position, a turning shaft of the first action lever and a turning shaft of the first lock lever are made same, and a turning shaft of the second action lever and a turning shaft of the second lock lever are made same.

(6)

The blade opening and closing device according to any one of (1) to (5), in which the first magnetic drive unit and the second magnetic drive unit are located in a line-symmetric arrangement state.

(7)

The blade opening and closing device according to any one of (1) to (6), in which the first lock mechanism and the second lock mechanism are located in a point-symmetric arrangement state.

(8)

The blade opening and closing device according to any one of (1) to (7), in which a part constituting the first lock mechanism and a part constituting the second lock mechanism are made a same part.

(9)

The blade opening and closing device according to any one of (1) to (8), in which an arranging direction of the first magnetic drive unit and the second magnetic drive unit is caused to coincide with an arranging direction of the first opening and closing blade and the second opening and closing blade.

(10)

The blade opening and closing device according to any one of (1) to (9), in which an arranging direction of the first lock mechanism and the second lock mechanism is caused to coincide with an arranging direction of the first opening and closing blade and the second opening and closing blade.

(11)

The blade opening and closing device according to any one of (1) to (10), in which the first magnetic drive unit, the second magnetic drive unit, the first lock mechanism, and the second lock mechanism are arranged in a housing case.

(12)

The blade opening and closing device according to (11), in which the housing case is provided with a partition between the first magnetic drive unit or the second magnetic drive unit and the first lock mechanism or the second lock mechanism.

(13)

The blade opening and closing device according to (4) or (5), in which the first drive lever and the second drive lever are respectively provided with portions to be locked, a locked state of the first opening and closing blade or the second opening and closing blade is set by engagement of the first lock lever or the second lock lever with the portion to be locked, setting of the locked state and release of the locked state are performed according to rotation position of the first magnet or the second magnet, and the first lock lever or the second lock lever is moved between a locked position where the locked state is set and an unlocked position where the locked state is released according to change in a magnetic force with rotation of the first magnet or the second magnet.

(14)

The blade opening and closing device according to any one of (1) to (13), in which the first drive lever and the second drive lever are made rotatable, a rotation shaft of the first magnet and a rotation shaft of the first drive lever are caused to coincide, and a rotation shaft of the second magnet and a rotation shaft of the second drive lever are caused to coincide.

(15)

The blade opening and closing device according to (14), in which the first drive lever is fixed to the first magnet, and the second drive lever is fixed to the second magnet.

(16)

The blade opening and closing device according to any one of (1) to (15), in which the first opening and closing blade and the second opening and closing blade are moved between an open position where the opening is opened and a closed position where the opening is closed, and locked states of the first opening and closing blade and the second opening and closing blade are respectively set at the open position and the closed position.

(17)

The blade opening and closing device according to (13), in which a first engagement portion engaged with the first lock lever or the second lock lever in a state of opening the opening, and a second engagement portion engaged with the first lock lever or the second lock lever in a state of closing the opening are formed in the portion to be locked.

(18)

The blade opening and closing device according to (17), in which the first drive lever and the second drive lever are respectively provided with engagement pieces functioning as the portions to be locked, and both edges of the engagement piece are respectively formed as the first engagement portion and the second engagement portion.

(19)

The blade opening and closing device according to any one of (1) to (18), in which the first drive lever and the second drive lever are respectively provided with power assist springs that provide energizing forces in operation directions of the first drive lever and the second drive lever.

(20)

An imaging apparatus including a blade opening and closing device configured to control light taken into an inside via an optical system and an imaging element configured to photoelectrically convert the light taken in via the optical system, the blade opening and closing device including:

a first magnetic drive unit including a first coil to which a drive current is supplied and a first magnet rotated with electric conduction to the first coil;

a second magnetic drive unit including a second coil to which a drive current is supplied and a second magnet rotated with electric conduction to the second coil;

a first drive lever operated by the first magnetic drive unit;

a second drive lever operated by the second magnetic drive unit;

a first opening and closing blade that opens and closes an opening by an operation of the first drive lever;

a second opening and closing blade that opens and closes the opening by an operation of the second drive lever;

a first lock mechanism that locks the first drive lever at a predetermined position; and a second lock mechanism that locks the second drive lever at a predetermined position, in which at least a part of the first lock mechanism and at least a part of the second lock mechanism are located between the first magnetic drive unit and the second magnetic drive unit.

REFERENCE SIGNS LIST

1 Imaging apparatus
10 Optical system
11 Blade opening and closing device
12 Imaging element
13a Opening
15 Housing case
16 First magnetic drive unit
17 Second magnetic drive unit
19 First opening and closing blade
20 Second opening and closing blade
28 Partition
30 Magnet
31 Coil
40 Drive lever
43 Engagement piece
43a First engagement portion
43b Second engagement portion
46 Rotation shaft
55 Power assist spring
66 First lock mechanism
67 Second lock mechanism
69 Action lever
70 Lock lever
84 Turning shaft

The invention claimed is:

1. A blade opening and closing device, comprising:
a first magnetic drive unit including:
a first coil, wherein a first drive current is supplied to the first coil; and
a first magnet configured to rotate with electric conduction to the first coil;
a second magnetic drive unit including:
a second coil, wherein a second drive current is supplied to the second coil; and
a second magnet configured to rotate with electric conduction to the second coil;
a first drive lever, wherein the first magnetic drive unit is configured to operate the first drive lever;
a second drive lever, wherein the second magnetic drive unit is configured to operate the second drive lever;
a first opening and closing blade configured to open and close an opening by an operation of the first drive lever;
a second opening and closing blade configured to open and close the opening by an operation of the second drive lever;
a first lock mechanism configured to lock the first drive lever at a first position; and
a second lock mechanism configured to lock the second drive lever at a second position, wherein
the first lock mechanism and the second lock mechanism are located in a point-symmetric arrangement state, and
a part of the first lock mechanism and a part of the second lock mechanism are located between the first magnetic drive unit and the second magnetic drive unit.

2. The blade opening and closing device according to claim 1, wherein
the part of the second lock mechanism is located between the first magnetic drive unit and the part of the first lock mechanism, and
the part of the first lock mechanism is located between the second magnetic drive unit and the part of the second lock mechanism.

3. The blade opening and closing device according to claim 2, wherein
the part of the first lock mechanism and the part of the second lock mechanism are in an intersecting state in a direction orthogonal to a direction of arrangement of each of the first magnetic drive unit and the second magnetic drive unit.

4. The blade opening and closing device according to claim 2, wherein the first lock mechanism includes:
- a first lock lever configured to restrict that restricts the operation of the first drive lever based on a turning position of the first lock lever;
- a first action lever configured to restrict turn of the first lock lever based on a turning position of the first action lever; and
- a first attracting body configured to hold the first action lever by attraction, the second lock mechanism includes:
- a second lock lever configured to restrict the operation of the second drive lever based on a turning position of the second lock lever;
- a second action lever configured to restrict turn of the second lock lever based on a turning position of the second action lever; and
- a second attracting body configured to hold the second action lever by attraction, the second attracting body is located between the first magnetic drive unit and the first attracting body,
the first attracting body is located between the second magnetic drive unit and the second attracting body,
a turning shaft of the first action lever is located between the first magnetic drive unit and the first attracting body, and
a turning shaft of the second action lever is located between the second magnetic drive unit and the second attracting body.

5. The blade opening and closing device according to claim 4, wherein
the first drive lever includes a first portion to be locked,
the second drive lever includes a second portion to be locked,
a locked state of the first opening and closing blade is set by an engagement of the first lock lever with the first portion to be locked,
a locked state of the second opening and closing blade is set by an engagement of the second lock lever with the second portion to be locked,
the locked state of the first opening and closing blade is set and released based on a rotation position of the first magnet,
the locked state of the second opening and closing blade is set and released based on a rotation position of the second magnet,
the first lock lever is moved between a locked position where the locked state is set and an unlocked position where the locked state is released based on a change in a first magnetic force with rotation of the first magnet, and
the second lock lever is moved between the locked position and the unlocked position based on a change in a second magnetic force with rotation of the second magnet.

6. The blade opening and closing device according to claim 5, wherein
the first portion to be locked includes a first engagement portion configured to engage one of the first lock lever or the second lock lever in an open state of the opening, and
the second portion to be locked includes a second engagement portion configured to engage other of the first lock lever or the second lock lever in a closed state of the opening.

7. The blade opening and closing device according to claim 6, wherein
the first drive lever includes a first engagement piece as the first portion to be locked,
the second drive lever includes a second engagement piece as the second portion to be locked, and
both edges of the first engagement piece and the second engagement piece are formed as the first engagement portion and the second engagement portion, respectively.

8. The blade opening and closing device according to claim 1, wherein
the first lock mechanism includes:
- a first lock lever configured to restrict the operation of the first drive lever based on a turning position of the first lock lever; and
- a first action lever configured to restrict turn of the first lock lever based on a turning position of the first action lever, the second lock mechanism includes:
- a second lock lever configured to restrict the operation of the second drive lever based on a turning position of the second lock lever; and
- a second action lever configured to restrict turn of the second lock lever based on a turning position of the second action lever, the first action lever and the first lock lever share a first turning shaft, and
the second action lever and the second lock lever share a second turning shaft.

9. The blade opening and closing device according to claim 1, wherein
the first magnetic drive unit and the second magnetic drive unit are located in a line-symmetric arrangement state.

10. The blade opening and closing device according to claim 1, wherein
a part constituting the first lock mechanism and a part constituting the second lock mechanism is common.

11. The blade opening and closing device according to claim 1, wherein
a direction of arrangement of each of the first magnetic drive unit and the second magnetic drive unit coincides with a direction of arrangement of each of the first opening and closing blade and the second opening and closing blade.

12. The blade opening and closing device according to claim 1, wherein
a direction of arrangement of each of the first lock mechanism and the second lock mechanism coincides with a direction of arrangement of each of the first opening and closing blade and the second opening and closing blade.

13. The blade opening and closing device according to claim 1, wherein
the first magnetic drive unit, the second magnetic drive unit, the first lock mechanism, and the second lock mechanism are arranged in a housing case.

14. The blade opening and closing device according to claim 13, wherein
the housing case includes a partition between one of:
the first magnetic drive unit and at least one of the first lock mechanism or the second lock mechanism; or
the second magnetic drive unit and the at least one of the first lock mechanism or the second lock mechanism.

15. The blade opening and closing device according to claim 1, wherein the first drive lever and the second drive lever are rotatable, a rotation shaft of the first magnet coincides with a rotation shaft of the first drive lever, and a rotation shaft of the second magnet coincides with a rotation shaft of the second drive lever.

16. The blade opening and closing device according to claim 15, wherein the first drive lever is fixed to the first magnet, and the second drive lever is fixed to the second magnet.

17. The blade opening and closing device according to claim 1, wherein the first opening and closing blade and the second opening and closing blade are configured to move between an open position where the opening is opened and a closed position where the opening is closed, a locked state of the first opening and closing blade is set at the open position, and a locked state of the second opening and closing blade is set at the closed position.

18. The blade opening and closing device according to claim 1, wherein each of the first drive lever and the second drive lever is provided with a power assist spring, the power assist spring of the first drive lever is configured to provide a first energizing force in an operation direction of the first drive lever, and the power assist spring of the second drive lever is configured to provide a second energizing force in an operation direction of the second drive lever.

19. An imaging apparatus, comprising:

a blade opening and closing device configured to control light received via an optical system; and an imaging element configured to photoelectrically convert the received light via the optical system, wherein the blade opening and closing device comprises:

a first magnetic drive unit including:

a first coil, wherein a first drive current is supplied to the first coil; and a first magnet configured to rotate with electric conduction to the first coil;

a second magnetic drive unit including:

a second coil, wherein a second drive current is supplied to the second coil; and a second magnet configured to rotate the second magnet with electric conduction to the second coil;

a first drive lever, wherein the first magnetic drive unit is configured to operate the first drive lever;

a second drive lever, wherein the second magnetic drive unit is configured to operate the second drive lever;

a first opening and closing blade configured to open and close an opening by an operation of the first drive lever;

a second opening and closing blade configured to open and close the opening by an operation of the second drive lever;

a first lock mechanism configured to lock the first drive lever at a first position; and a second lock mechanism configured to lock the second drive lever at a second position, wherein the first lock mechanism and the second lock mechanism are located in a point-symmetric arrangement state, and a part of the first lock mechanism and a part of the second lock mechanism are located between the first magnetic drive unit and the second magnetic drive unit.

* * * * *